(12) United States Patent
Harif

(10) Patent No.: US 8,882,404 B2
(45) Date of Patent: Nov. 11, 2014

(54) CUTTING TOOL, CUTTING TOOL HOLDER AND CUTTING INSERT THEREFOR

(75) Inventor: Gershon Harif, Ramat Gan (IL)

(73) Assignee: No Screw Ltd, Holon (IL)

( * ) Notice: Subject to any disclaimer, the term of this patent is extended or adjusted under 35 U.S.C. 154(b) by 273 days.

(21) Appl. No.: 13/203,534

(22) PCT Filed: Feb. 25, 2010

(86) PCT No.: PCT/IL2010/000162
§ 371 (c)(1),
(2), (4) Date: Aug. 26, 2011

(87) PCT Pub. No.: WO2010/097797
PCT Pub. Date: Sep. 2, 2010

(65) Prior Publication Data
US 2011/0305532 A1    Dec. 15, 2011

Related U.S. Application Data

(60) Provisional application No. 61/202,445, filed on Feb. 27, 2009, provisional application No. 61/202,771, filed on Apr. 2, 2009.

(51) Int. Cl.
*B23C 5/22* (2006.01)
*B23C 5/06* (2006.01)
*B23C 5/10* (2006.01)

(52) U.S. Cl.
CPC .............. *B23C 5/2221* (2013.01); *B23C 5/06* (2013.01); *B23C 2200/128* (2013.01); *B23C 2200/206* (2013.01); *B23C 2260/84* (2013.01); *B23C 2200/361* (2013.01); *B23C 2210/168* (2013.01); *B23C 5/109* (2013.01); *B23C 2210/16* (2013.01); *B23C 2210/165* (2013.01); *B23C 2200/367* (2013.01); *B23C 2200/165* (2013.01)
USPC ............. 407/40; 407/41; 407/42; 407/48; 407/104

(58) Field of Classification Search
CPC ................................... B23C 5/22; B23C 5/20
USPC ............ 407/40–42, 47–50, 103, 104, 113
See application file for complete search history.

(56) References Cited

U.S. PATENT DOCUMENTS 3,341,921 A * 9/1967 Weller et al. ............ 407/104
3,925,868 A * 12/1975 Singh ......................... 407/104

(Continued)

FOREIGN PATENT DOCUMENTS

AT         6206            6/2003
DE         3301191 A1 *    7/1984    ............ B23B 5/22

(Continued)

OTHER PUBLICATIONS

Database WPI Week 198537, Thomson Scientific, XP-002587912, retrieved on Jun. 24, 2010.

(Continued)

*Primary Examiner* — Andrea Wellington
*Assistant Examiner* — Ryan Rufo
(74) *Attorney, Agent, or Firm* — Dorsey & Whitney LLP

(57) ABSTRACT

A cutting tool comprising a cutting tool holder and a cutting insert adapted to be mounted thereon. The tool holder comprises an insert seat defined by a base and at least one side wall extending from the base to define an insert seat space adapted to receive therein the insert. The seat comprises a support element extending into the insert seat from the base, and a fastening member engageable with the seat. The fastening member is displaceable with respect thereto between a mounting position adapted to allow the insert to be mounted onto the seat and a securing position adapted for securing the insert within the seat. The insert is formed with a securing cavity and when the insert is mounted onto the tool holder and is in the securing position, a portion of the support element and the fastening member is received within the cavity of the insert.

23 Claims, 53 Drawing Sheets

(56) References Cited

U.S. PATENT DOCUMENTS

| | | | |
|---|---|---|---|
| 4,507,023 A | 3/1985 | Shikata | |
| 6,158,928 A * | 12/2000 | Hecht | 407/102 |
| 7,677,842 B2 * | 3/2010 | Park | 407/113 |
| 7,775,750 B2 | 8/2010 | Satran et al. | |
| 2005/0152754 A1 * | 7/2005 | Wiman et al. | 407/103 |
| 2009/0092451 A1 | 4/2009 | Harif | |

FOREIGN PATENT DOCUMENTS

| | | | | |
|---|---|---|---|---|
| EP | 0402854 | | 12/1990 | |
| GB | 1011658 | | 12/1965 | |
| GB | 2098105 | | 11/1982 | |
| JP | Hei1-132319 | | 9/1989 | |
| JP | 2001507287 | | 6/2001 | |
| JP | 2010507496 | | 3/2010 | |
| WO | WO 93/17822 | | 9/1993 | |
| WO | WO 96/26802 | | 9/1996 | |
| WO | WO 98/30349 | | 7/1998 | |
| WO | WO 99/54078 | | 10/1999 | |
| WO | WO 03/022495 | * | 3/2003 | B23B 5/22 |
| WO | WO 03/101653 | | 12/2003 | |
| WO | WO 2007/098043 | | 8/2007 | |
| WO | WO 2007/134930 | | 11/2007 | |
| WO | WO2008/149371 | | 12/2008 | |

OTHER PUBLICATIONS

International Search Report and Written Opinion from International Application No. PCT/IL2010/000162 dated Jun. 30, 2011.

* cited by examiner

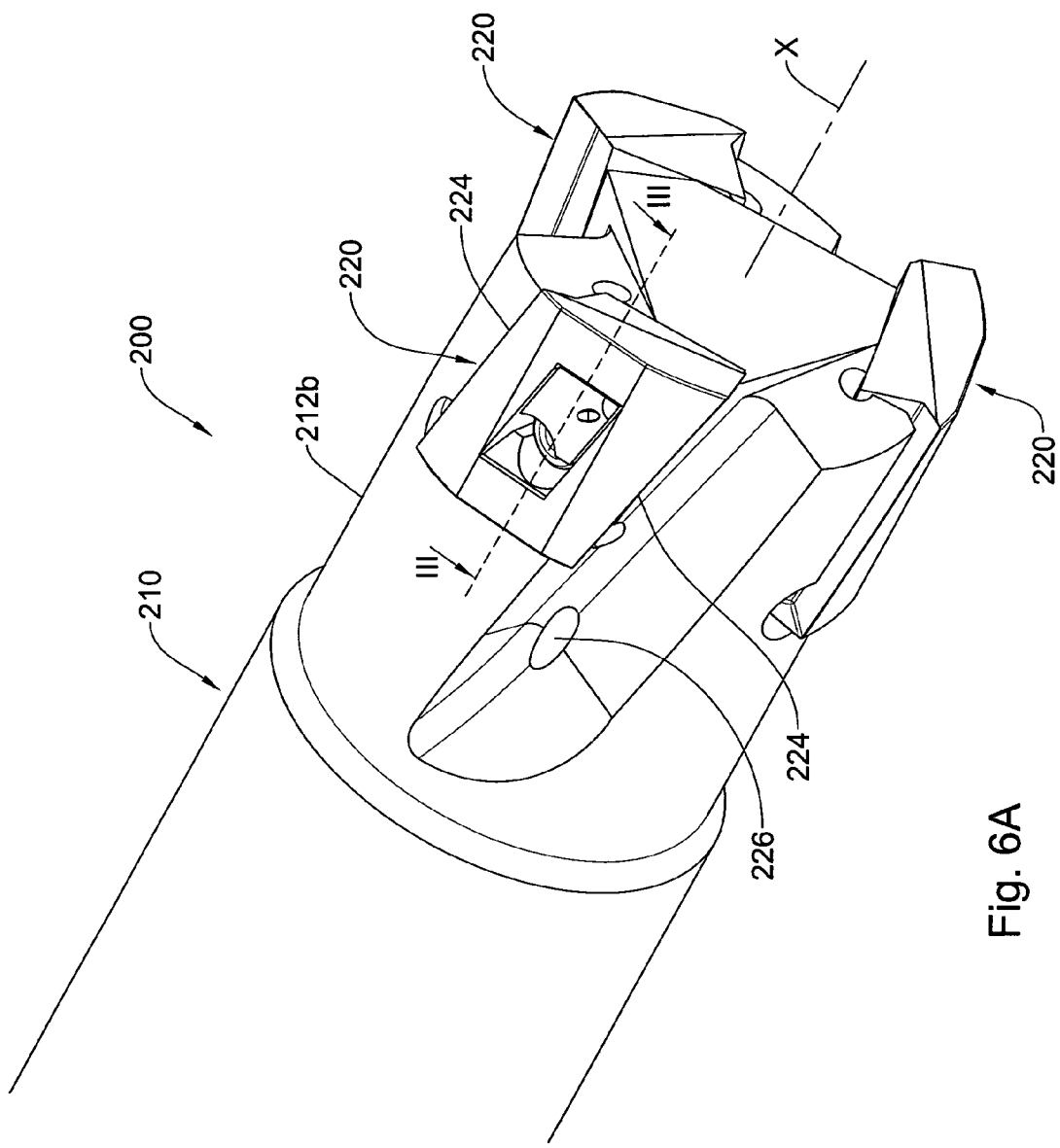

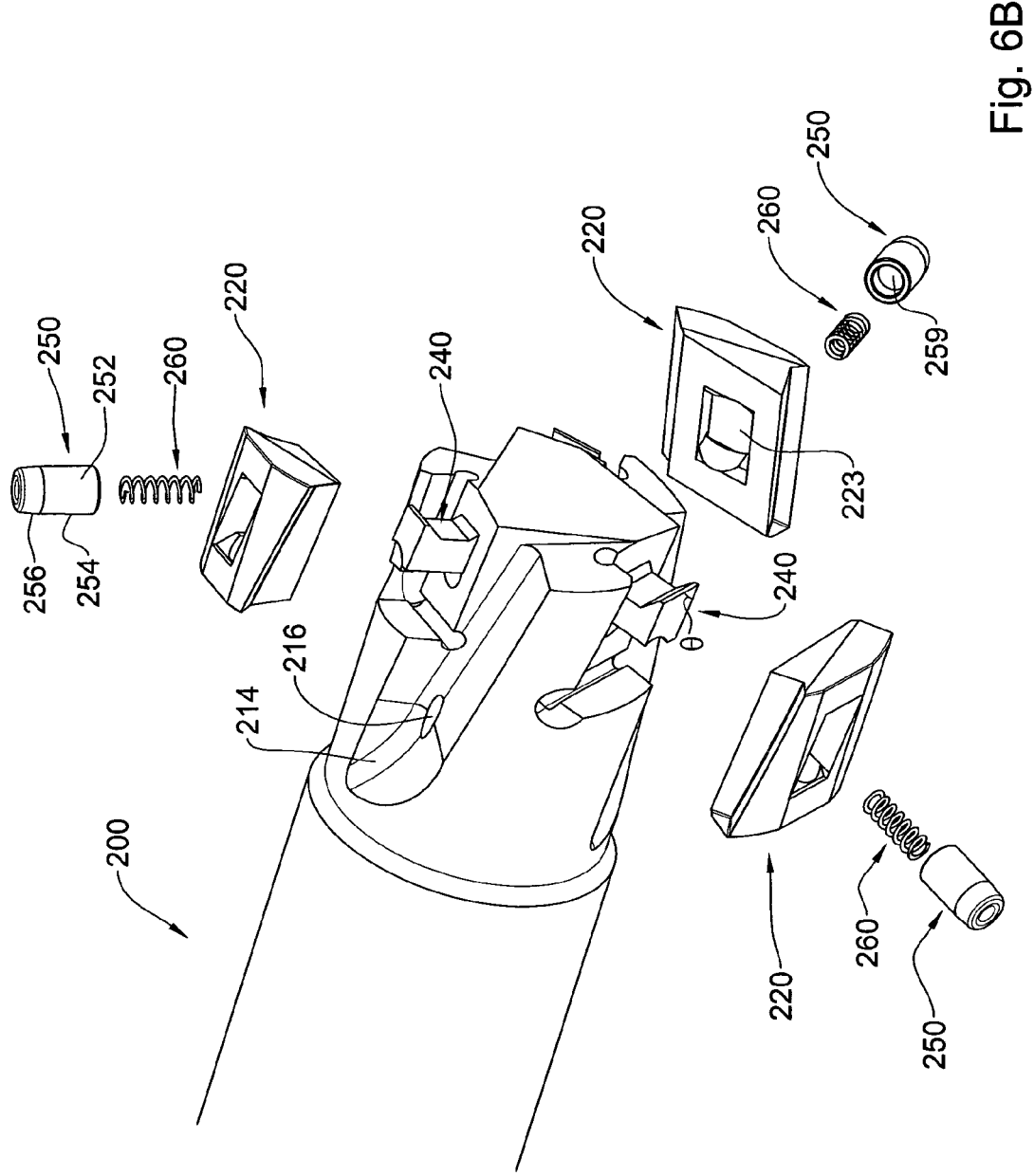

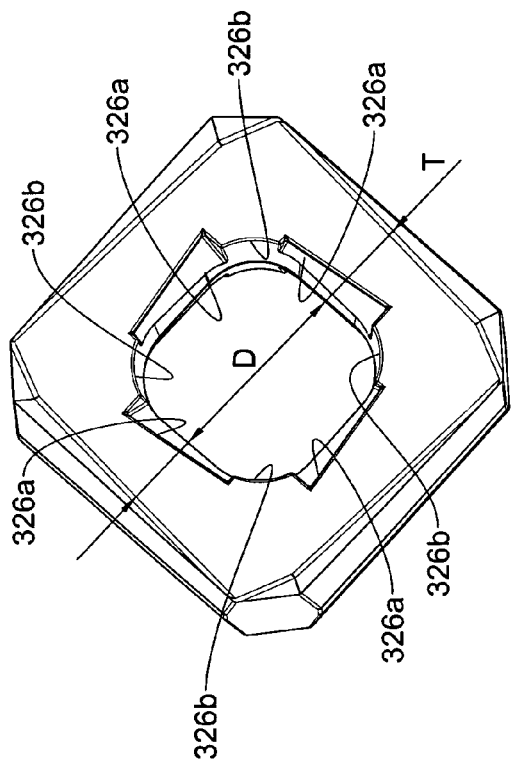
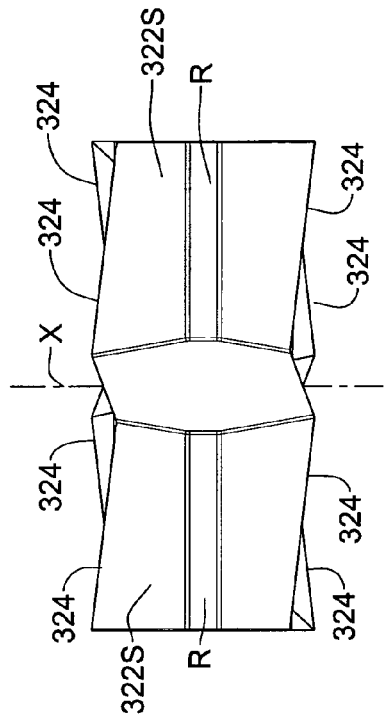
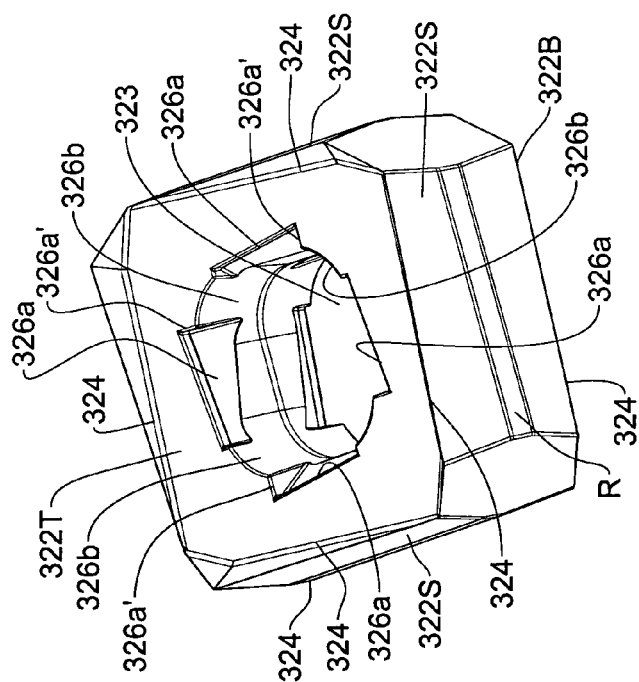
Fig. 10B
Fig. 10C
Fig. 10A

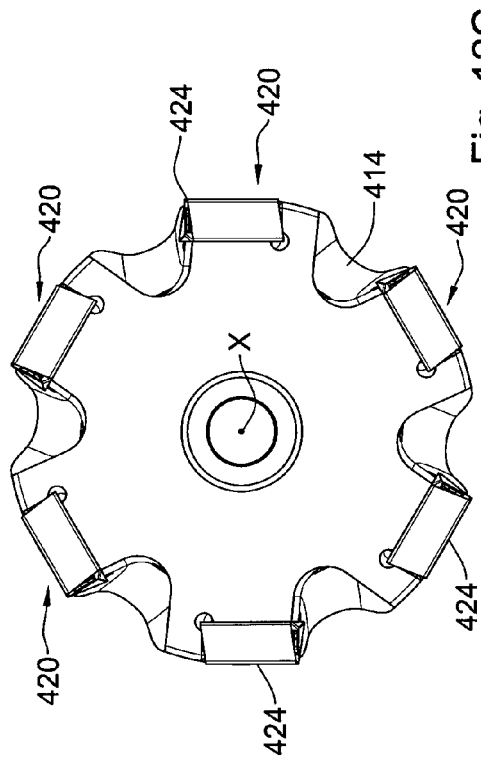
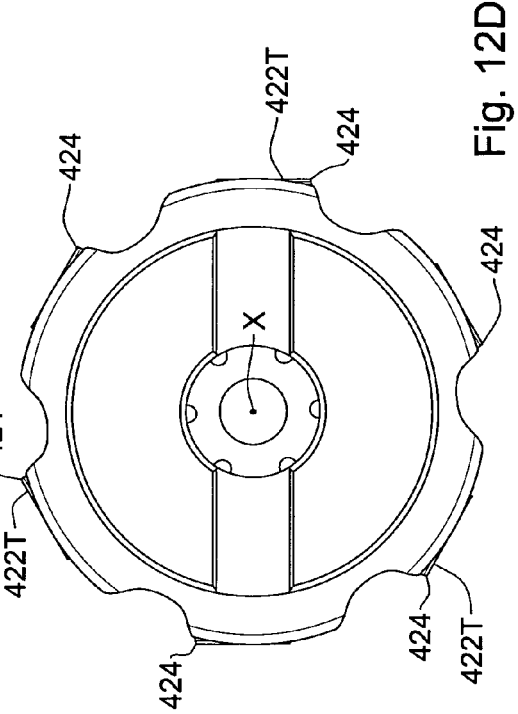
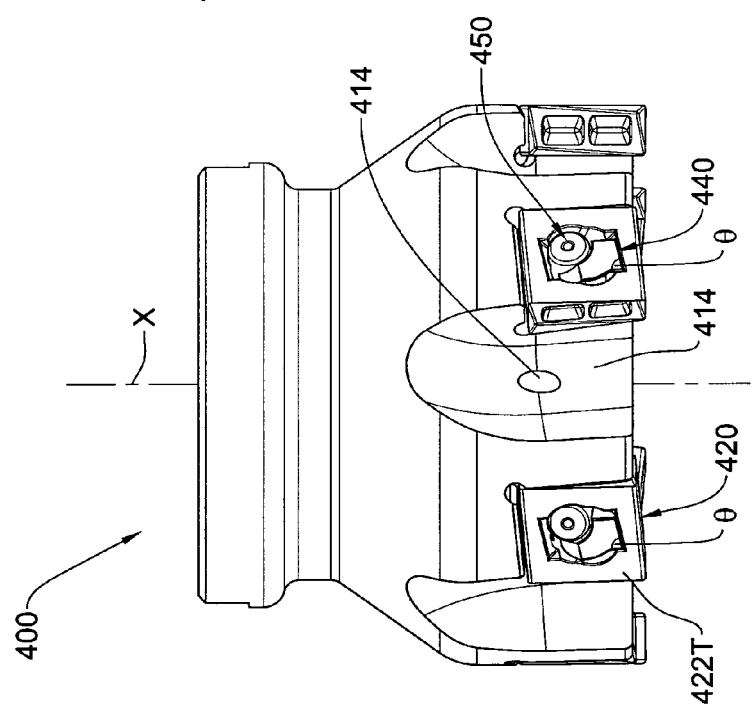

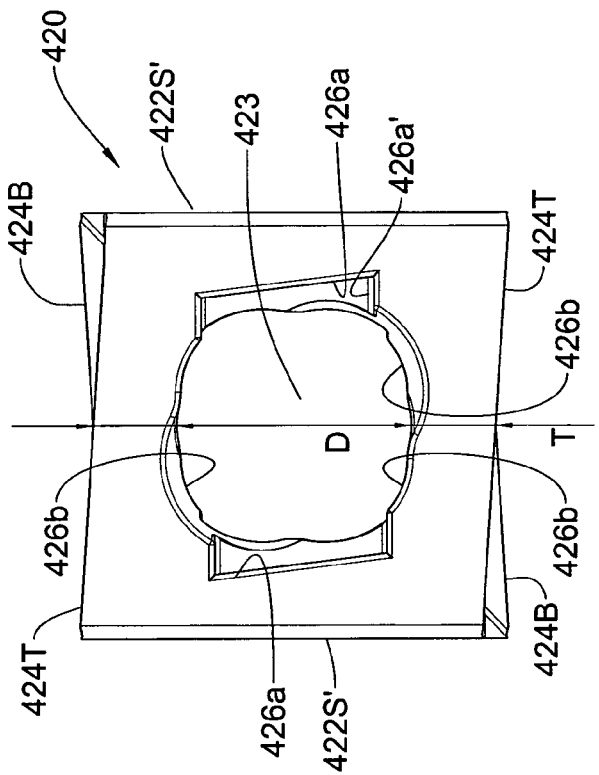
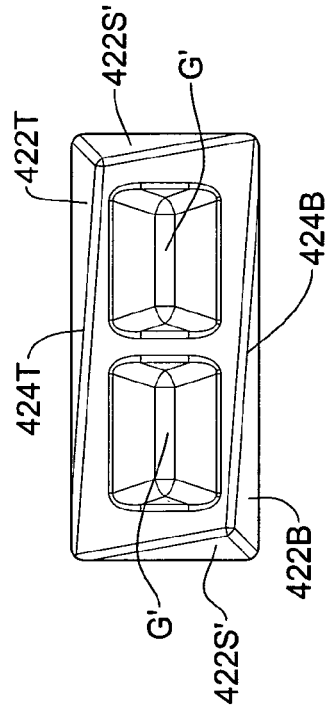
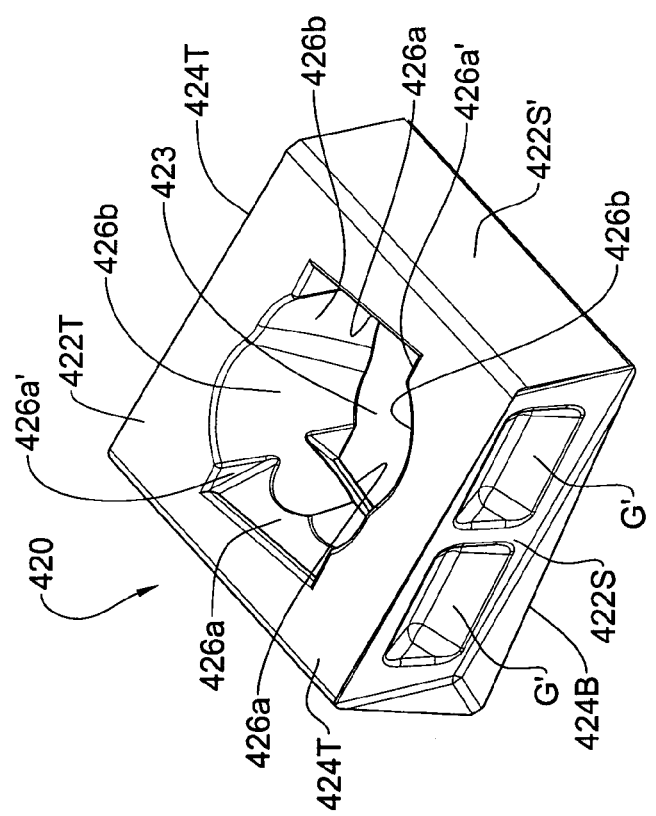
Fig. 13B
Fig. 13C
Fig. 13A

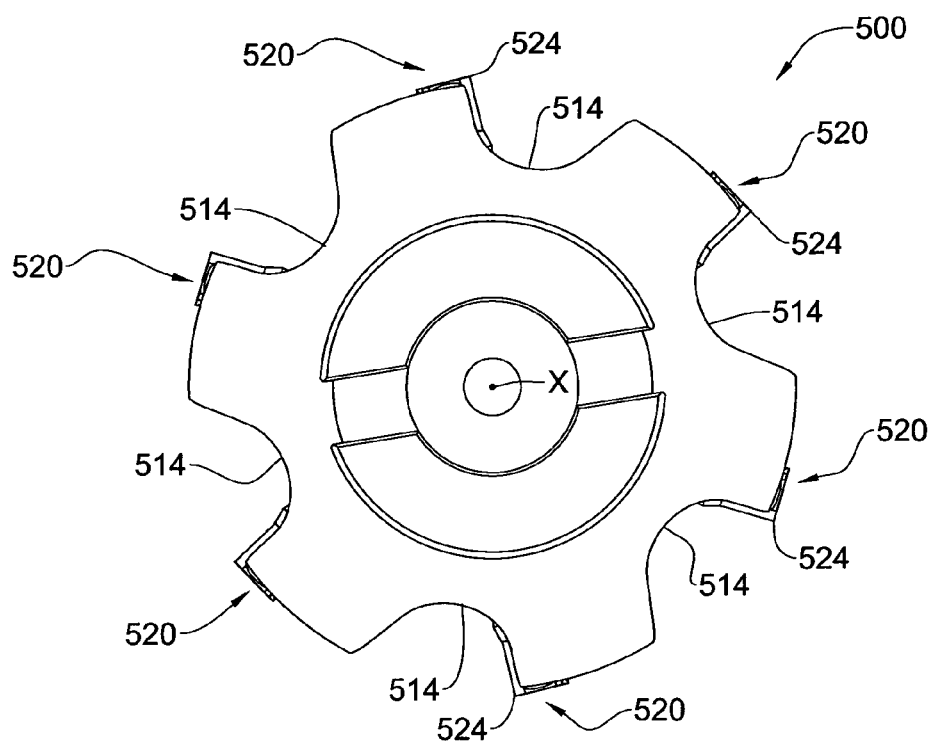
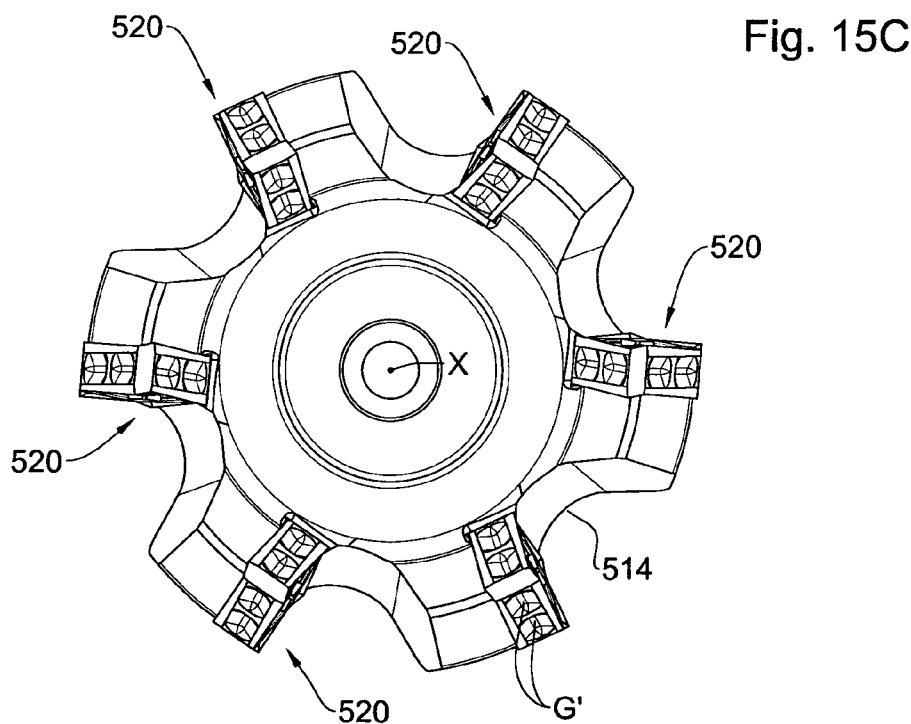
Fig. 15C
Fig. 15D

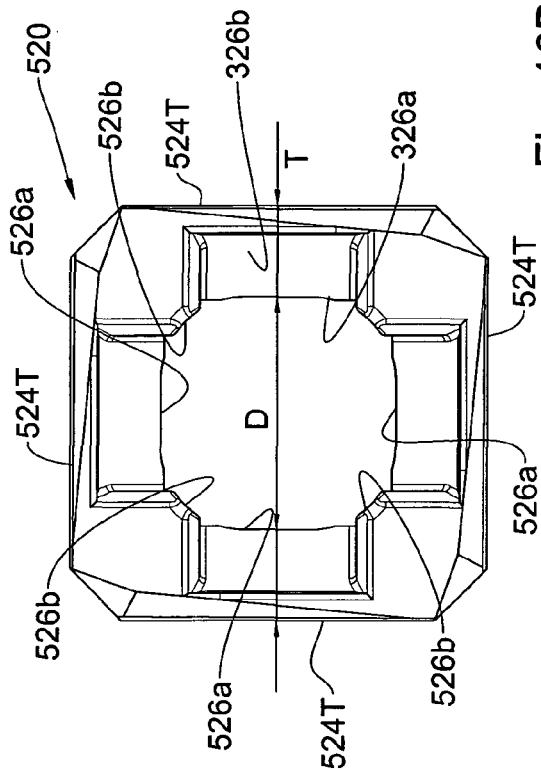
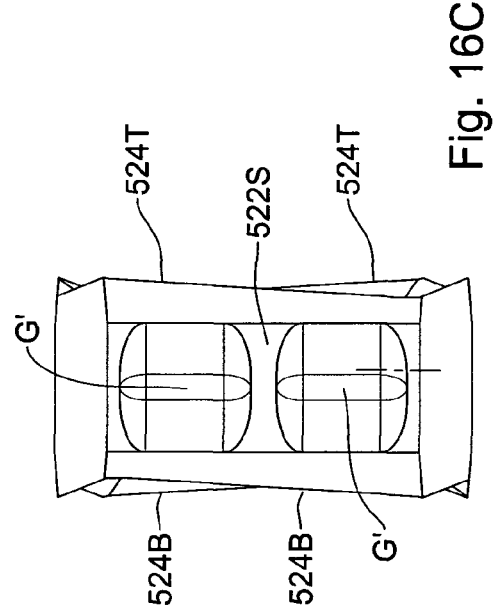
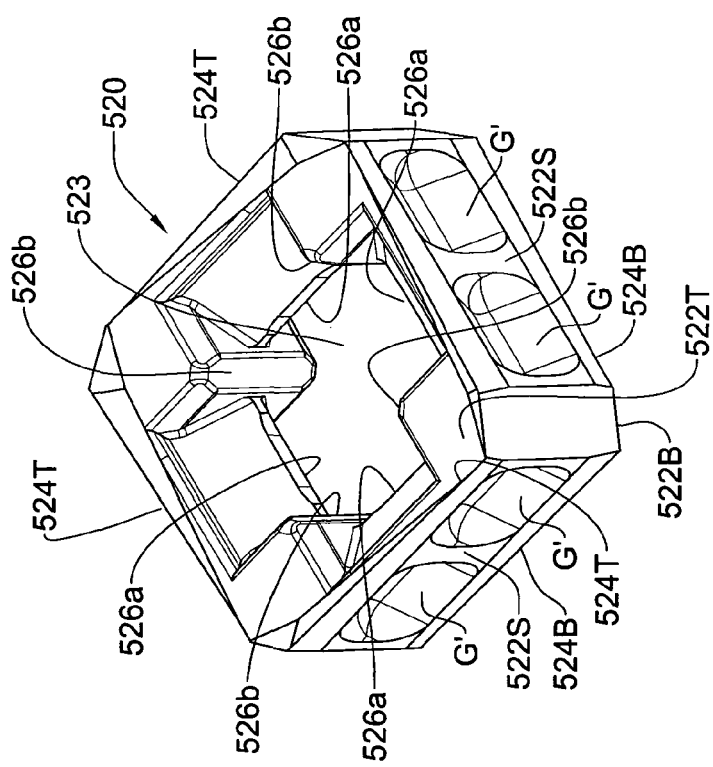
Fig. 16B
Fig. 16C
Fig. 16A

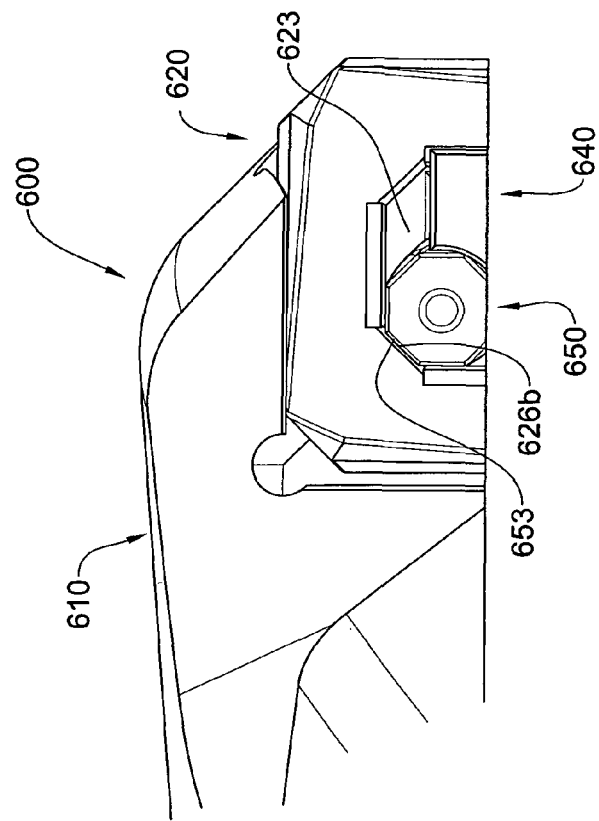
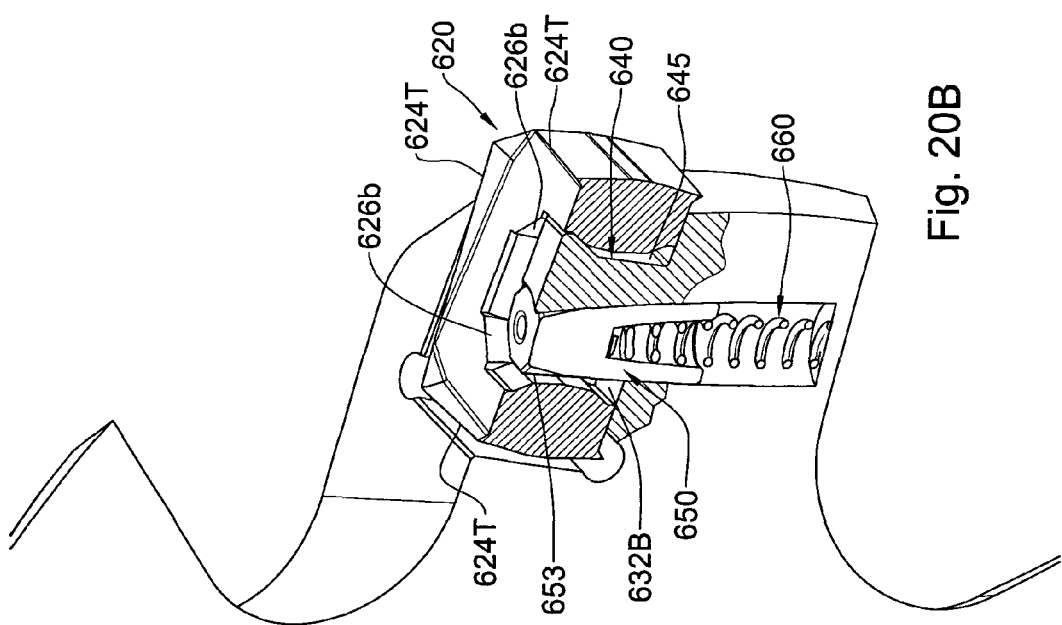

CUTTING TOOL, CUTTING TOOL HOLDER AND CUTTING INSERT THEREFOR

CROSS-REFERENCE TO RELATED APPLICATIONS

This application is a U.S. Nationalization of PCT International Application No. PCT/IL2010/000162 filed 25 Feb. 2010, entitled "CUTTING TOOL, CUTTING TOOL HOLDER AND CUTTING INSERT THEREFOR," which claims priority to U.S. Provisional Patent Application No. 61/202,445 filed 27 Feb. 2009 and U.S. Provisional Patent Application No. 61/202,771 filed 2 Apr. 2009, the contents of each of the foregoing applications are incorporated herein, in their entirety, by this reference.

FIELD OF THE INVENTION

This invention relates to cutting tools, cutting tool holders and cutting inserts to be used therein.

BACKGROUND OF THE INVENTION

A cutting tool is generally formed with at least one cutting edge, and is adapted for the removal of material from a workpiece by bringing the cutting edge into contact with the workpiece and displacing the cutting edge with respect to the workpiece either by displacing the cutting tool with respect to the workpiece or vise versa.

The cutting edges of cutting tools wear rapidly when used for cutting operations, particularly when cutting hard materials such as metal, and therefore they must be frequently replaced or re-sharpened. In many types of cutting tools, such as tool adapted for milling/drilling/turning machines, the cutting tool may comprise a plurality of cutting inserts, each being formed with at least one cutting edge, the inserts being fixed within seats of a cutting tool holder to form a cutting tool.

In a conventional cutting tool, the cutting insert is attached within the seat of the cutting tool by a fastener passing through a bore in the cutting insert into the bottom of the seat of the cutting tool. Indexing the cutting insert to enable the use of another cutting edge requires the removal of the fastener, the reorientation of the cutting insert, and the reattachment of the cutting insert within the seat of the cutting tool by the fastener. Each of these operations involves time and labor, and since cutting tools generally include a plurality of such cutting inserts, the time and labor costs involved in indexing the cutting inserts in a cutting tool are considerable.

In order to overcome technical problems, among which is the one presented above, alternative methods of mounting the cutting inserts onto the cutting tool holder have been devised as disclosed in WO2008/149371 and U.S. Ser. No. 12/314,428 to the applicant.

SUMMARY OF THE INVENTION

According to one aspect of the disclosed subject matter of the present application there is provided a cutting tool holder adapted for mounting thereon a cutting insert to form a cutting tool, said cutting tool holder comprising an insert seat defined by at least a base and at least one side wall extending from said base to defined an insert seat space adapted to receive said cutting insert, said insert seat further comprising a support element extending into said insert seat from said base, and, at least in operation, a fastening member engageable with said insert seat and displaceable with respect thereto between a mounting position adapted to allow said cutting insert to be mounted onto said insert seat and a securing position adapted for securing the cutting insert within said insert seat, wherein, in said securing position, said support element and said fastening member constitute together no less that 15% of said insert seat space.

According to another aspect of the disclosed subject matter of the present application there is provided a cutting tool holder adapted for mounting thereon a cutting insert to form a cutting tool, said cutting tool holder having a base surface defined by a circumferential edge, said base surface being provided with a support element extending therefrom, wherein an insert seat space may be defined by the base surface, a support plane parallel to the base surface intersecting said support element and a plurality of side planes extending between the base surface and the support plane along said circumferential edge, wherein the volume of said support element and fastening member is at least no less than 15% of the overall insert seat space.

According to a particular example, said support element and said fastening member may constitute together no less than 20% of the insert seat space, even more preferably no less than 25% of the insert seat space, even more preferably no less than 30% of the insert seat space, and even more preferably no less than 50% of the insert seat space.

In particular, the volume of said support element alone may preferably constitute at least 15% of the overall volume of the cutting insert, even more preferably at least 20% of the overall volume of the cutting insert, even more preferably at least 25% of the overall volume of the cutting insert, and even more preferably at least 35% of the overall volume of the cutting insert.

In addition, in each cross-section of said insert seat space taken along a plane generally parallel to said base, the cross-sectional areas of both said support element and said fastening member may constitute together no less that 15% of the entire cross-sectional area of the insert seat space. In particular, the cross-sectional areas of both said support element and said fastening member may constitute together no less than 20% of the entire cross-sectional area of the insert seat space, even more preferably no less than 25% of the entire cross-sectional area of the insert seat space, even more preferably no less than 30% of the entire cross-sectional area of the insert seat space, and even more preferably no less than 50% of the entire cross-sectional area of the insert seat space.

According to one particular example, said support element may be integrally formed with said cutting tool holder. According to another example, said support element may be adapted to engage said cutting tool holder in a detachable manner. In the latter case, according to one design, engagement between the support element and the cutting tool holder may be provided by the cutting tool being formed with a threaded support bore adapted to threadingly receive the support element, a portion of which is threaded. According to another design, said support element may be snap fitted to said cutting tool holder.

It should be appreciated that the term 'provided' is used heretofore both for a support element integrally formed with said cutting tool holder and a support element adapted to engage said cutting tool holder.

In addition, said support element may be formed such that it has no point of contact with either of said two side walls of the insert seat. In other words, the support element extends from the base of the insert seat like a pillar.

The cutting tool formed upon mounting of the cutting insert onto the cutting tool holder may be adapted to rotate in a first direction about a central axis thereof, and the design of the support element may be formed with a first side wall generally perpendicular to said base and facing in said first direction, and a second side wall extending from said first wall in a direction opposite said first direction, at an acute angle θ to said first wall, both said first side wall and said second side wall being adapted for simultaneous engagement with said cutting insert. Furthermore, said second side wall may be formed with a recess adapted to receive a corresponding portion of the cutting insert when the latter is mounted onto the insert seat, in order to better secure the cutting insert within the insert seat.

In accordance with one example of the disclosed subject matter of the present invention, the fastening member may be displaceable with respect to the insert seat between a mounting position in which it is adapted to allow said cutting insert to be mounted onto said insert seat and a securing position in which it is adapted for securing the cutting insert within said insert seat.

According to a particular example, the fastening member may be such that in the mounting position it is disengaged from the insert seat and in said securing position it is engaged therewith. Alternatively, the fastening member may be such that in both said mounting position and said securing position, said fastening member remains in engagement with said insert seat. In the latter case, in said mounting position said fastening member may protrudes to a first extent into the insert seat space, and in said securing position, it may protrudes to a second extent into the insert seat space, greater than the first extent.

The fastening member may have a threaded portion, and adapted for threading into a corresponding threaded bore of said insert seat. Alternatively, said fastening member may be in the form of a securing pin adapted to be received within a corresponding bore of said insert seat. In the latter case, said securing pin may be spring biased into said securing position. In addition, said securing pin may also be faceted.

In all of the above examples, when in said securing position, said fastening member may be adapted to engage the support element.

According to another aspect of the disclosed subject matter of the present application there is provided a cutting insert adapted for mounting onto the cutting tool holder of the previous aspect, said cutting insert comprising a central securing cavity adapted to simultaneously receive therein at least a portion of both said support element and said fastening member.

According to particular example, the volume of said cavity may constitute at least 15% of the overall volume of the cutting insert. In particular, it may constitute no less than 20% of the overall volume of the cutting insert, even more preferably no less than 25% of the overall volume of the cutting insert, even more preferably no less than 30% of the overall volume of the cutting insert, and even more preferably no less than 50% of the overall volume of the cutting insert.

According to a specific design of the cutting insert, said cavity may have an inner surface formed with a first securing portion and a second securing portion opposite said first portion, such that when said cutting insert is mounted onto the cutting tool holder, said first securing portion is adapted for engaging said support element, and said second securing portion is adapted for engaging said fastening member.

According to one example, said first portion may be in the form of an arced surface and said second portion may be planar. According to another example, said first portion and said second portion may both be in the form of arced surfaces.

The above cutting insert may be reversible.

According to yet another aspect of the disclosed subject matter of the present application there is provided a cutting tool comprising the cutting tool holder and the cutting insert of the previous aspects of the present invention.

Thus, the cutting insert of the cutting tool may be formed with a central opening, and said cutting tool holder may comprise an insert seat, a support element extending into said insert seat, and a fastening member displaceable with respect to said insert seat, wherein, when said cutting insert is mounted onto said insert seat, at least a portion of each of said support element and said fastening member is received within said central opening.

According to a particular example, at least one of the following may take place in said securing position:
the inner surface of said cavity may simultaneously engage both said support element and said fastening member, such that the inner surface of said cutting insert has thereon at least one contact point $C_1$ with said support element and at least one contact point $C_2$ with said fastening member;
said fastening member may simultaneously engage both said support element and said cutting insert, such that said fastening member has thereon at least one contact point $C_2$ with said cutting insert and at least one contact point $C_3$ with said support element; and
said support element may simultaneously engage both said fastening member and said cutting insert, such that said support element has thereon at least one contact point $C_1$ with said cutting insert and at least one contact point $C_3$ with said fastening member.

According to a particular design, the above contact points $C_1$, $C_2$ and $C_3$ may all be disposed along a single straight line.

The cutting tool may be such that it is adapted to revolve about a central axis thereof in a first direction, and when said cutting insert is mounted onto the cutting tool holder said fastening member is adapted to apply a force $F_1$ on said cutting insert in a direction generally along said central axis, said force $F_1$ pushing the cutting insert against the support element which is thereby adapted to apply a force $F_2$ on said cutting insert in a direction generally perpendicular to said central axis, the resultant force $F_T$ of the two forces $F_1$ and $F_2$ being in a direction transverse to said central axis and opposite said first direction.

The cutting tool may be formed with two or more cutting portions, each cutting portion comprising two or more cutting inserts, the cutting edges of which form a continuous cutting edge in each cutting portion, wherein the special arrangement of the cutting inserts of the same cutting portion varies from one cutting portion to another. In particular, the cutting inserts in each cutting portion may be shifted at a distance d with respect to one another, and wherein the shift d varies from one cutting portion to another.

According to still another aspect of the disclosed subject matter of the present application, there is provided a cutting insert adapted for mounting onto a cutting tool holder in order to form a cutting tool, said cutting insert having a top face and a bottom face with at least one side wall extending therebetween and being formed with a central cavity extending between said top face and said bottom face along a central axis, said cavity being adapted, when the cutting insert is mounted onto the cutting tool holder, for receiving within said cavity a securing element, said cavity taking up no less that 15% of the overall volume of the cutting insert.

The volume of said securing cavity may preferably constitute at least 20% of the overall volume of the cutting insert, even more preferably at least 25% of the overall volume of the cutting insert, even more preferably at least 30% of the overall volume of the cutting insert, and even more preferably at least 50% of the overall volume of the cutting insert.

In addition, in each cross-section of said cutting insert taken along a plane generally parallel to said top face or bottom face, the cross-sectional area of said cavity may constitute no less that 15% of the entire cross-sectional area of the cutting insert. In particular, the cross-sectional are of said cavity may constitute no less than 20% of the entire cross-sectional area of the cutting insert, even more preferably no less than 25% of the entire cross-sectional area of the cutting insert, even more preferably no less than 30% of the entire cross-sectional area of the cutting insert, and even more preferably no less than 50% of the entire cross-sectional area of the cutting insert.

Furthermore, in each cross-section taken generally parallel to said top face or said bottom face, the ratio D/T between the dimension of the cavity D and the dimension of the entire cutting insert T may be no less than 0.4, where both dimensions D and T are taken along a direction perpendicular to said at least one side face and passing through said central axis. In particular, the ratio D/T may be no less than 0.5, preferably no less than 0.6, even more preferably no less than 0.7 and even more preferably no less than 0.8.

The cutting insert may have an inner surface formed with a first securing portion and a second securing portion opposite said first portion, such that when said cutting insert is mounted onto the cutting tool holder, said first securing portion is adapted for engaging a support element of the cutting tool holder, and said second securing portion is adapted for simultaneously engaging a fastening member of the cutting tool holder.

According to one example, said first portion may be in the form of an arced surface and said second portion is planar. Alternatively, said first portion and said second portion may be in the form of arced surfaces.

The cutting insert may be reversible.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 6A is a schematic isometric view of a cutting tool according to yet another embodiment of the disclosed subject matter of the present application;

FIG. 6B is a schematic exploded isometric view of the cutting tool shown in FIG. 6A;

FIGS. 10A to 10C are respective schematic isometric, front and side views of a cutting insert used in the cutting tool shown in FIGS. 9A and 9B;

FIGS. 12A to 12D are respective schematic isometric, front, top and bottom views of a cutting tool according to still another embodiment of the disclosed subject matter of the present application;

FIGS. 13A to 13C are respective schematic isometric, front and side views of a cutting insert used in the cutting tool shown in FIGS. 12A to 12D;

FIGS. 15A to 15D are respective schematic isometric, front, top and bottom views of a cutting tool according to still another embodiment of the disclosed subject matter of the present application;

FIGS. 16A to 16C are respective schematic isometric, front and side views of a cutting insert used in the cutting tool shown in FIGS. 15A to 15D;

FIG. 20B is a schematic cross-section view of the cutting tool shown in FIG. 18 taken along line V-V therein;

FIG. 20C is a schematic top planar view of the cutting tool shown in FIG. 20B;

DETAILED DESCRIPTION OF EMBODIMENTS

Figure 1A:
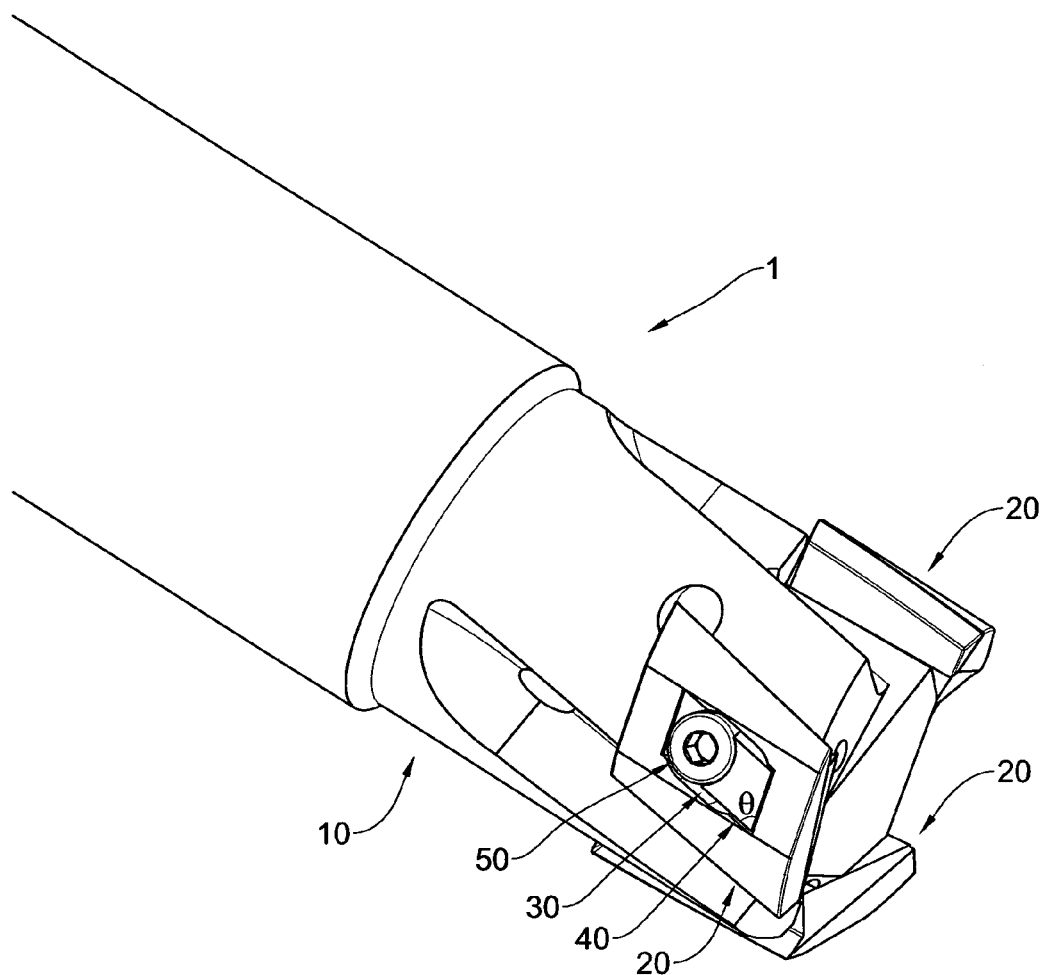
FIG. 1A is a schematic isometric view of a cutting tool according to one embodiment of the disclosed subject matter of the present application.
Figure 1B:
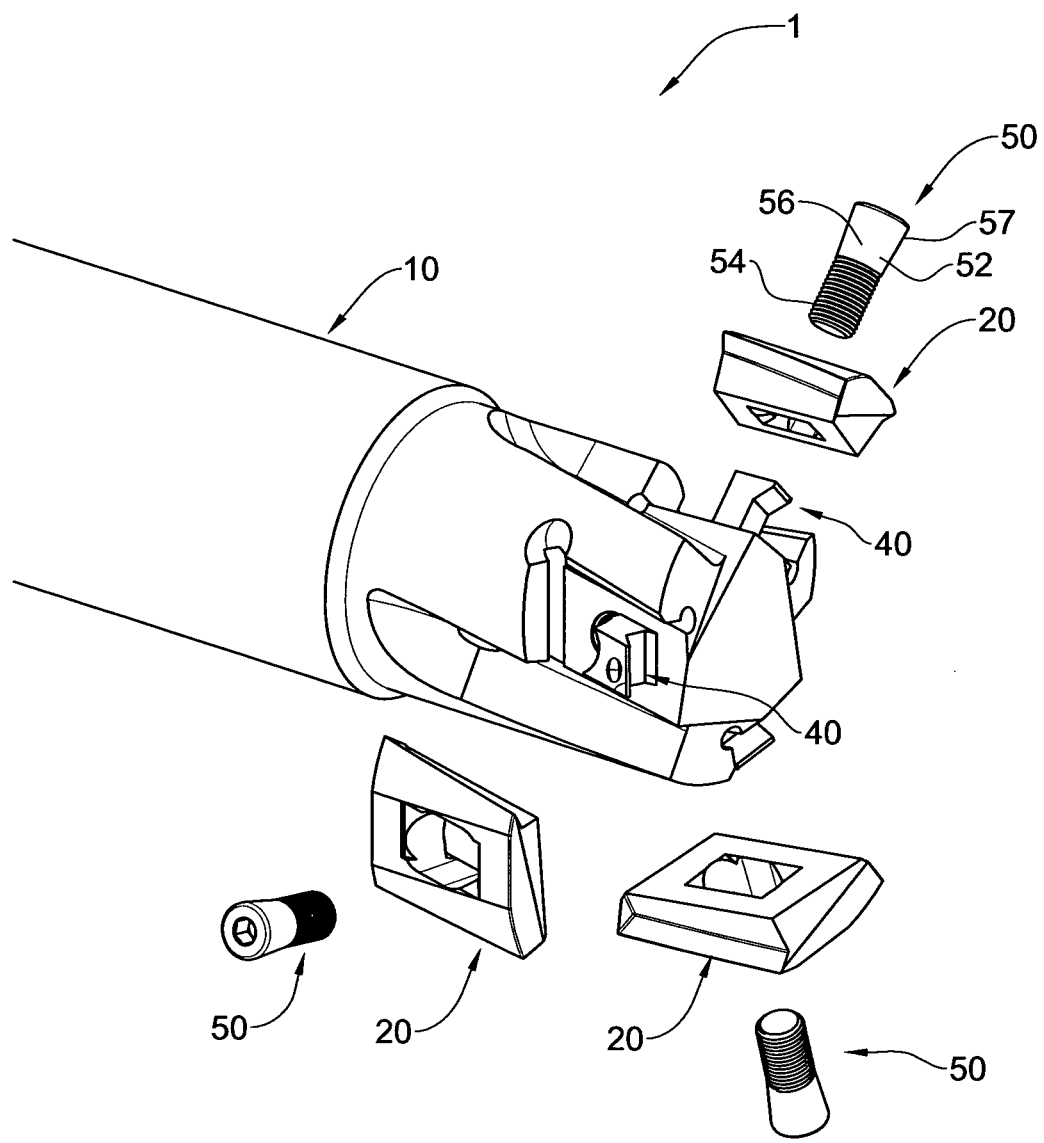
FIG. 1B is a schematic exploded isometric view of the cutting tool shown in FIG. 1A.

Attention is first drawn to FIGS. 1A and 1B in which a cutting tool generally designated as 1 is shown comprising a cutting tool holder 10 and three cutting inserts 20 mounted onto insert seats 30, each being secured in place by a securing arrangement comprising a support element 40, being integrally formed with the cutting tool holder 10, and a fastening member 50 adapted for dynamically engaging the cutting tool holder 10.

Turning now to FIGS. 2A through 2F, the cutting insert 20 is formed with a body 21 having a top face 22T and a bottom face 22B, and side faces 22S, 22S' extending therebetween. The top face 22T is formed with two peripheral slanting surfaces 22T' wherein a cutting edge 24 is defined at the intersection between two of the side faces 22S and the peripheral slanting surfaces 22T'. Each of the side walls 22S is formed with a v-shaped groove G adapted to engage a corresponding sidewall 34a of the insert seat 30 (shown FIGS. 3A, 3B).

The body 21 is further formed with a central cavity 23 having an opening 23T, 23B at the respective top and bottom faces 22T, 22B, the cavity being defined about a central axis X extending generally perpendicular to the top and bottom faces 22T, 22B.

The cavity 23 defines an inner surface 25 of the cutting insert 20, extending between the top face 22T and the bottom face 22B. The inner cavity has a nominal dimension D sufficient for accommodating therein, when the cutting insert 20 is mounted onto the cutting tool holder 10, both the support element 40 and the fastening member 50.

Thus, it should be pointed out that, whereas in common cutting inserts the central opening is designed for accommodating only a fastening member (e.g. a fastening screw) of a predetermined diameter corresponding to the dimensions of the central opening, in the present example, as well as in all of the following embodiments to be described, the central cavity 23 corresponds in dimension to the mutual dimension of both the fastening member 50 and the support element 40 together. In other words, for a fastening member of a nominal dimension M, cavity 23 of presently disclosed subject matter has a nominal dimension $D \cong 2M$, compared to a dimension $D' \cong M$ in common cutting inserts, thereby allowing it to accommodate both the fastening member 50 and the support element 40 together.

It is thus appreciated, that the cavity 23 comprises, volumetrically, a greater percent of the overall volume of the cutting insert than in known cutting inserts. In particular, the cavity 23 may take up to no less that 15% of the overall volume of the cutting insert. The cavity may preferably constitute at least 20% of the overall volume of the cutting insert, even more preferably at least 25% of the overall volume of the cutting insert, even more preferably at least 30% of the overall volume of the cutting insert, and even more preferably at least 50% of the overall volume of the cutting insert.

Furthermore, the cutting insert 20 may be designed such that in each of its cross-sections taken along a plane generally parallel to the top face 22T or bottom face 22B, the cross-sectional are of the cavity 23 constitutes up to no less that 15% of the entire cross-sectional area of the cutting insert. In particular, the cross-sectional area of the cavity may constitute no less than 20% of the entire cross-sectional area of the cutting insert, even more preferably no less than 25% of the entire cross-sectional area of the cutting insert, even more preferably no less than 30% of the entire cross-sectional area of the cutting insert, and even more preferably no less than 50% of the entire cross-sectional area of the cutting insert.

In addition, it will be observed from FIGS. 2A to 2F, that the ratio D/T between the dimension of the cavity D and the dimension of the entire cutting insert T is about 0.4. However, this ratio may vary and be up to no less than 0.5, preferably no less than 0.6, even more preferably no less than 0.7 and even more preferably no less than 0.8. It should be noted that the same ratio applies for the corresponding dimensions when measured between the central axis X, i.e. the distance ($D_{half}$) measured between the side wall 22S and the inner surface of the cavity 23, and the distance ($T_{half}$) measured between the side wall 22S and the central axis X. The dimensions D, $D_{half}$, T and $T_{half}$ are taken along a direction perpendicular to the side walls 22S and passing through said central axis It is appreciated that the volumetric, areal and linear dimensions and ratios mentioned above with respect to cutting insert 20 may apply to each of the following cutting inserts to be described in connection with the following figures (FIG. 5A to FIG. 35C).

The inner surface 25 of the cavity 23 is of a generally rectangular shape being defined by four side faces—one pair of opposite side faces 26S and another pair of opposite side faces 26S', such that each side face 26S is neighbored by side faces 26S' and vise versa. The side faces 26S, 26S' are formed with securing portions 26a, 26a', and 26b adapted for engaging the support element 40 and the fastening member 50 respectively.

Figure 2B:
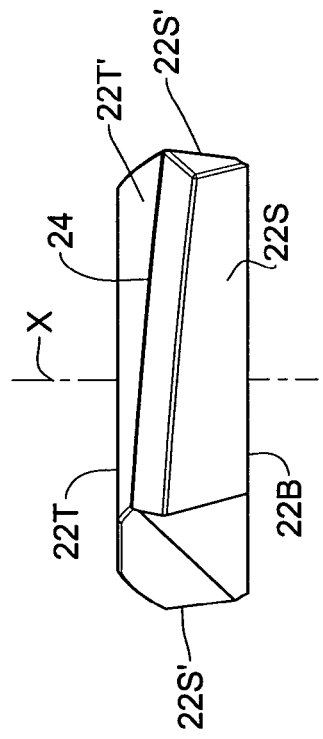
FIGS. 2A to 2D are respective schematic isometric, left side, right side and bottom views of a cutting insert used in the cutting tool shown in FIGS. 1A and 1B.
Figure 2D:
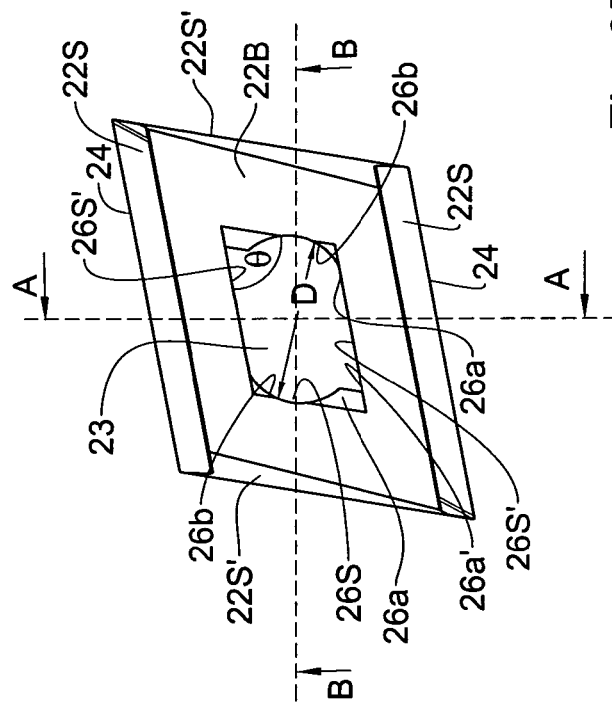
Figure 2A:
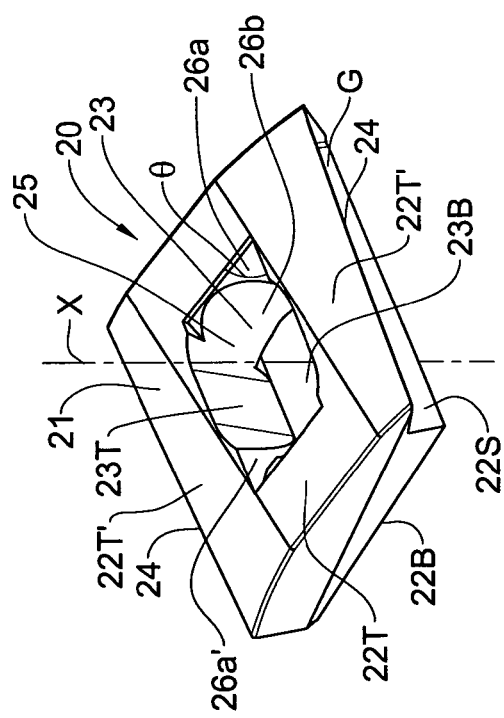
Figure 2C:
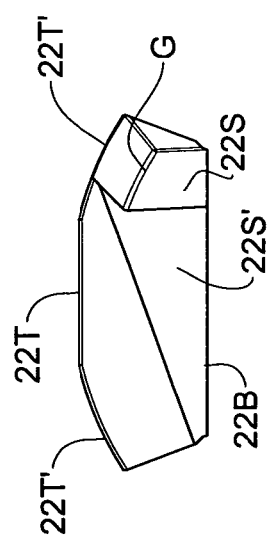
Figure 2F:
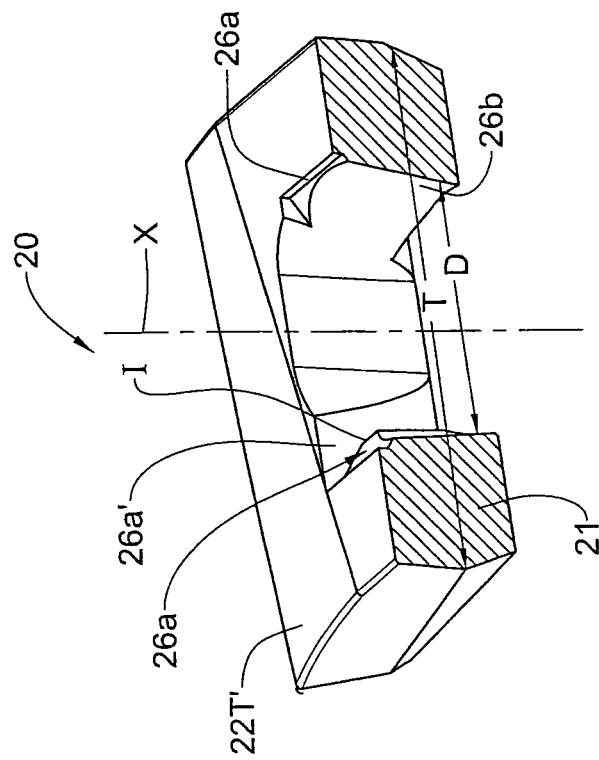
FIGS. 2E and 2F are schematic isometric cross-section views taken along lines A-A and B-B shown in FIG. 2D.
Figure 2E:
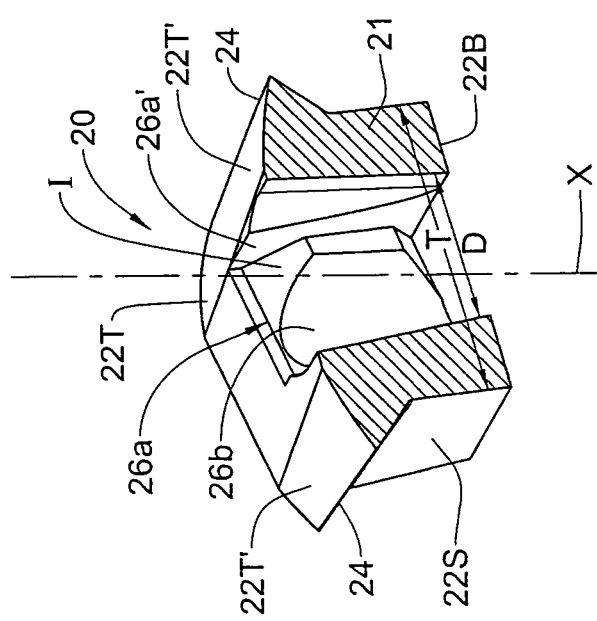

With particular reference being made to FIGS. 2E and 2F, each of the side faces 26S is formed with a securing portion 26a, being in the form of a protrusion projecting into the cavity 23. The securing portion 26a is formed of three surfaces I, II and III, the surface II being generally parallel to the side face 26S, and the surfaces I and III tapering between the former two (i.e. between 26S and II). The surfaces I, II and III are adapted, when the cutting insert 20 is mounted onto the cutting tool holder 10, for engaging corresponding surfaces of the support element 40 as will be explained with respect to FIG. 4B.

The side faces 26S' are each formed with a securing portion 26a', also adapted to engage the support element 40. However, the securing portions 26a' are simply in the form of a planar surface constituting part of the side face 26S', so that the securing portion 26a' is adapted, when the cutting insert 20 is mounted onto the cutting tool holder 10, to engage a corresponding surface of the support element 40.

Each of the securing portions 26b adapted to engage the fastening member 50 is in the shape of a concave curved surface (in this example almost semi-conical), i.e. it extends into the securing portion 26a to define a recess therein. The securing portion 26b is only partially formed within the securing portion 26a, i.e. the curved surface extends slightly towards one of the side faces 26S' (FIG. 2F). The securing portion 26b is adapted, when the cutting insert 20 is mounted onto the cutting tool holder 10, to engage a corresponding curved (convex) surface of the fastening member 40.

Figure 3A:
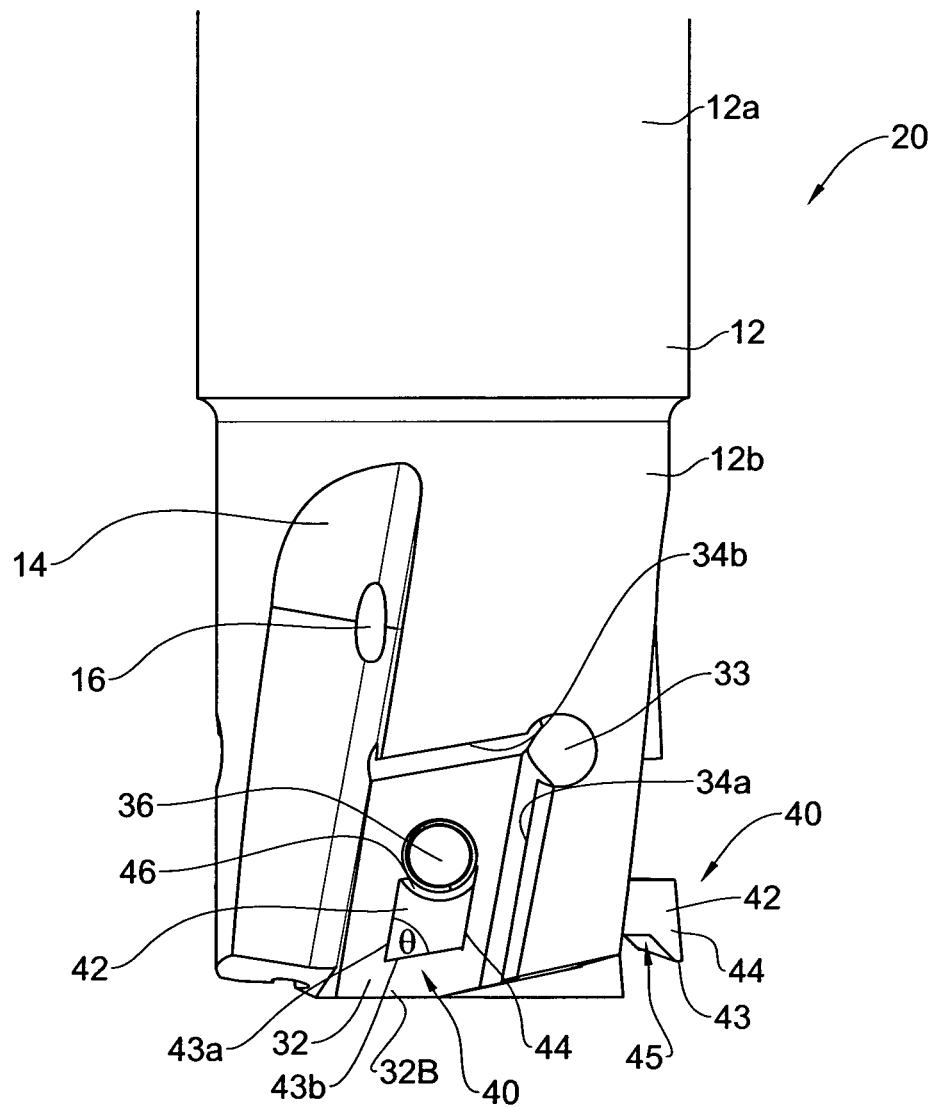
FIG. 3A is a schematic front view of the cutting tool holder shown in FIG. 3A.
Figure 3B:
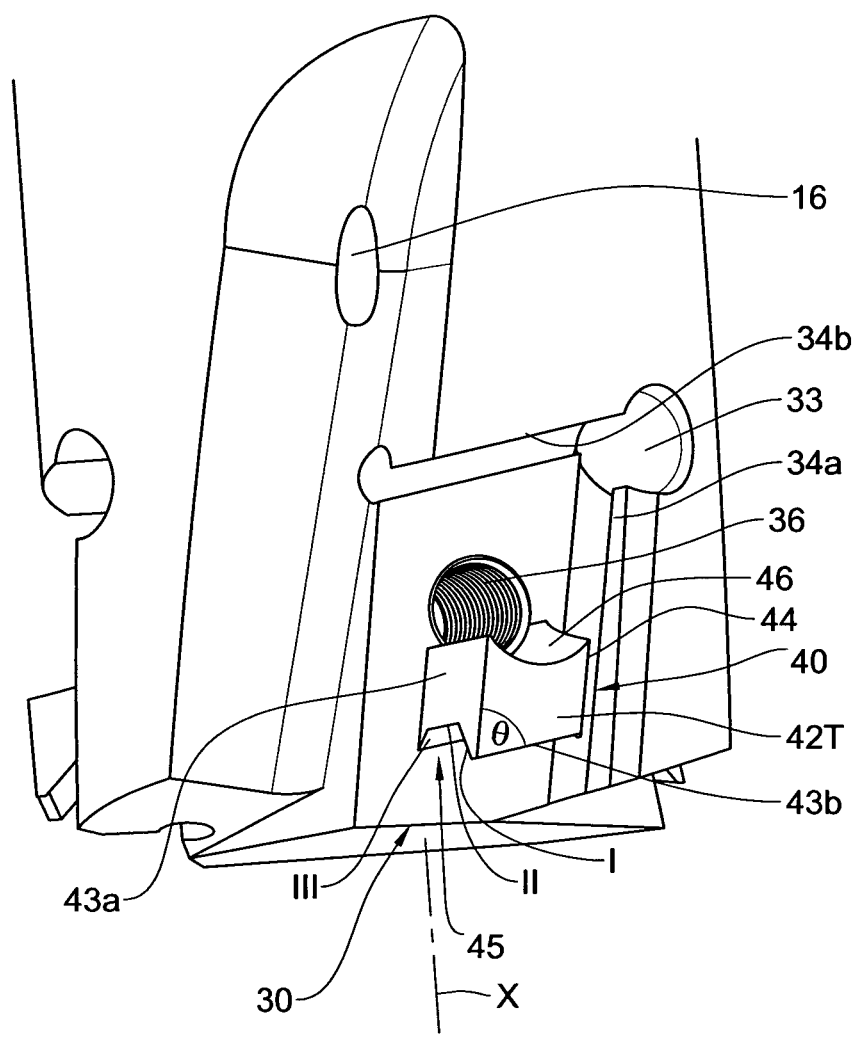
FIG. 3B is a schematic isometric view of a mounting portion of a cutting tool holder used in the cutting tool shown in FIGS. 1A and 1B.

Turning now to FIGS. 3A and 3B, the cutting tool holder 10 is shown comprising a body 12 extending along a central axis X, and having a attachment portion 12a adapted for attachment to an apparatus (not shown) and a mounting portion 12b adapted for mounting thereon the cutting insert 20. The cutting tool holder 10 is further formed with three spirally extending chip evacuation channels 14 and corresponding cooling holes 16 for providing therethrough a cooling fluid during a cutting operation.

The mounting portion 12b is formed with three cutting insert seats 30, each being formed with a base surface 32B and side surfaces 34a and 34b extending from the base surface 32B and separated by a release gap 33. The insert seat 30 is integrally formed with the support element 40, the latter being in the form of a shoulder 42 and extending generally perpendicular to the base surface 32B. The insert seat 30 is also formed with a threaded fastening bore 36 adapted to accommodate therein the fastening member 50.

The shoulder 42 is formed with a top surface 42T being elevated from the base surface 32B of the insert seat 30, and has four side walls 43a, 43b, 44 and 46 extending between the base surface 32B and the top surface 42T. When the cutting insert 20 is mounted onto the insert seat 30, the side walls 43a, 43b are adapted for engaging the respective securing portions 26a, 26a' of the cutting insert 20 for securing it in place, while the side wall 46 is adapted to engage the fastening member 50.

In particular, the side wall 43b is formed with a nook 45 defined by three surfaces I', II' and III' adapted to engage the corresponding surfaces I, II and III of the securing portion 26a of the cutting insert, and the side wall 43a is adapted to engage the securing portion 26a' of the cutting insert.

Reverting now to FIG. 1B, the fastening member 50 is in the form of a fastening screw 52 having a stem portion 54 and a head portion 56. The stem portion 54 is threaded and is adapted for insertion into the threaded fastening bore 36 of the insert seat 30. The head portion 56 is of a conical shape and has an external surface 57, adapted to engage the side wall 46 of the shoulder 42, when the fastening member 50 is inserted into the fastening bore 36 of the insert seat 30. The conical shape of the head portion 56 is such that the diameter of the cross-section of the external surface 57 is greater at an end remote from the stem 54 than at the end bordering the stem 54.

Figure 4A:
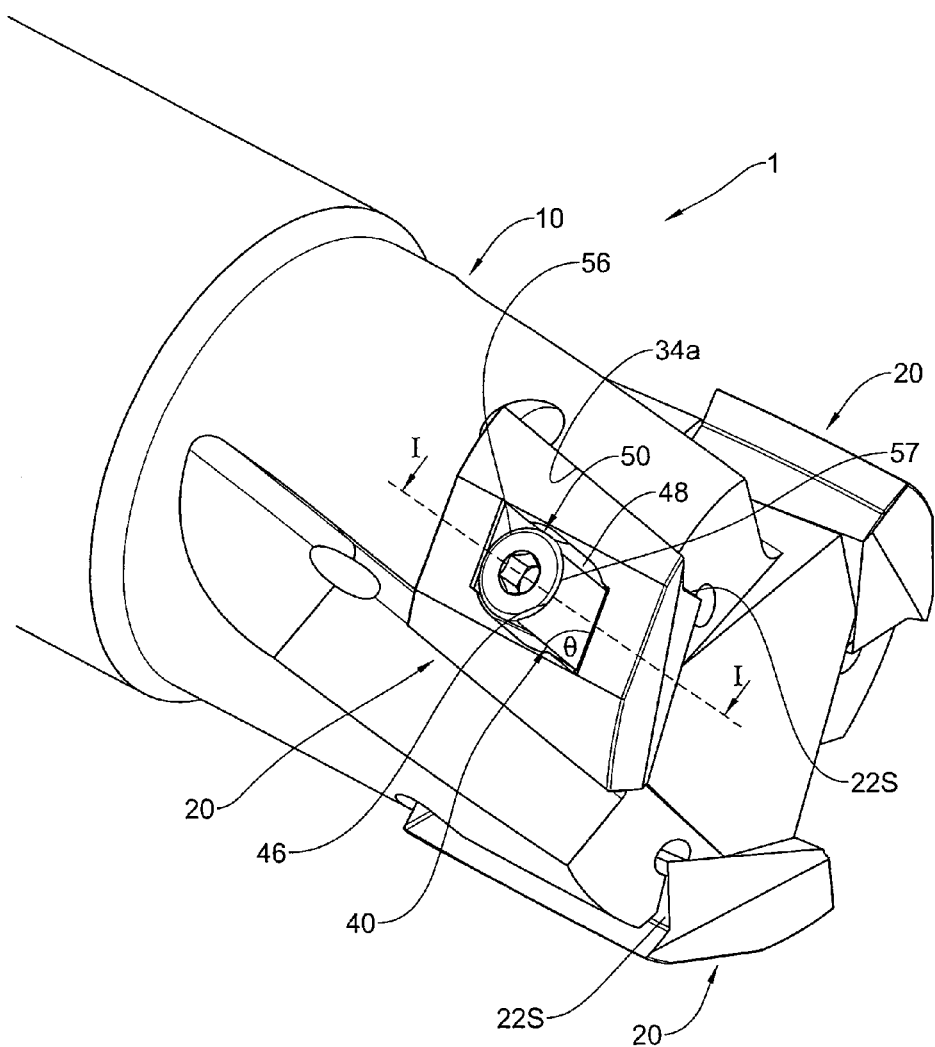
FIG. 4A is a schematic isometric enlarged view of detail A shown in FIG. 1A.
Figure 4B:
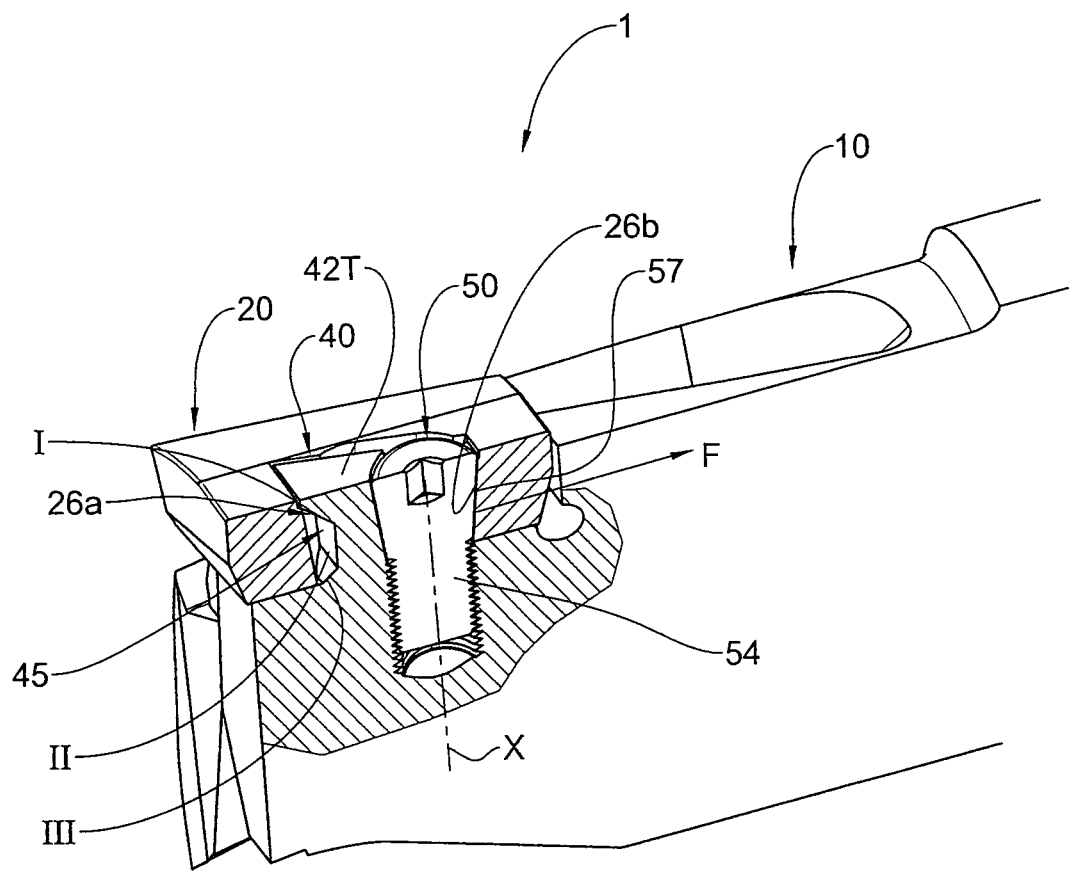
FIG. 4B is a schematic isometric cross-section view of the cutting tool shown in FIG. 4A taken along line I-I shown therein.
Figure 4C:
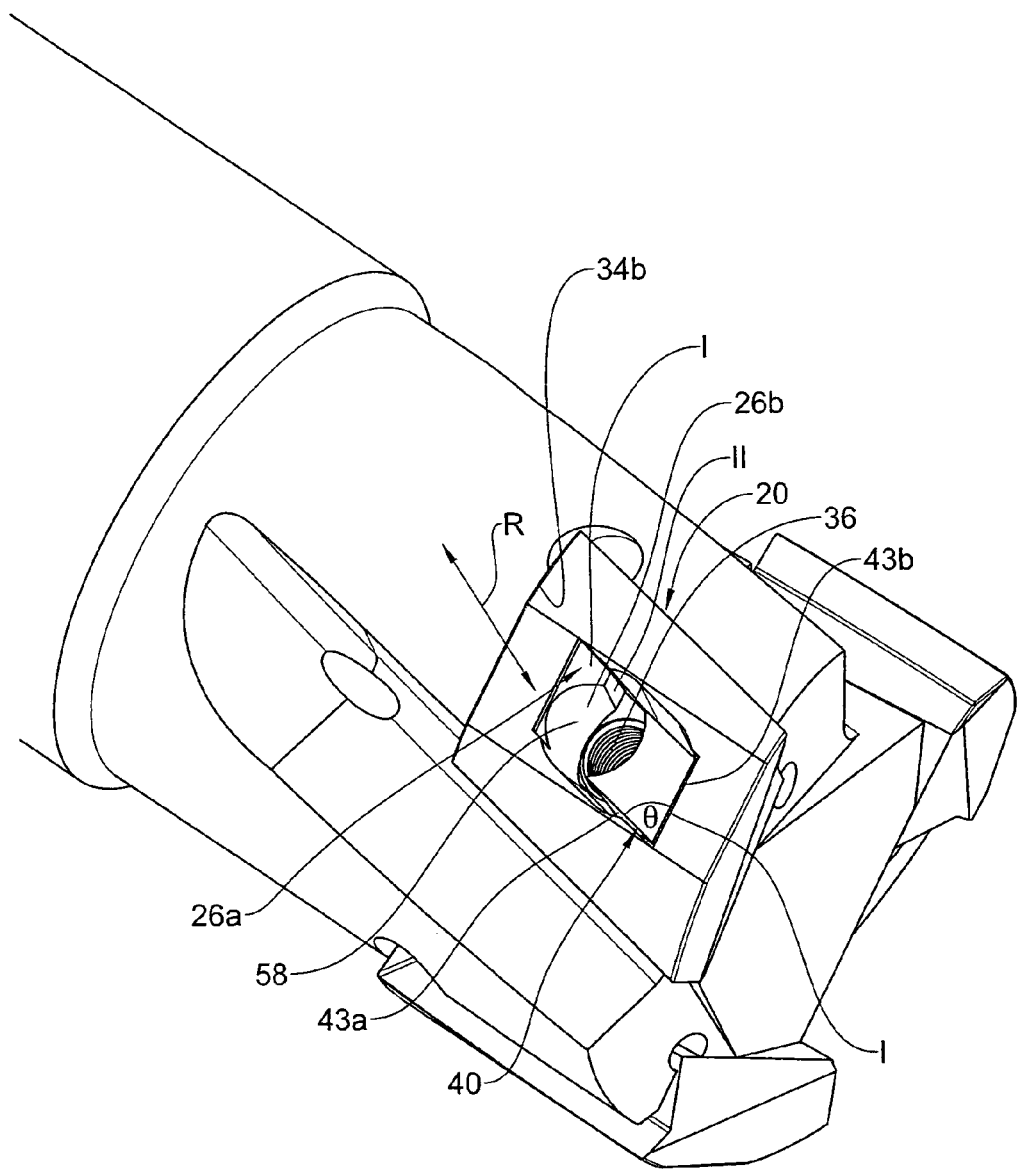
FIG. 4C is a schematic isometric view of the cutting tool shown in FIG. 4A, shown during assembly of the cutting insert thereof, prior to insertion of a fastening element.

Turning now to FIG. 4C, the cutting insert 20 is shown during mounting onto the insert seat 30, before the fastening member 50 has been inserted into the insert seat 30. In mounting, the cutting insert 20 is placed over the shoulder 42 such that the shoulder 42 is received within the opening 23 of the cutting insert 20. In this position, the securing portion 26b of the cutting insert and the opposite side wall 46 of the shoulder 42 form together part of a conical space 58 adapted to receive the fastening member 50, and corresponding in shape thereto, i.e. the diameter of the cross-section of the space 58 decreasing towards the base surface 32B. It should be noted that the side wall 46 of the shoulder 42 is a direct extension of the inner surface of the fastening bore 36. Also, in this position, the cutting insert 20 is still loosely mounted onto the insert seat 30 and may displace laterally back and forth in the direction of arrow R.

Once positioned on the insert seat 30, the fastening member 50 (shown FIGS. 4A, 4B) is inserted into the conical space 58 such that the stem 54 of the fastening member 50 is threaded into the fastening bore 36 of the insert seat 30. Threading of the fastening member causes displacement of the head portion 56 towards the base surface 32B of the insert seat 30, subsequently causing the conical surface 57 to apply a biasing force to both the cutting insert 20 and the shoulder 42, attempting to push them away from one another. In other words, the head portion 56 acts as a wedge, trying to push the cutting insert 20 away from the shoulder 42.

Since the shoulder is integrally formed with the cutting tool holder 10, and since the cutting insert 20 is laterally displaceable, the biasing force causes the cutting insert 20 to be pushed towards the side walls 34a, 34b to assume the position shown in FIGS. 4A and 4B. It is also important to note that since the cutting insert 20 is biased in the direction of arrow R, the securing portions 26a, 26a' of the cutting insert 20 are simultaneously biased towards the shoulder 42.

Turning now to FIGS. 4A and 4B, the cutting tool 1 is shown with the cutting inserts 20 mounted onto the cutting tool holder 10, and secured thereto using the fastening member 50 and the support element 40. It is observed that in this position, the support element 40, and the fastening member 50 are both received within the same central opening 23 of the cutting insert 20. In particular, the side face 22S' of the cutting insert 20 engages the side wall 34b of the insert seat 30, the external surface 57 of the head portion 56 of the fastening member 50 engages both the securing portion 26b and the side wall 46 of the shoulder 42, and that the side walls 43a, 43b of the shoulder 42 engage the securing portions 26a, 26a' of the cutting insert 20. With particular reference to FIG. 4B, it is observed that the ledge of the securing portion 26a of the cutting insert 20 is received within the nook 45 of the shoulder 42.

In this position, the fastening member 50 applies a biasing force F to the cutting insert 20 towards the corner between the side walls 34a, 34b of the insert seat 30. Due to this biasing force F, the securing portions 26a, 26a' are biased against the side walls 43a, 43b of the shoulder 42, further securing the cutting insert 20. It is also noted that in this position, there is a continuous line of material between a corner C of the cutting insert 20 and the release gap 33 at the corner between the side walls 34a, 34b, being constituted by portions of the cutting insert 20, the shoulder 42 and the fastening member 50.

It is also appreciated, that the cutting inserts 20 used in the cutting tool 1 described above are indexible cutting inserts 20 having two cutting edges 24 each. When it is desired to change the cutting edge 24, the fastening member 50 is removed or slightly unthreaded from the fastening bore 36, and the cutting insert 20 is rotated 180° about the central axis of the fastening bore 36, such that the opposite cutting edge 24 is in effect.

In operation, the side walls 22S of the cutting insert 20 are adapted to serve as rake surfaces, and the peripheral slanting surfaces 22T' are adapted to serve as relief surfaces. It is also important to note in this respect that when the cutting edge 24 in use, i.e. positioned remotely from the side wall 34a, the groove G serves as a rake surface, and when the cutting edge 24 is not in use, i.e. positioned adjacent the side wall 34a, the groove G serves for securing to cutting insert by engaging the shaped side wall 34a of the insert seat.

Figure 5A:
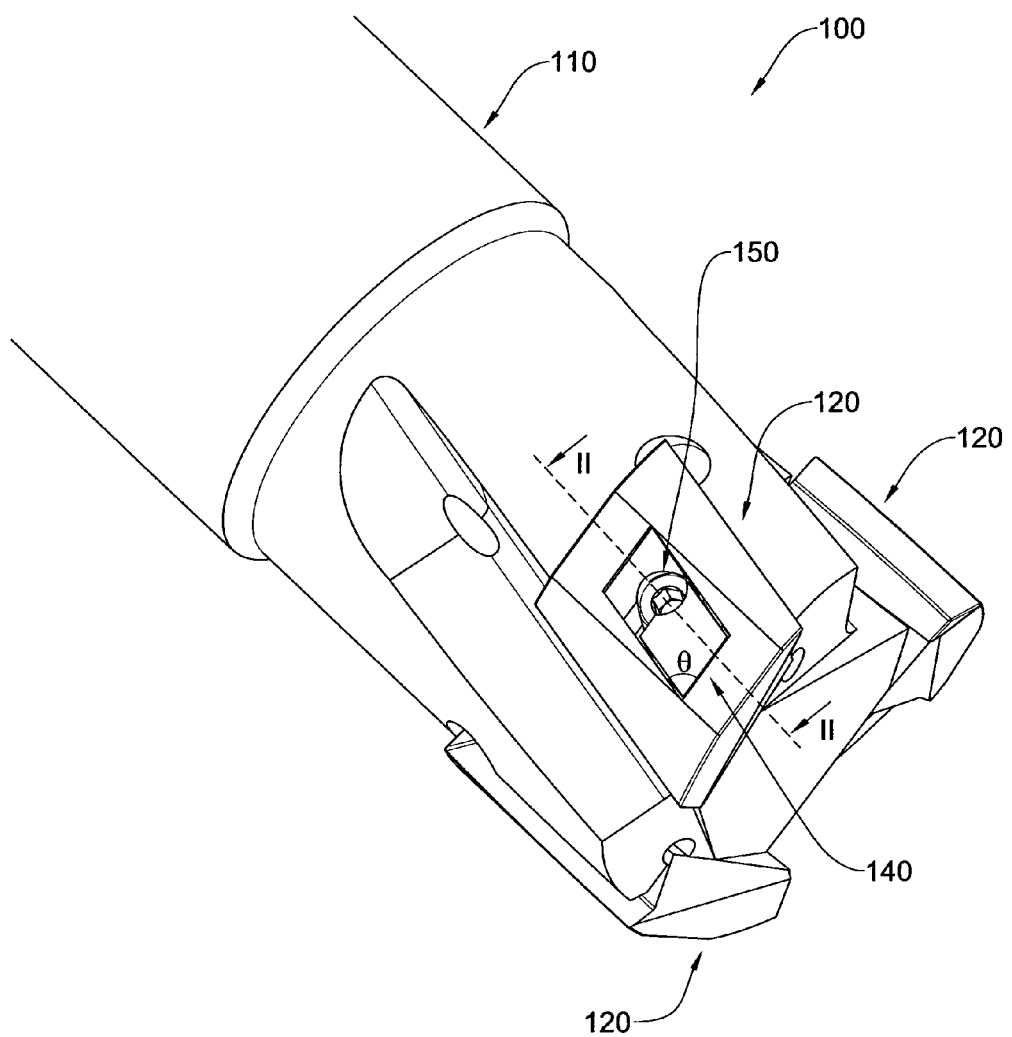
FIG. 5A is a schematic isometric view of a cutting tool according to another embodiment of the disclosed subject matter of the present application.
Figure 5B:
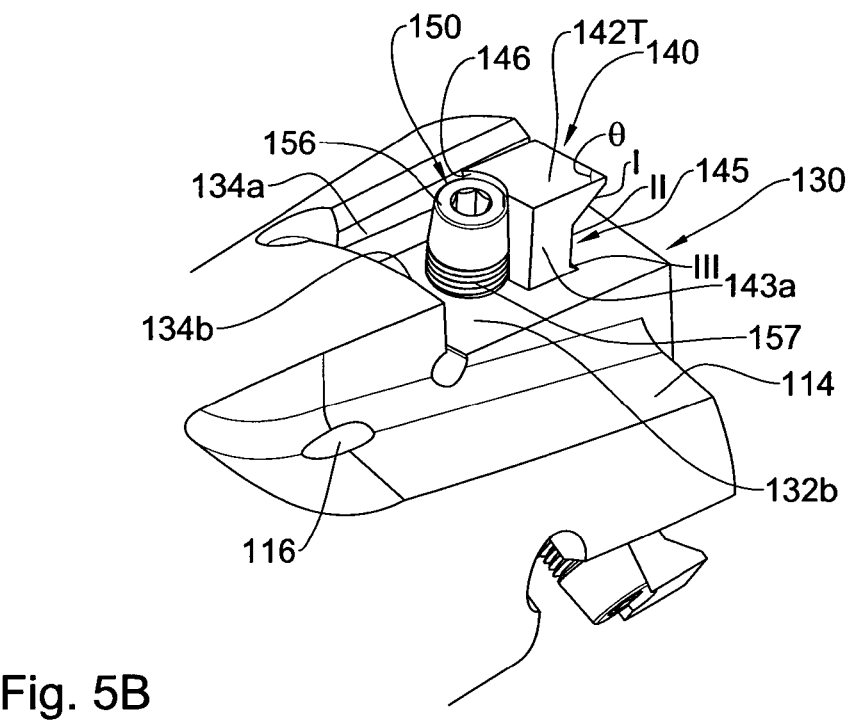
FIG. 5B is a schematic isometric view of a mounting portion of a cutting tool holder used in the cutting tool shown in FIG. 5A.
Figure 5C:
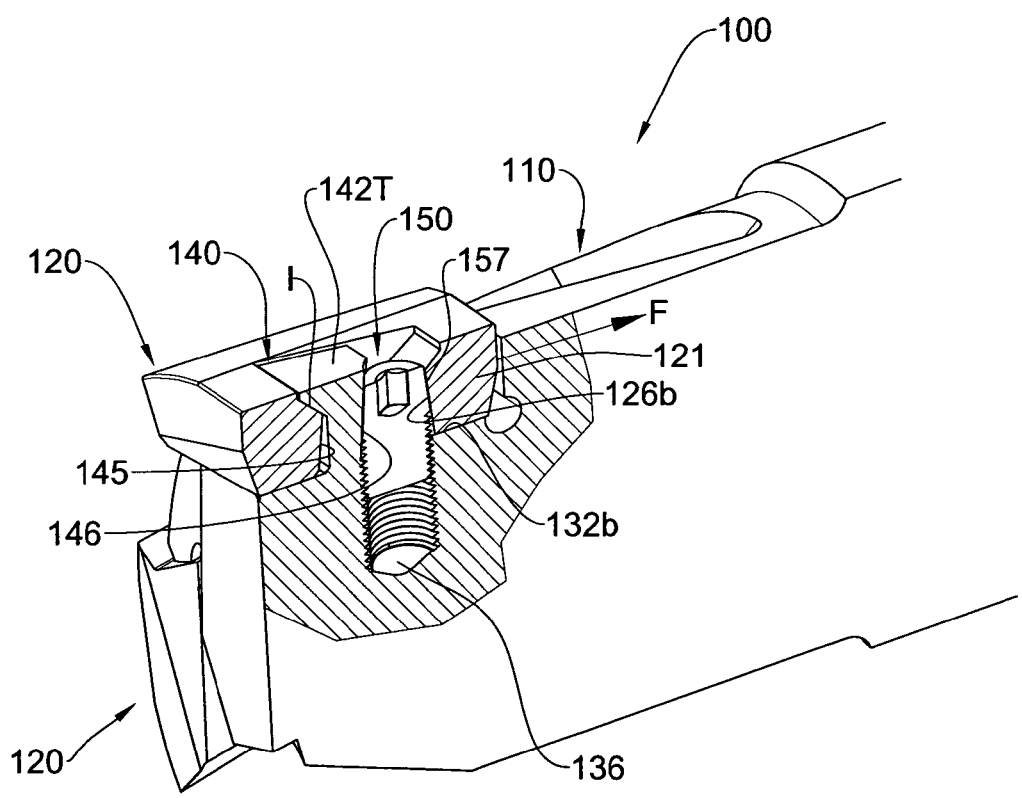
FIG. 5C is a schematic isometric cross-section view of the cutting tool shown in FIG. 5A taken along line II-II shown therein.
Figure 7:
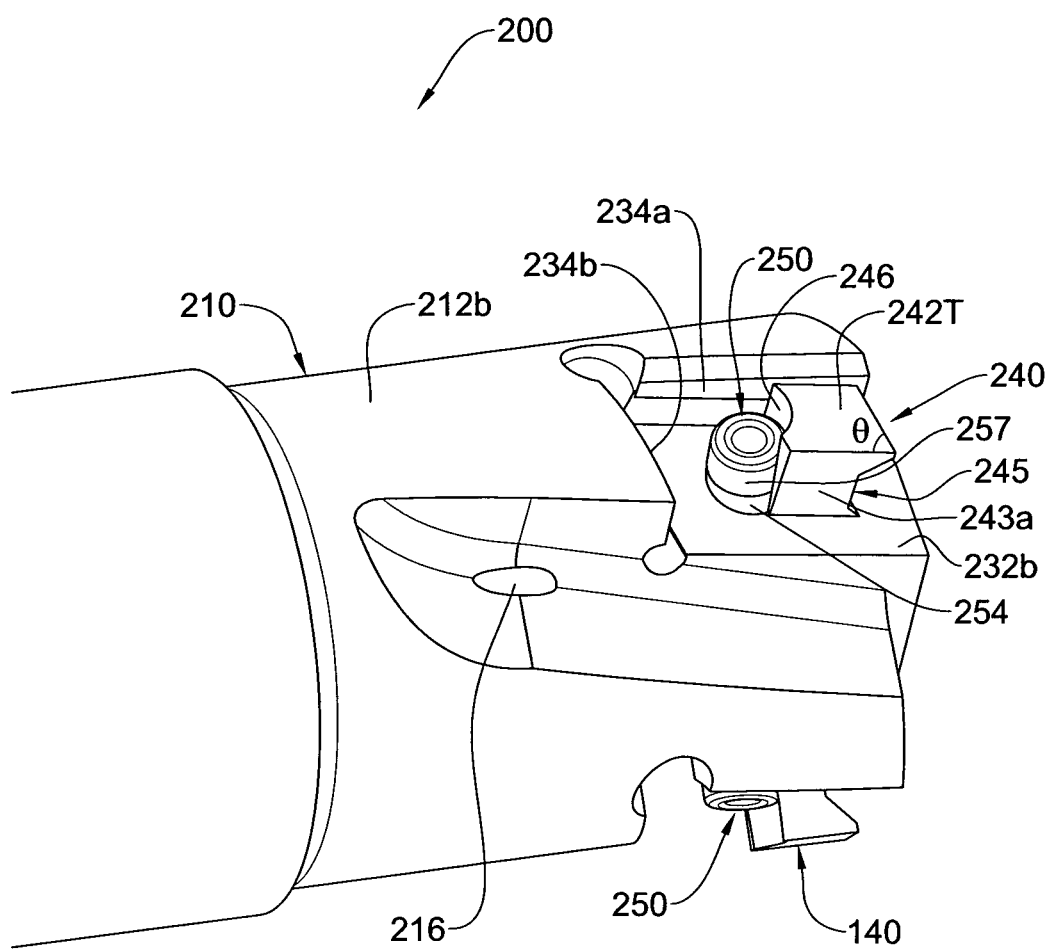
FIG. 7 is a schematic isometric view of a mounting portion of a cutting tool holder used in the cutting tool shown in FIGS. 6A and 6B.
Figure 8A:
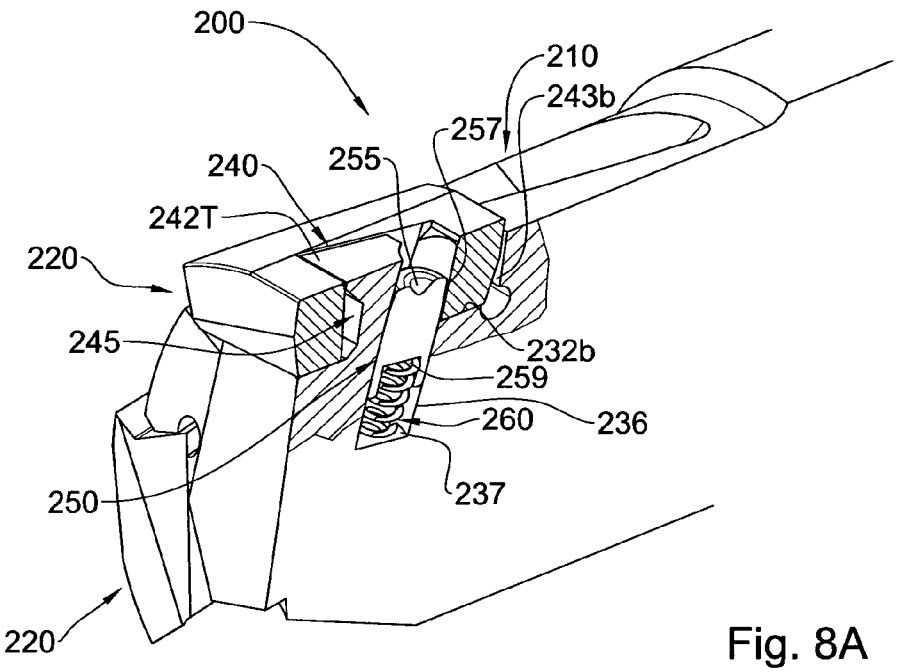
FIG. 8A is a schematic isometric cross-section view of the cutting tool shown in FIG. 6A taken along line III-III shown therein.
Figure 8B:
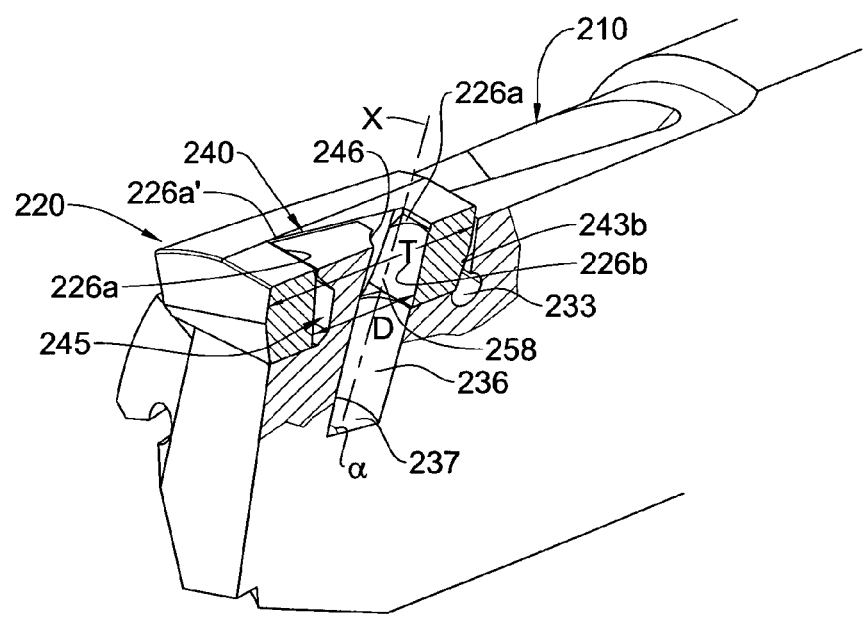
FIG. 8B is a schematic isometric of the cutting tool as shown in FIG. 8A, with the securing pin thereof removed.

Turning now to FIGS. 5A to 5C, another cutting tool is shown, generally designated as 100, comprising a cutting tool holder 110, and three cutting inserts 120 mounted onto insert seats 130, each being secured in place by a securing arrangement comprising a support element 140, being integrally formed with the cutting tool holder 110, and a fastening member 150 adapted to dynamically engage the cutting tool holder 110. For the sake of simplicity, the reference numerals of the cutting tool 100 designating similar elements as elements of the cutting tool 1 have been upped by 100.

The cutting tool 100 is generally similar to the cutting tool 1 with the difference being that, contrary to the previous example, in this case, the conical shape of the head portion 156 is such that the diameter of the cross-section of the external surface 157 is smaller at an end remote from the stem 154 than at the end bordering the stem 154.

Correspondingly, the securing portions 126b of the cutting insert 120, as well as the side walls 146 of the shoulder 142 are tapered to form a conical space 158 which matches the external surface 157 of the head portion 156, i.e. the diameter of the cross-section of the space 158 increases towards the base surface 32B.

In assembly, mounting the cutting insert 120 is fairly similar to that described with respect to the cutting tool 1, however, in the present example, the fastening member 150 is first screwed into the fastening bore 136, then the cutting insert 120 is positioned in the insert seat 130, and finally, the fastening member 150 may be partially unscrewed from the fastening bore 136 until the cutting insert 120 is secured in place.

It is important to emphasize that the difference between the present example (cutting tool 100) and the previous example (cutting tool 1), is that, in the present example the fastening member 150 is not required to disengage from the cutting tool holder 110 in order to allow the cutting insert 120 to be mounted onto the cutting tool holder 110. In particular, the fastening member 150 is adapted to assume a first, mounting position, in which it is threaded into the fastening bore 136 of the insert seat 130 and protrudes from the base surface 132B to a first extent, allowing the cutting insert 120 to be mounted onto the insert seat 130, and a second, securing position, in which it is threaded into the fastening bore 136 of the insert seat 130 and protrudes from the base surface 132B to a second extent, greater than the first extent, allowing the cutting insert 120 to be secured onto the insert seat 130.

Thus, throughout the entire use of the cutting tool 100 there is no requirement of removing/disengaging the fastening member 150 from the insert seat 130. This, in turn, may provide, inter alia, a more time-efficient indexing/replacement of the cutting insert as well as prevention of loss of the fastening member during the mounting/dismounting process of the cutting insert 120.

Turning now to FIGS. 6A to 8B, another cutting tool is shown, generally designated as 200. For the sake of simplicity, the reference numerals of the cutting tool 200 designating similar elements as elements of the cutting tool 1 have been upped by 200. The cutting tool 200 comprises a cutting tool holder 210, and three cutting inserts 220 mounted onto insert seats 230, and each being secured in place by a securing arrangement comprising a support element 240, being integrally formed with the cutting tool holder 210, and a fastening member 250 adapted to dynamically engage the cutting tool holder 210.

The cutting tool 200 is generally of similar design to that of cutting tool 1, with the difference being that, in the present example, the fastening member is constituted by a spring biased securing pin 250 positioned within a non-threaded fastening bore 236 of the insert seat 230. In addition, the tapering angle of the securing portions 226b of the cutting insert and of the side walls 243b of the shoulder 242 differs from the previous examples. In the present example, the above securing portions 226b and side walls 243 form a straight cylindrical space 258 adapted for receiving the securing pin 250.

The operation mechanism of the biased securing pin 250 is generally similar to that disclosed in U.S. patent application Ser. No. 12/314,428 to the applicant, which is incorporated herein by reference, in particular, the portions of the specification of the above application pertaining to FIGS. 2A to 44, FIGS. 47 to 49C and FIGS. 59A to 66B therein.

However, contrary to the disclosed in the above referenced application, in the present application the securing pin 250 is supported by the support element 240, in particular, on a side opposite the side which engages the cutting insert 220, thus creating a much more robust structure. In addition, due to the shoulder 242, the diameter of the securing pin may be reduced with respect to the diameter of the securing pin used in the above referenced application, this being done on expense of the shoulder 242. According to a particular example, the diameter of the securing pin 250 of the disclosed subject matter of the present application may be about 5 mm, as opposed to a diameter of 6.5 mm required in the above referenced application, not comprising a support element 240.

Figure 9A:
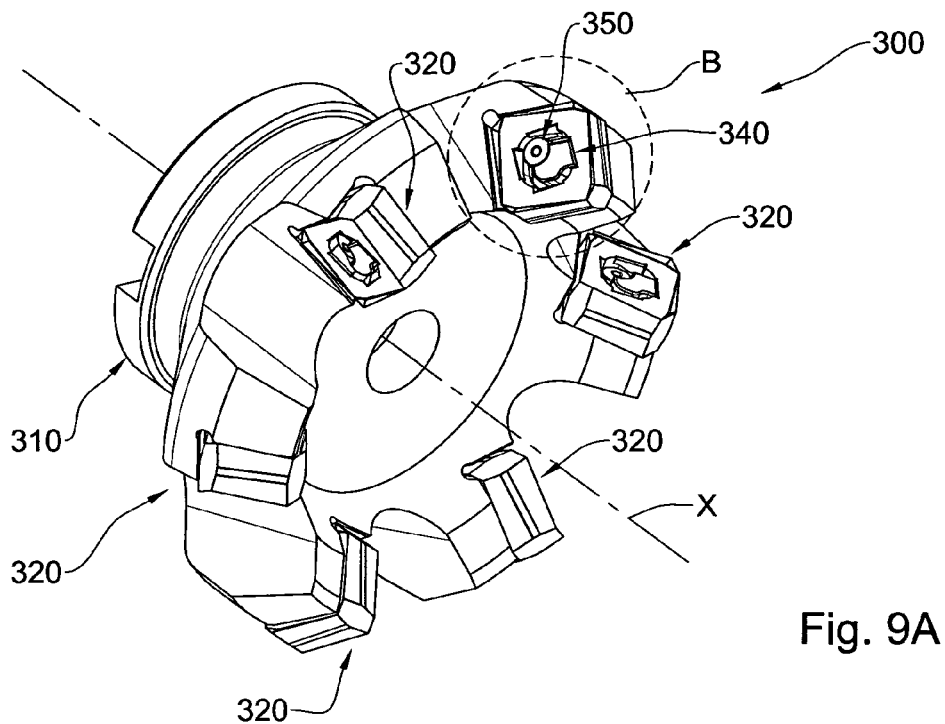
FIG. 9A is a schematic isometric view of a cutting tool according to a further embodiment of the disclosed subject matter of the present application.
Figure 9B:
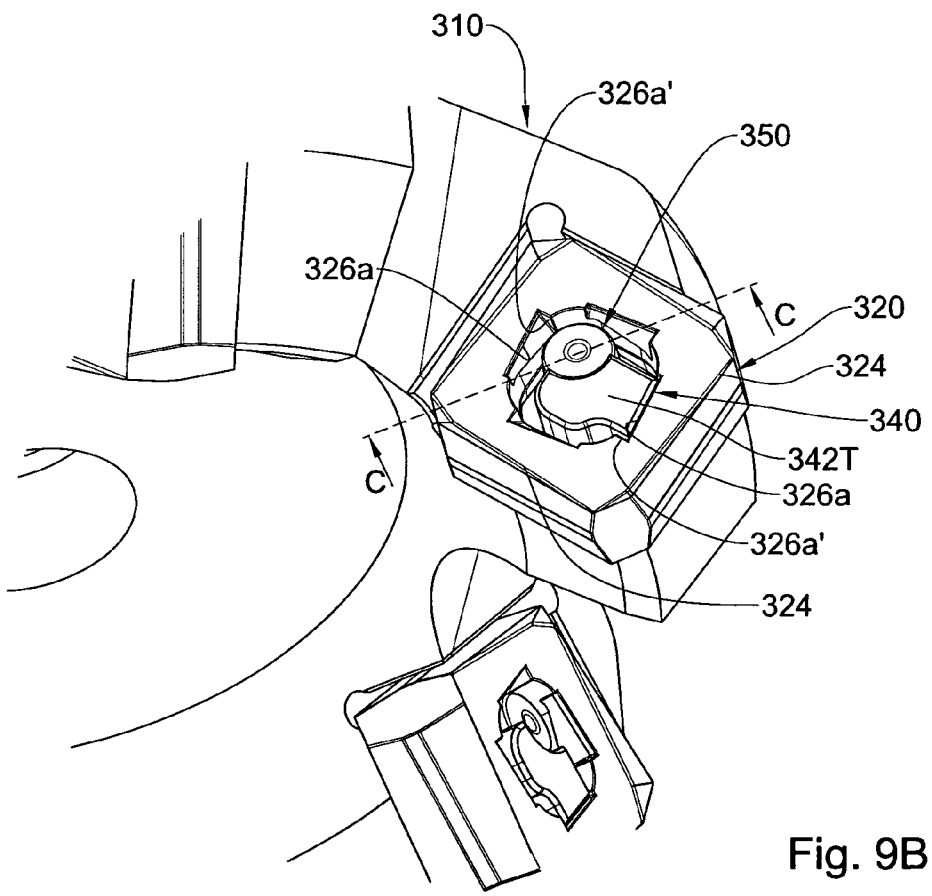
FIG. 9B is a schematic enlarged view of detail B shown in FIG. 9A.

Turning now to FIGS. 9A and 9B, another cutting tool is shown, generally designated as 300. For the sake of simplicity, the reference numerals of the cutting tool 300 designating similar elements as elements of the cutting tool 1 have been upped by 300. The cutting tool 300 comprises a cutting tool holder 310, and six cutting inserts 320 mounted onto insert seats 330, and each being secured in place by a securing arrangement comprising a support element 340, being integrally formed with the cutting tool holder 310, and a fastening member 350 adapted to dynamically engage the cutting tool holder 310.

The cutting tool 300 is generally of similar design to that of cutting tool 200, with the difference being that, contrary to the previous cutting tool (200), the present cutting tool 300 is an axial cutting tool and comprises six cutting inserts 320.

With particular attention drawn to FIGS. 10A to 10C, each insert 320 is an indexible and reversible cutting insert 320. In particular, each cutting insert 320 is formed with respective top face and bottom face 322T, 322B, with four side walls 322S extending therebetween, such that for each side wall 322S, two cutting edges 324T, 324B are defined—one at the intersection of the side walls 322S with the top face 324T, and one at the intersection between the side wall 322S and the bottom face 322B. Thus, each cutting insert 320 is formed with eight cutting edges—four top cutting edges 324T, and four bottom cutting edges 324B.

During a cutting operation, the side walls 322S of the cutting insert 320 are adapted to serve as rake surfaces, and the top and bottom faces 322T, 322B are adapted to serve as relief surfaces.

It is further observed that since the cutting insert 320 is indexible and reversible, and has eight cutting edges 324T, 324B respectively, the central opening 323 thereof has a unique design, being formed with four sets of first securing portions 326a, 326a' associated with the four top cutting edges 324T and additional four sets of first securing portions 326a, 326a' associated with the four bottom cutting edges 324B. The cutting insert 320 is also formed with four sets of second securing portions 326b, associated with the four top cutting edges 324T and additional four sets of second securing portions 326b, associated with the four bottom cutting edges 324B.

It is observed that in this particular example, the central cavity 323 is of a generally square shape such that each of the securing portions 326a, 326a' is constituted by one of the four side walls 326S of the inner surface of the cavity 323 and each of the securing portions 326b is constituted by one of the four rounded corners 326R.

Figure 11A:
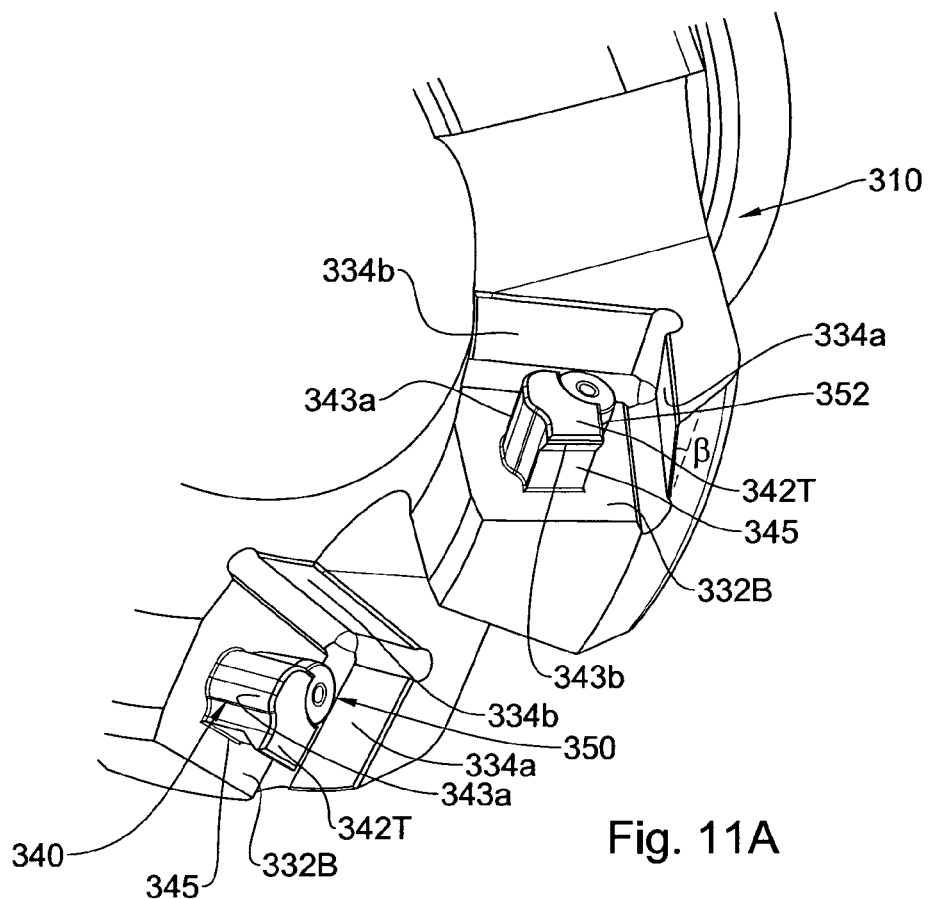
FIG. 11A is a schematic enlarged view of a mounting portion of a cutting tool holder used in the cutting tool shown in FIGS. 9A and 9B.
Figure 11B:
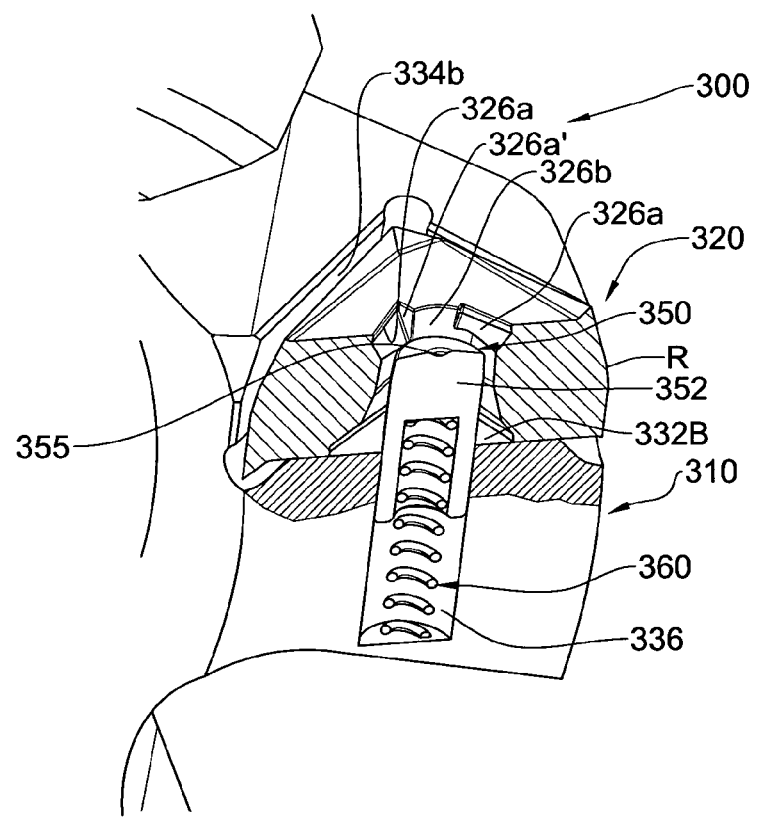
FIG. 11B is isometric cross-section view of the cutting tool shown in FIG. 9B taken along line C-C shown therein.
Figure 12A:
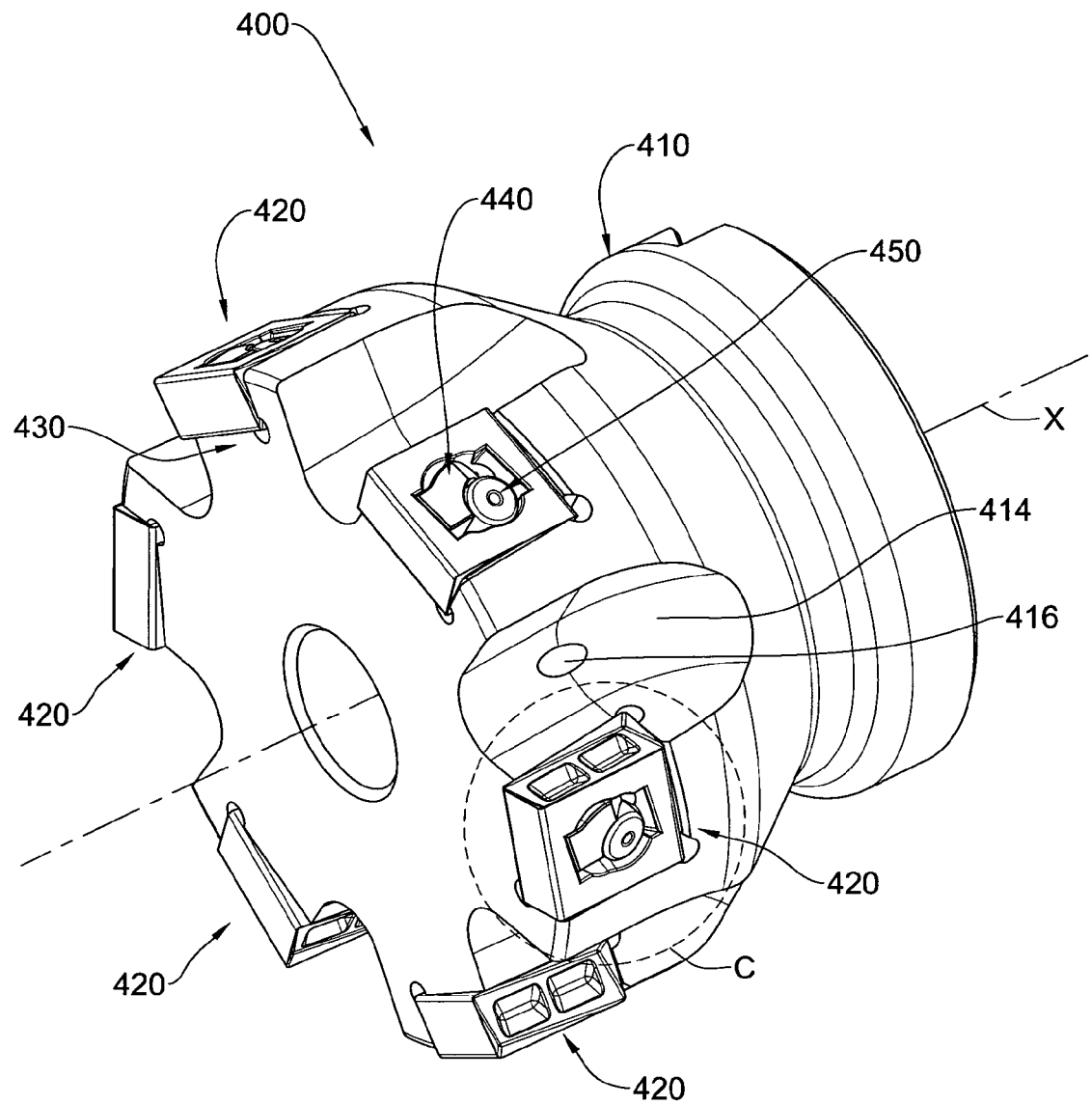

In addition, contrary to the previous example, in the present example the side walls 322S of the cutting insert 320 have a slightly protruding ridge R (instead of a groove G as in the example of FIGS. 1A to 4B). With particular reference to FIGS. 11A and 11B, it is noticed that correspondingly, the side walls 334a, 334b of the insert seat 330 of the cutting tool holder 310 are tapered inwardly in a matching (negative) angle, so as to properly engage the cutting insert 320 when positioned in place.

In the cutting tool 300, the fastening member 350 is a securing pin 352 adapted to function in a similar manner to the securing pin 252 of the cutting tool 200, and therefore will not be described in detail with respect to the above example.

Turning now to FIGS. 12A to 14C, still another cutting tool is shown, generally designated as 400. For the sake of simplicity, the reference numerals of the cutting tool 400 designating similar elements as elements of the cutting tool 1 have been upped by 400. The cutting tool 400 comprises a cutting tool holder 410, and six cutting inserts 420 mounted onto insert seats 430, and each being secured in place by a securing arrangement comprising a support element 440, being integrally formed with the cutting tool holder 410, and a fastening member 450 adapted to dynamically engage the cutting tool holder 410.

The cutting tool 400 is generally of similar design to that of cutting tool 300, with the difference being that it is a tangential cutting tool and comprises six cutting inserts 420.

With reference to FIGS. 13A to 13C, each cutting insert 420 is indexible and reversible. In particular, each cutting insert 420 is formed with respective top face and bottom face 422T, 422B, with four side walls 422S, 422S' extending therebetween, such that for each of the side walls 422S, two cutting edges 424T, 424B are defined—one at the intersection of the side wall 422S with the top face 424T, and one at the intersection between the side wall 422S and the bottom face 422B. Thus, each cutting insert 420 is formed with four cutting edges—two top cutting edges 424T, and two bottom cutting edges 424B.

It is further observed that since the cutting insert 420 is indexible and reversible, and has fours cutting edges 424T, 424B respectively, the central opening 423 thereof has a unique design, being formed with four sets of first securing portions 426a, 426a' associated with the four top cutting edges 424T and additional four sets of first securing portions 426a, 426a' associated with the four bottom cutting edges 424B. The cutting insert 420 is also formed with four sets of second securing portions 426b, associated with the four top cutting edges 424T and additional four sets of second securing portions 426b, associated with the four bottom cutting edges 424B.

Figure 14A:
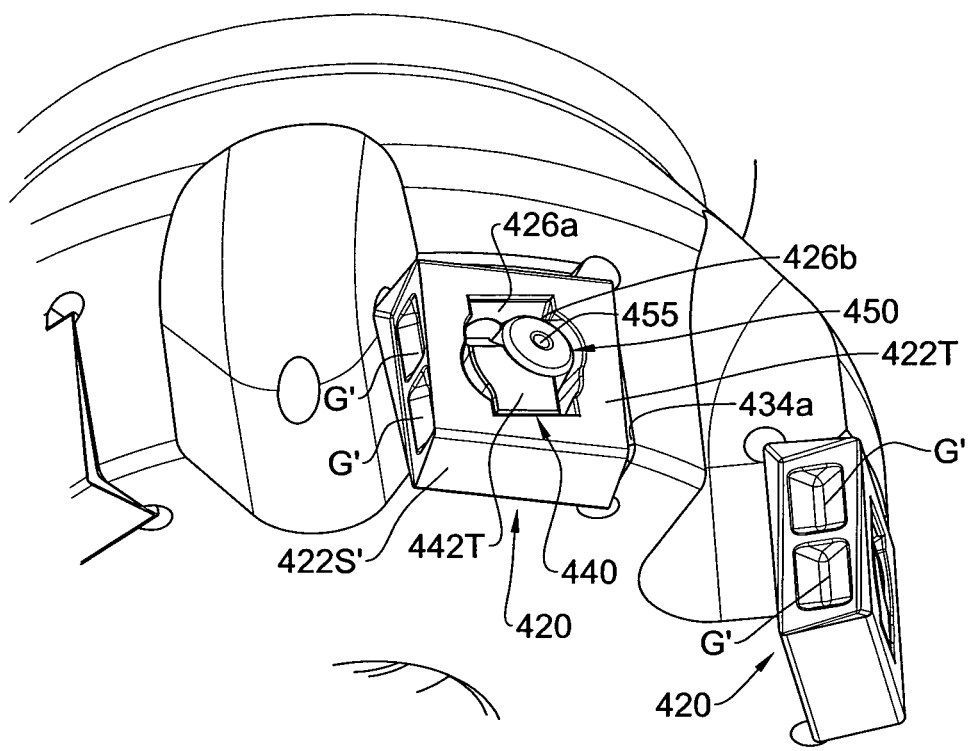
FIG. 14A is a schematic enlarged view of detail C shown in FIG. 12A.
Figure 14B:
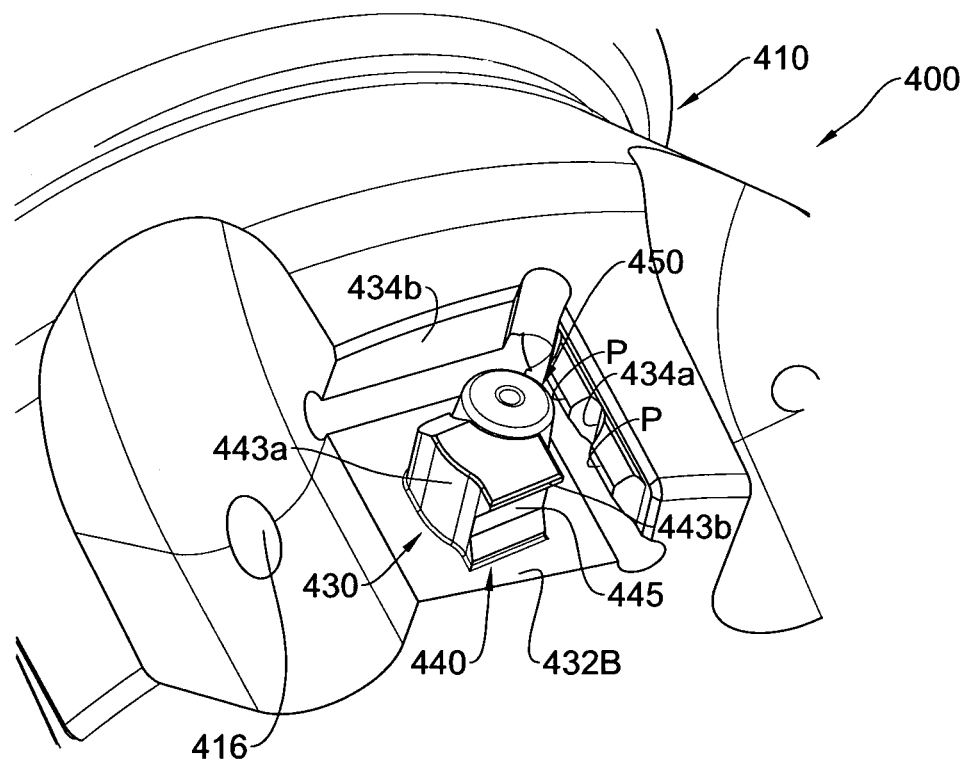
FIG. 14B is a schematic enlarged isometric view of a mounting portion of a cutting tool holder used in the cutting tool shown in FIGS. 12A to 12D.
Figure 14C:
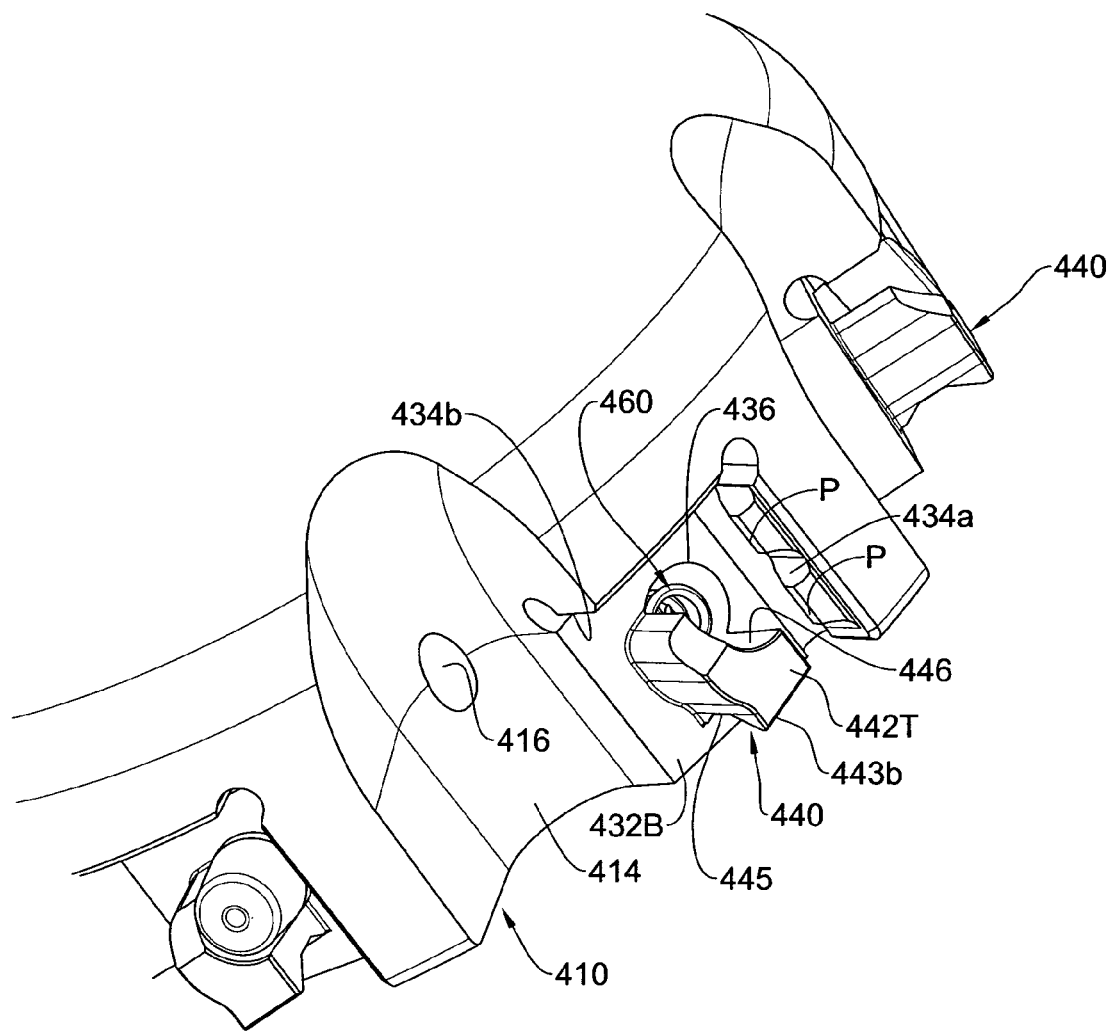
FIG. 14C is a schematic isometric view of the mounting portion shown in FIG. 14B with part of a securing mechanism thereof removed.
Figure 15A:
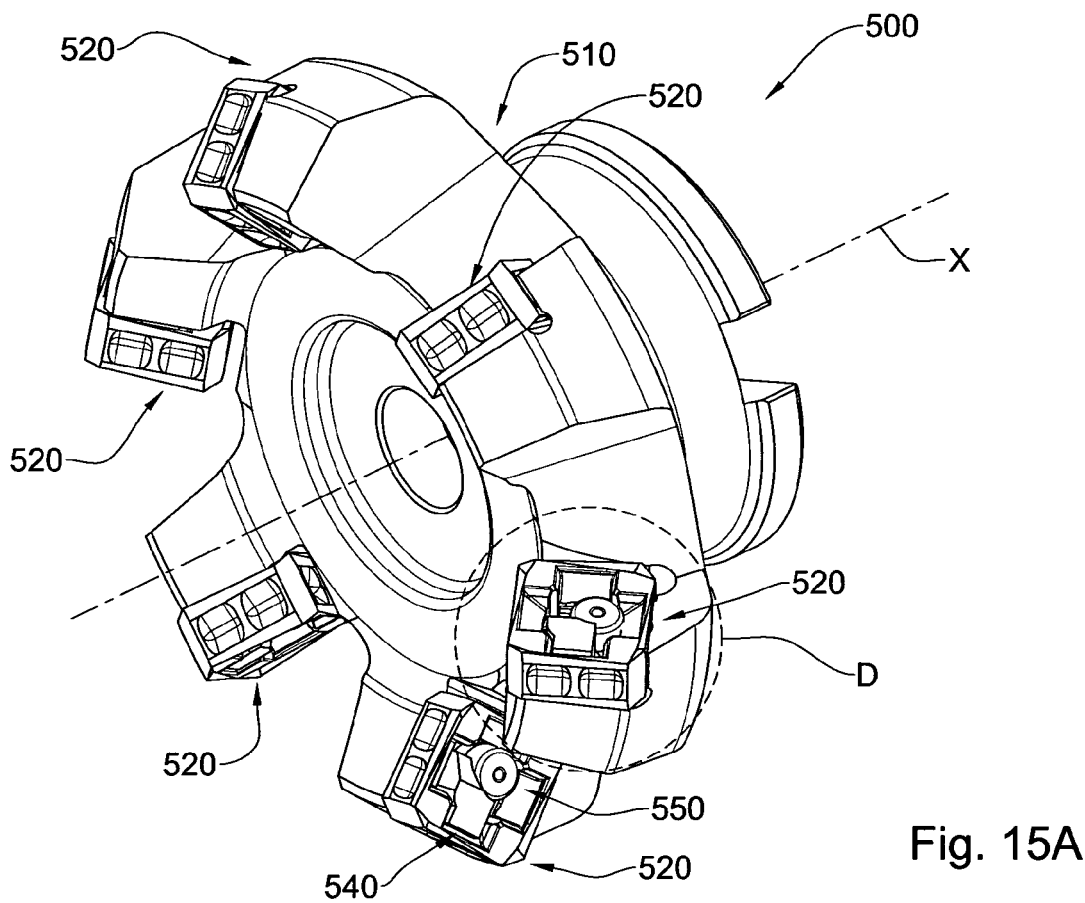
Figure 15B:
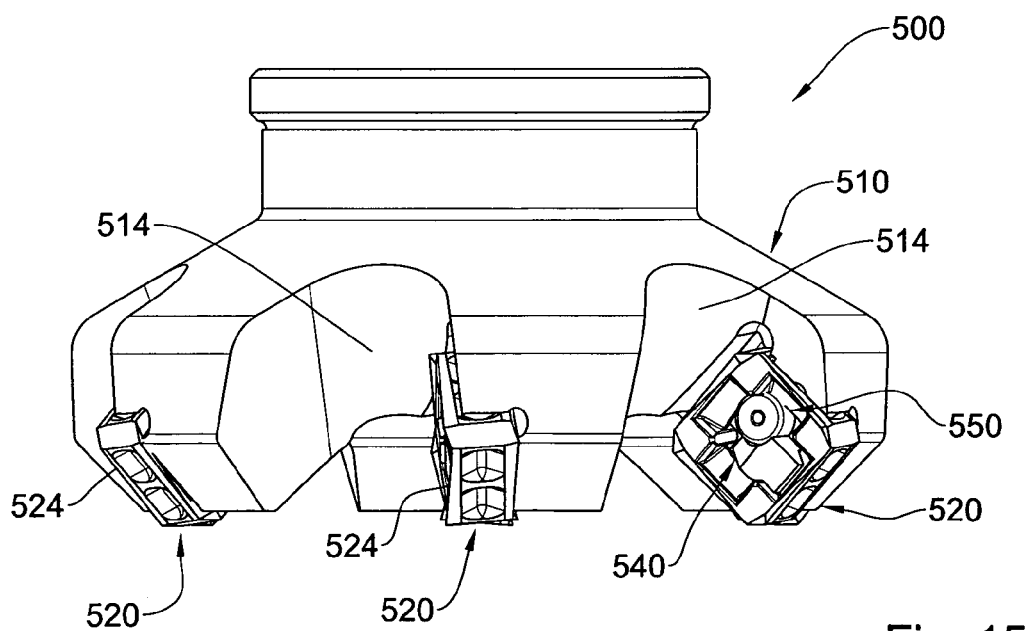

In addition, contrary to the previous example, in the present example, only the side walls 422S are formed with cutting edges 424T, 424B, and thus are also the only one to be formed with a double set of grooves G'. With particular reference to FIGS. 14B and 14C, it is noticed that correspondingly, the side walls 434a, 434b of the insert seat 430 of the cutting tool holder 410 are formed with respective v-shaped protrusions P adapted to be received within the grooves G' so as to properly engage the cutting insert 420 when positioned in place.

In the cutting tool 400, the fastening member 450 is a securing pin 452 adapted to function in a similar manner to the securing pin 252 of the cutting tool 200, and therefore will not be described in detail for the present application. Attention is drawn to FIG. 14C, in which it is observed that, similarly to the previous embodiments, the side wall 446 of the support element 440 has a cylindrical shape, whereby, when the cutting insert 420 is mounted onto the insert seat 430, the side wall 446 of the support element and the securing portion 426b of the cutting insert 420 form together a space into which the securing pin 452 is adapted to extend to thereby secure the cutting insert 420 in place.

In operation, the side walls 422S of the cutting insert 420 are adapted to serve as rake surfaces, and the top and bottom faces 422T, 422B are adapted to serve as relief surfaces.

Attention is now drawn to FIGS. 15A to 17B, in which another cutting tool is shown generally designated as 500. For the sake of simplicity, the reference numerals of the cutting tool 500 designating similar elements as elements of the cutting tool 1 have been upped by 500. The cutting tool 500 comprises a cutting tool holder 510, and six cutting inserts 520 mounted onto insert seats 530, and each being secured in place by a securing arrangement comprising a support element 540, being integrally formed with the cutting tool holder 510, and a fastening member 550 adapted to dynamically engage the cutting tool holder 510.

With particular reference to FIGS. 16A to 16C, the cutting tool 500 is generally of similar design to that of cutting tool 400, with the difference being in the design of the cutting inserts 520 and the insert seats 530 of the cutting tool holder 510. In particular, the cutting tool 500 comprises six cutting inserts 520. Each cutting insert 520 is an indexible and reversible cutting insert 520. In particular, each cutting insert 520 is formed with respective top face and bottom face 522T, 522B, with four side walls 522S extending therebetween, such that for each of the side walls 522S, two cutting edges 524T, 524B are defined—one at the intersection of the side wall 522S with the top face 524T, and one at the intersection between the side wall 522S and the bottom face 522B. Thus, each cutting insert 520 is formed with eight cutting edges—four top cutting edges 524T, and four bottom cutting edges 524B.

It is further observed that since the cutting insert 520 is indexible and reversible, and has eight cutting edges 524T, 524B respectively, the central opening 523 thereof has a unique design—contrary to the previous examples, the design of the central opening 523 of the cutting insert 520 is completely symmetric, being formed with four sets of first securing portions 526a, and four sets of second securing portions 526b. The arrangement is such that each of the first securing portions 526a is in the form of a v-shaped ridge adapted to be received within the corresponding nook 545 of the support element 540, when the cutting insert 520 is mounted into the insert seat 530.

Furthermore, it is noted that each side wall 522S is formed with a set of two v-shaped indents G', the arrangement being such that when the cutting insert 520 is mounted onto the insert seat 530, the indents G' of the side wall 522 facing the side wall 534a of the insert seat 530 engage the v-shaped ridges P' of the side wall 534a, thereby further securing the cutting insert 520 in place.

Figure 17A:
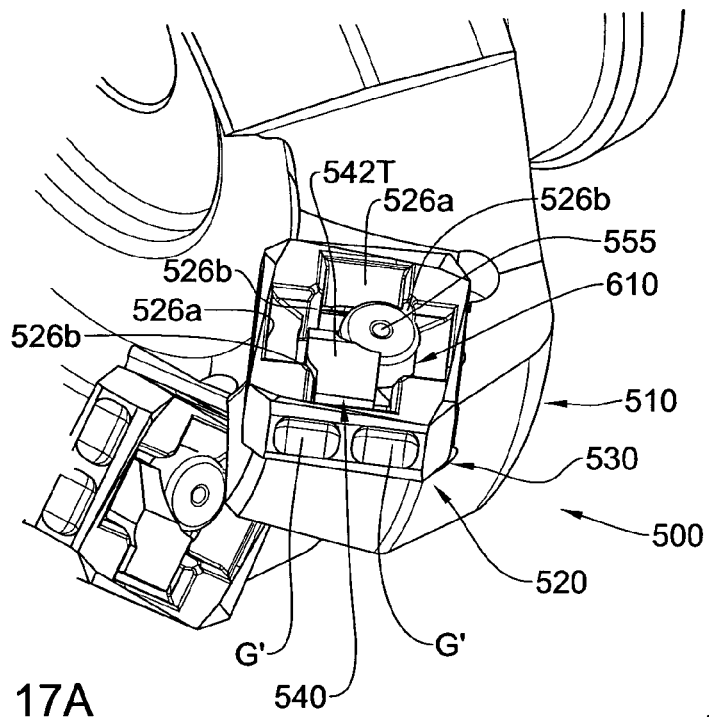
FIG. 17A is a schematic enlarged view of detail D shown in FIG. 15A.
Figure 17B:
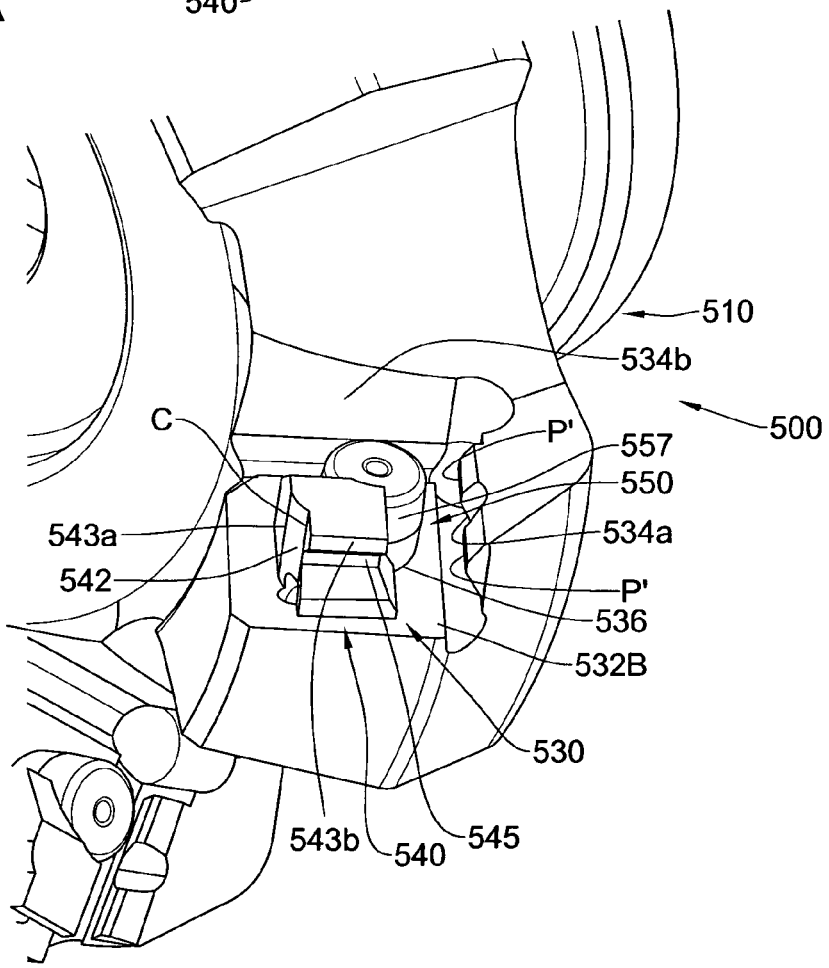
FIG. 17B is a schematic enlarged isometric view of a mounting portion of a cutting tool holder used in the cutting tool shown in FIGS. 15A to 15D.
Figure 18:
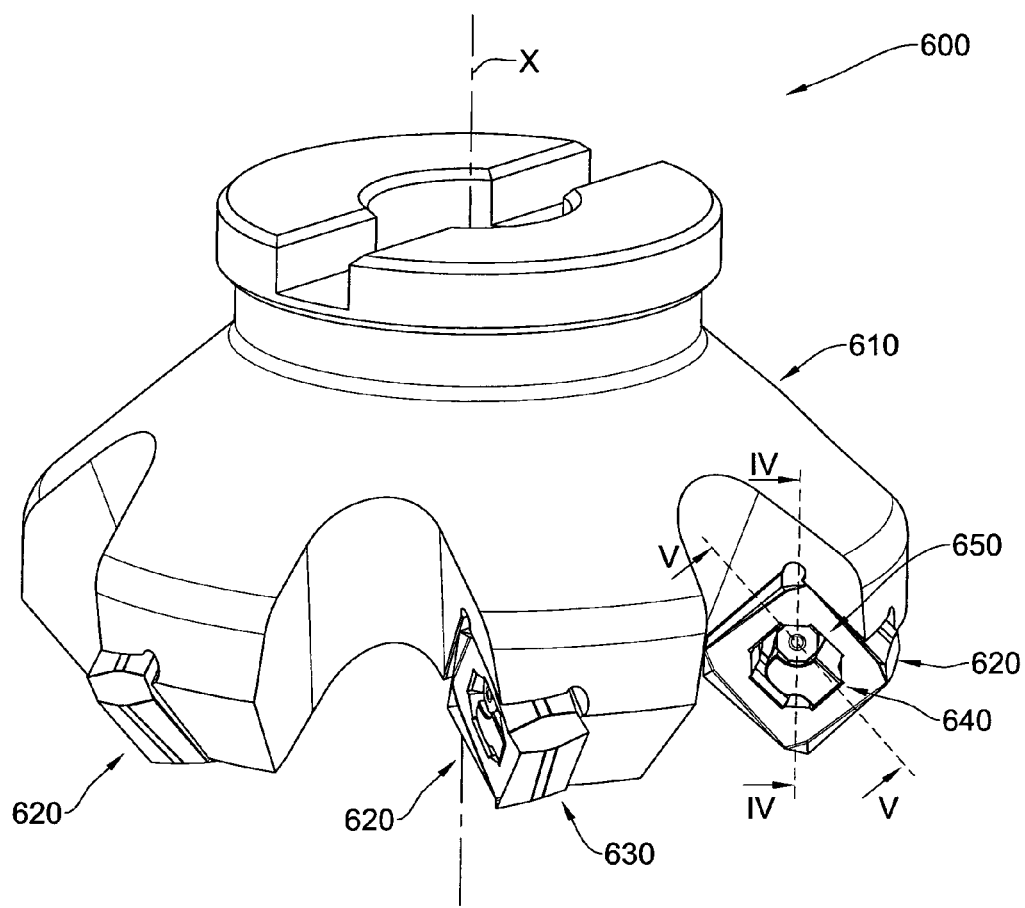
FIG. 18 is schematic isometric view of a cutting tool according to still another embodiment of the disclosed subject matter of the present application.
Figure 20A:
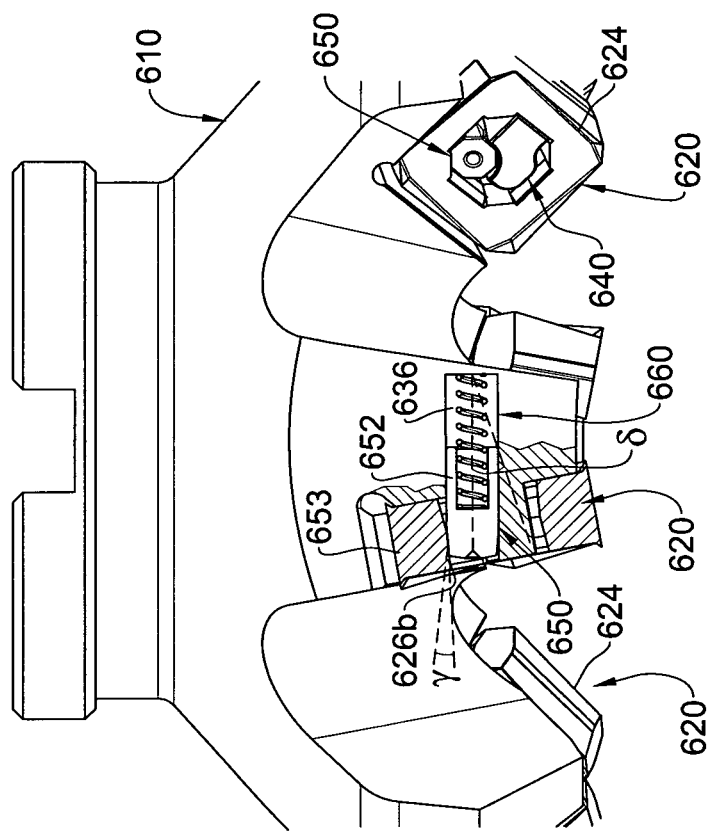
FIG. 20A is a schematic cross-section view of the cutting tool shown in FIG. 18 taken along line IV-IV therein.
Figure 19:
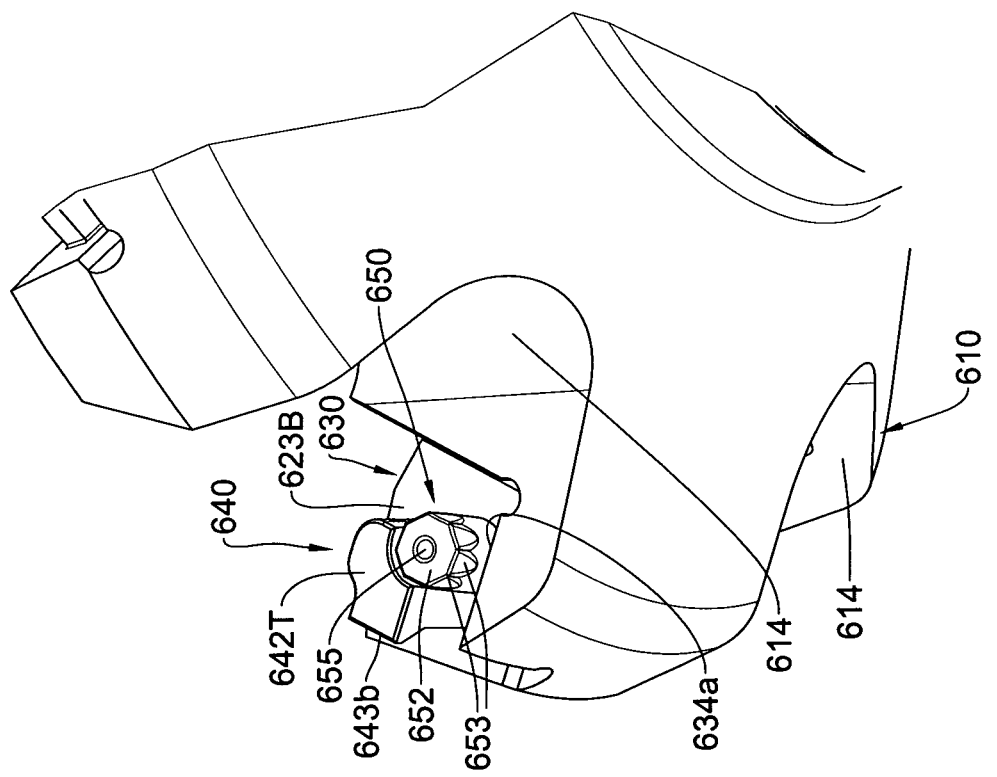
FIG. 19 is a schematic isometric view of a mounting portion of a cutting tool holder used in the cutting tool shown in FIG. 18.
Figure 21:
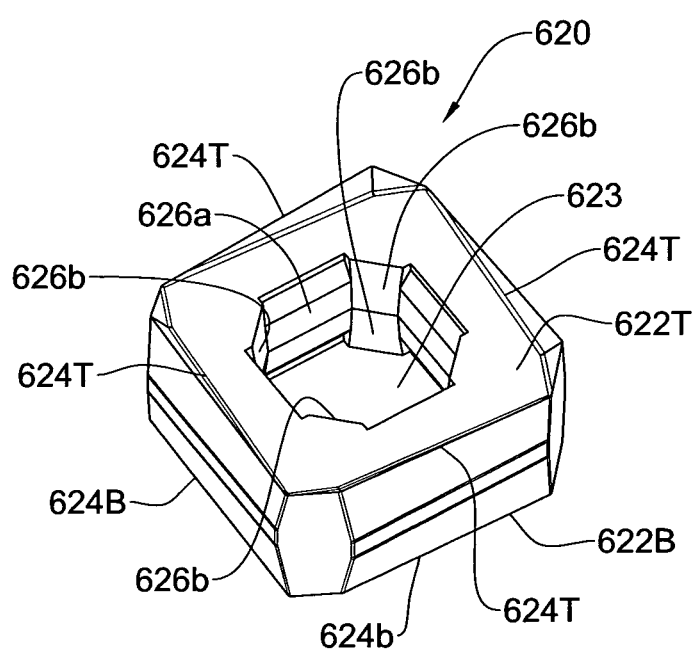
FIG. 21 is a schematic isometric view of a cutting insert used in the cutting tool shown in FIG. 18.

Attention is now drawn to FIGS. 17A and 17B, in which it is observed that the shoulder 542 is formed with a cut-out corner C between the side walls 543a and 543b. It is also noted that when the cutting insert 520 is mounted onto the insert seat 530, the second securing portion 526b located diagonally opposite the securing portion 526b engaging the securing pin 552, engages the corner C of the shoulder 542. Thus, it should be understood that the second securing portion 526b, when located diagonally opposite from the portion 526b engaging the securing pin 552, also serves as a securing portion for the shoulder 542, further increasing the firmness of the entire cutting tool 500.

In the cutting tool 500, the fastening member 550 is a securing pin 552 adapted to function in a similar manner to the securing pin 252 of the cutting tool 200, and therefore will not be described in detail with respect to the above example.

In operation, the side walls 522S of the cutting insert 520 are adapted to serve as relief surfaces and the top and bottom faces 522T, 522B are adapted to serve as rake surfaces.

Turning now to FIGS. 18 through 21, another cutting tool is shown, generally designated 600. For the sake of simplicity, the reference numerals of the cutting tool 600 designating similar elements as elements of the cutting tool 1 have been upped by 600.

The cutting tool 600 is generally of similar design to that of cutting tool 300, with the difference being at least in the following elements:

the head portion 656 of the securing pin 650 is faceted rather than being round. In this particular example, the securing pin 650 has eight facets 653;

The second securing portions 626b of the cutting insert 620 are straight, and are at an angle corresponding to the angle γ of the facets 653, and inclination angle δ of the securing pin 650.

Thus, it is appreciated that the difference between the present cutting tool 600 including a faceted pin 650 and previously described cutting tools (200, 300, 400 and 500) including a rounded securing pin, is that in the present cutting tool 600 the contact between the securing pin 650 and the securing portion 626b of the cutting insert 620 is provided along two surfaces rather than along a single line of contact.

Furthermore, the facets 653 of the securing pin 650 allow it to align one of its facets 653 against the securing portion 626b by spontaneously rotating about its axis due to a force applied thereto by biasing spring and pressure from the support element 640.

In general, the manner of operation and advantages of the faceted securing pin 650 are similar to those of the faceted pin disclosed in U.S. patent application Ser. No. 12/314,428 to the applicant, which is incorporated herein by reference, in particular, the portions of the specification of the above application pertaining to FIGS. 59A to 65 therein.

Figure 22A:
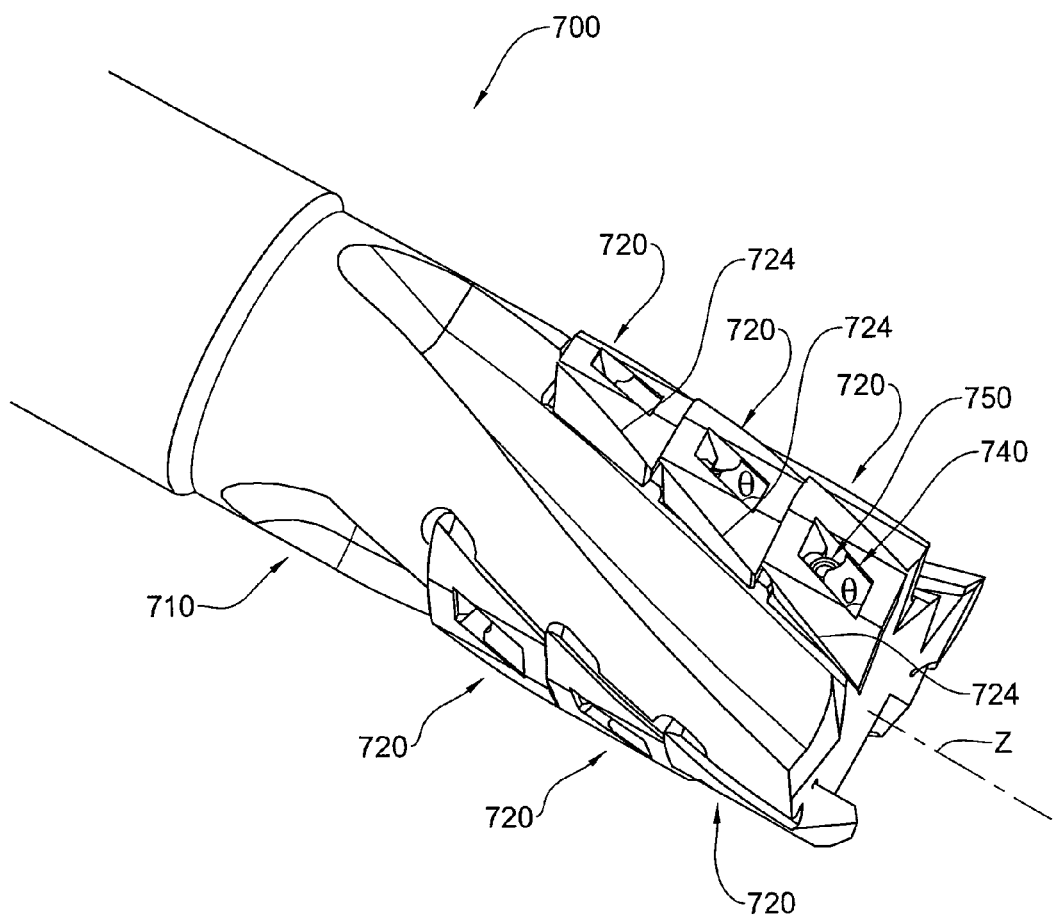
FIG. 22A is a schematic isometric view of a cutting tool according to yet another embodiment of the disclosed subject matter of the present application.
Figure 22B:
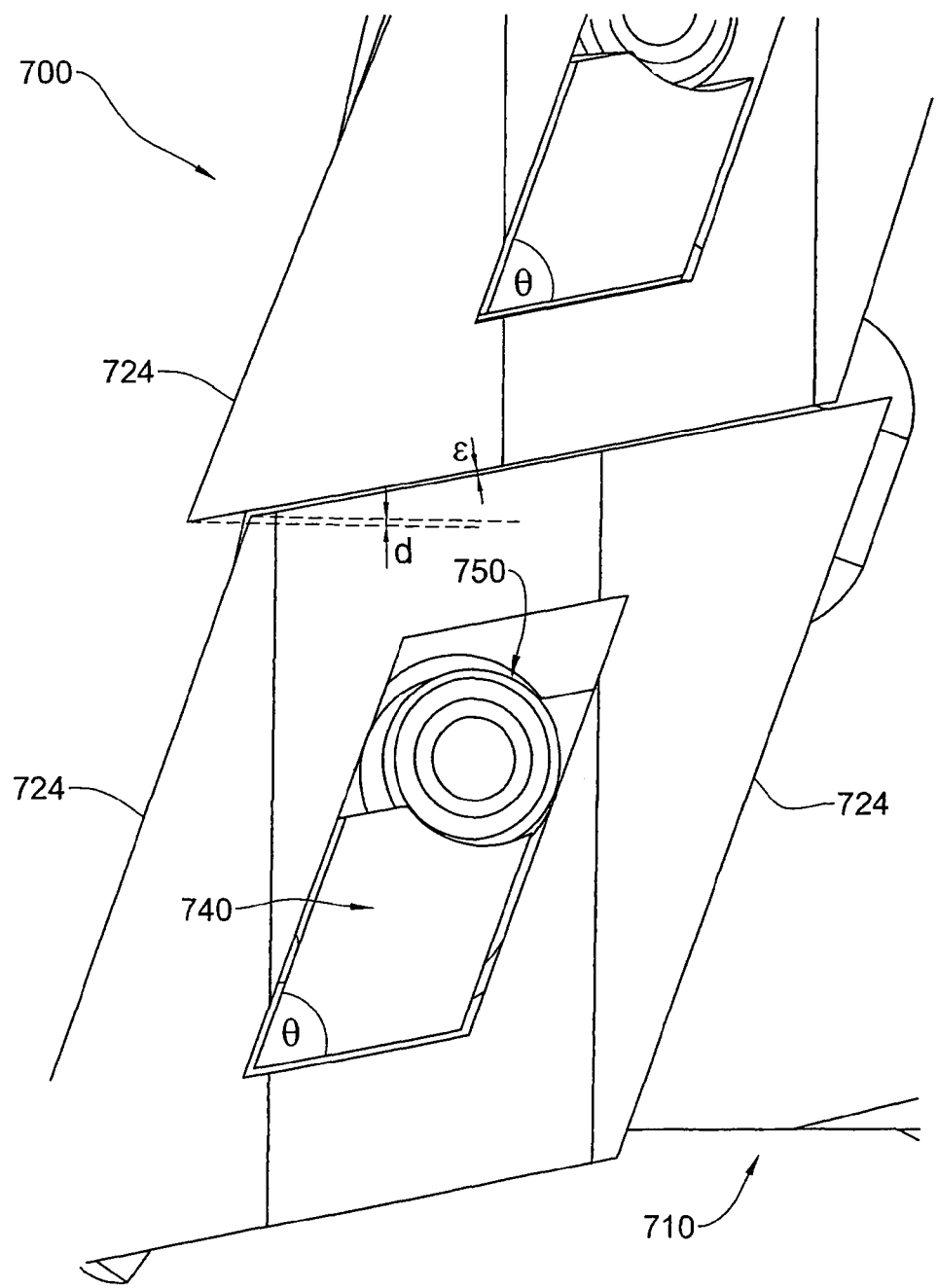
FIG. 22B is a schematic enlarged front view of detail F shown in FIG. 22A.
Figure 23:
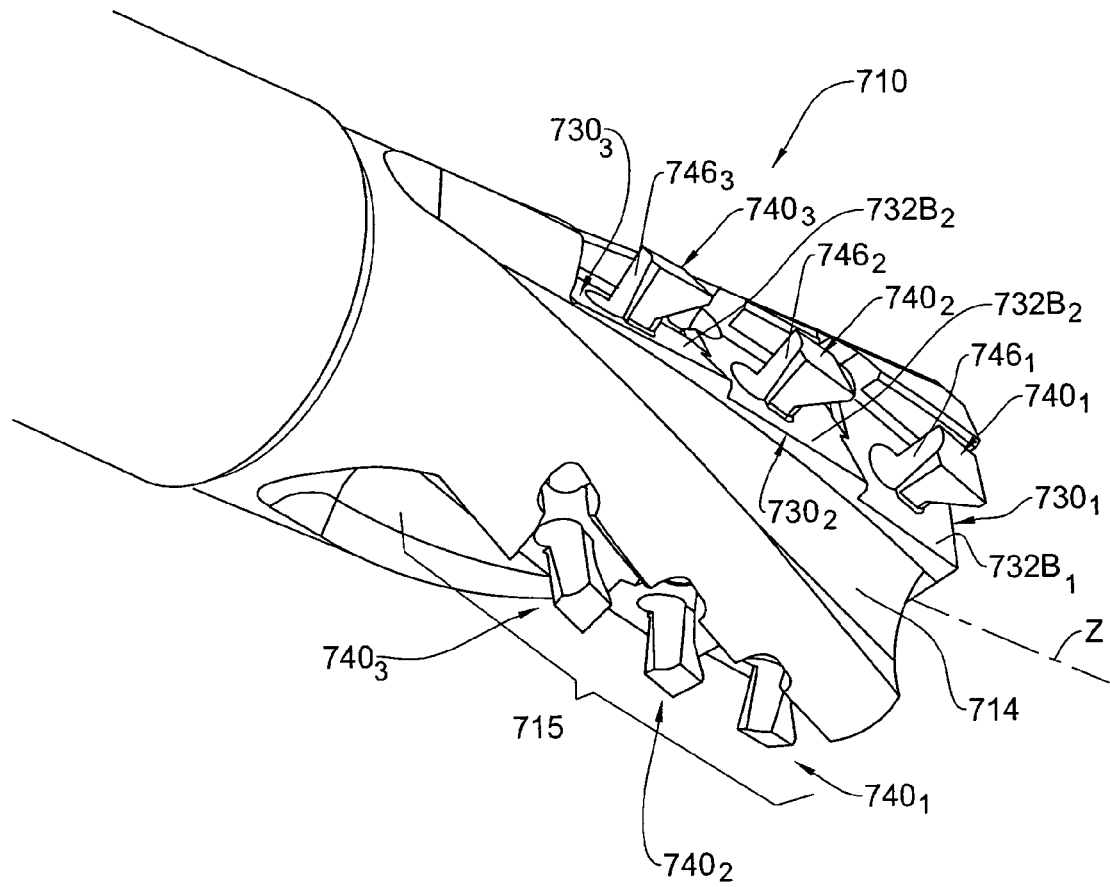
FIG. 23 is a schematic isometric view of a cutting tool holder used in the cutting tool shown in FIG. 22A.

Turning now to FIGS. 22A to 23, still another cutting tool is shown generally designated 700. For the sake of simplicity, the reference numerals of the cutting tool 700 designating similar elements as elements of the cutting tool 1 have been upped by 700. The cutting tool 700 comprises a cutting tool holder 710, and nine cutting inserts 720 mounted onto insert seats 730, and each being secured in place by a securing arrangement comprising a support element 740, being integrally formed with the cutting tool holder 710, and a fastening member 750 adapted to dynamically engage the cutting tool holder 710.

The cutting tool 700 and the cutting tool 200 is generally of similar design to that of cutting tool 200 previously described, with the difference being that, in the present example, the mounting portion 712b of the cutting tool holder 710 is formed with three mounting paths 715, each mounting path being constituted, in turn, by three subsequent insert seats 730$_1$, 730$_2$, 730$_3$, each being adapted to receive therein a cutting insert 720, this contrary to the cutting tool 200 in which each spiral is formed with only one insert seat 230. Thus, it is noted that when the cutting inserts 720 are mounted onto the insert seats 730, the cutting edges 724 of three cutting inserts 720 disposed along a single mounting path 715 form a continuous cutting edge 725.

In particular, with reference being drawn to FIG. 22B, it is noted that when the cutting insert 720 are mounted onto a cutting path 715, the cutting edge 724₂ of one cutting insert 720₂ overlaps the cutting edge 724₁ of the cutting insert 720₁ located below it such that a continuous cutting edge 724 is formed. This overlap d is also useful in protecting the cutting insert 720₁. It is also observed that there extends a slight gap ε between two adjacent cutting inserts 720₁, 720₂. This gap is essential, allowing for handling various differences in tolerances created during manufacture of the cutting inserts 720.

The cutting inserts 720 used in the cutting tool 700 are generally similar to the cutting insert 220 used in the cutting tool 200, i.e. they have a similar construction, and they are also indexible, similar to cutting inserts 220.

Figure 24A:
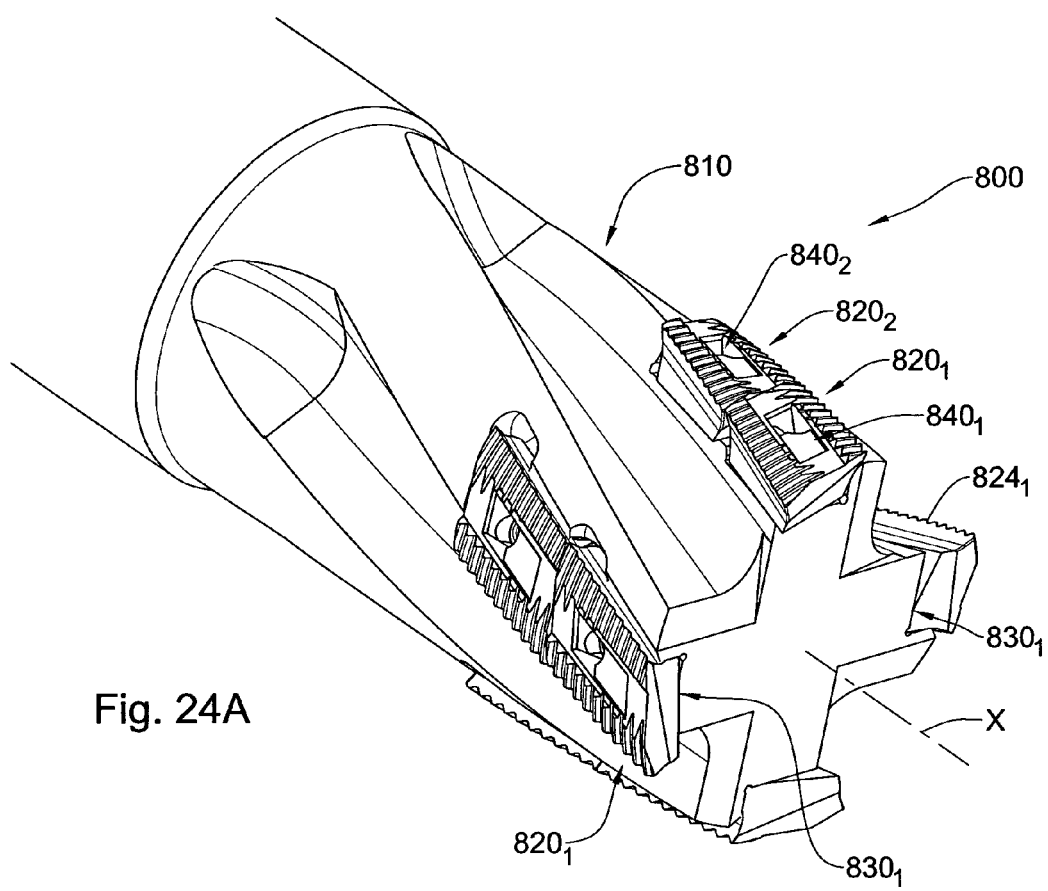
FIG. 24A is a schematic isometric view of a cutting tool according to another embodiment of the disclosed subject matter of the present application.
Figure 24B:
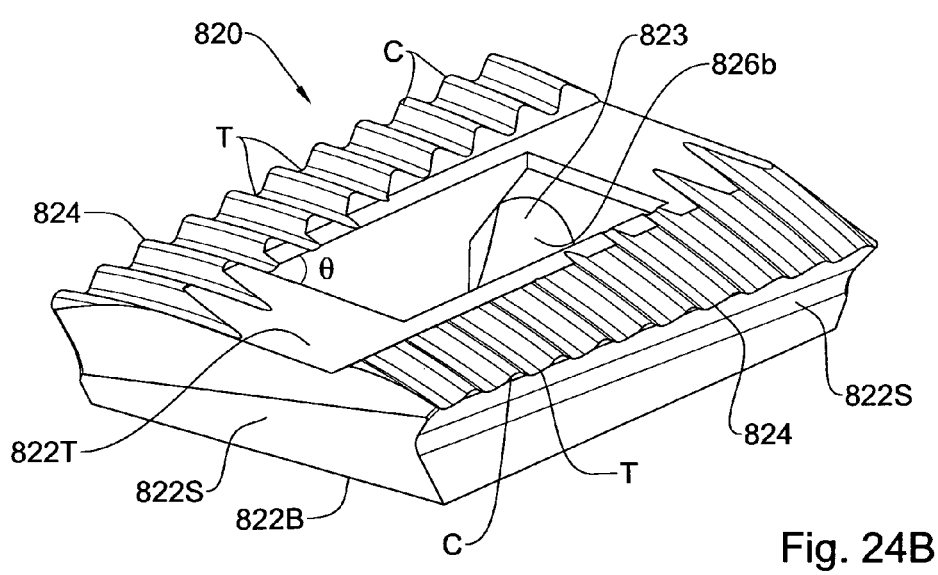
FIG. 24B is a schematic isometric view of a cutting insert used in the cutting tool shown in FIG. 24A.

Turning now to FIGS. 24A and 24B, yet another cutting tool is shown, generally designated 800. For the sake of simplicity, the reference numerals of the cutting tool 800 designating similar elements as elements of the cutting tool 1 have been upped by 800.

The cutting tool 800 is generally of similar design to that of the cutting tool 700, with the difference being that the cutting inserts 820 thereof are intended for rough milling. Therefore, the cutting edges 824 of the cutting inserts are not straight, but rather sinusoidal, having crests C and troughs T.

Since the cutting inserts 820 are intended for rough milling, it is not compulsory for the cutting edges 824₁, 824₂ of two adjacent cutting inserts 820₁, 820₂ to form a continuous cutting edge 815. Thus, the present cutting tool 800 provides greater flexibility in the positioning of the cutting inserts 820 along the mounting path 815.

Figure 25:
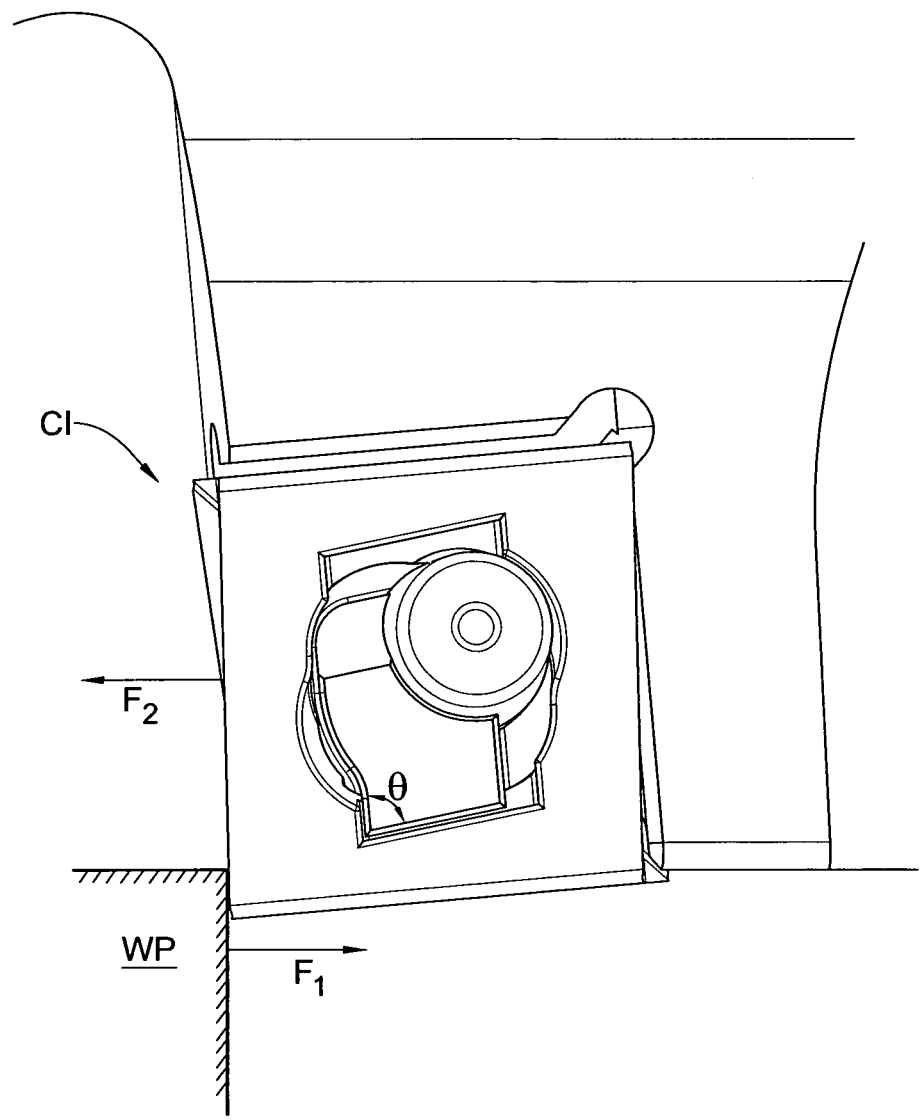
FIG. 25 is a schematic front view of a detail C shown in FIG. 12A.

Particular attention is now drawn to FIG. 25, in which one exemplary cutting insert CI of a tangential cutting tool is shown during contact with a workpiece WP. When the cutting insert CI come in contact with the workpiece WP, a force F1 is applied thereto by the workpiece WP, causing the cutting insert CI to slightly elastically deform in the direction of F1, i.e. become somewhat shrunk in that dimension. Upon disengaging from the workpiece WP due to rotation of the cutting tool (not shown), the cutting insert CI strives to return to it original dimensions, i.e. perform elastic deformation in an opposite direction of F2. Taking into consideration that a cutting tool revolves at a speed of about 1500 RPM, such elastic deformation occurs repeatedly and aggressively.

Thus, each time the cutting insert CI comes in contact with the workpiece WP and then disengages therefrom, it behaves like a coiled spring. Upon 're-coiling' of the cutting insert CI, the cutting insert CI is urged in the direction F2, and 'strives' to disengage from the side wall of the insert seat. However, according to the present example, the support element (shoulder) is always formed with an acute angle θ corresponding to an acute angle θ within the central opening of the cutting insert, and disposed so as to prevent any lateral movement of the cutting insert CI in direction F2.

Under the above arrangement, since the support element is responsible for preventing lateral movement of the cutting insert CI in a direction opposite the side wall of the insert seat, the responsibility of the fastening member is mostly preventing the cutting insert CI from disengaging from the base surface of the insert seat and from the support element. Thus, in the present cutting tools employing both the support element and the fastening member, the fastening member may be considerably smaller in dimensions with respect to a corresponding cutting tool comprising only a fastening member.

It should be appreciated that the above discussed exemplary insert, and in particular the acute angle θ, the manner of its operation and the advantages provided thereby apply to all the cutting tools of the disclosed subject matter of the present application (all examples previously described in FIGS. 1A to 24B, and examples to be described in FIGS. 26A to 35C).

Turning now to FIGS. 26A to 27B, another cutting tool, generally designated 1000 is shown. For the sake of simplicity, the reference numerals of the cutting tool 1000 designating similar elements as elements of the cutting tool 1 have been upped by 1000. The cutting tool 1000 comprises a cutting tool holder 1010, three cutting inserts 1020 mounted onto insert seats 1030, and each being secured in place by a securing arrangement comprising a support element 1040, being integrally formed with the cutting tool holder 1010, and a fastening member 1050 adapted to dynamically engage the cutting tool holder 1010.

Figure 26A:
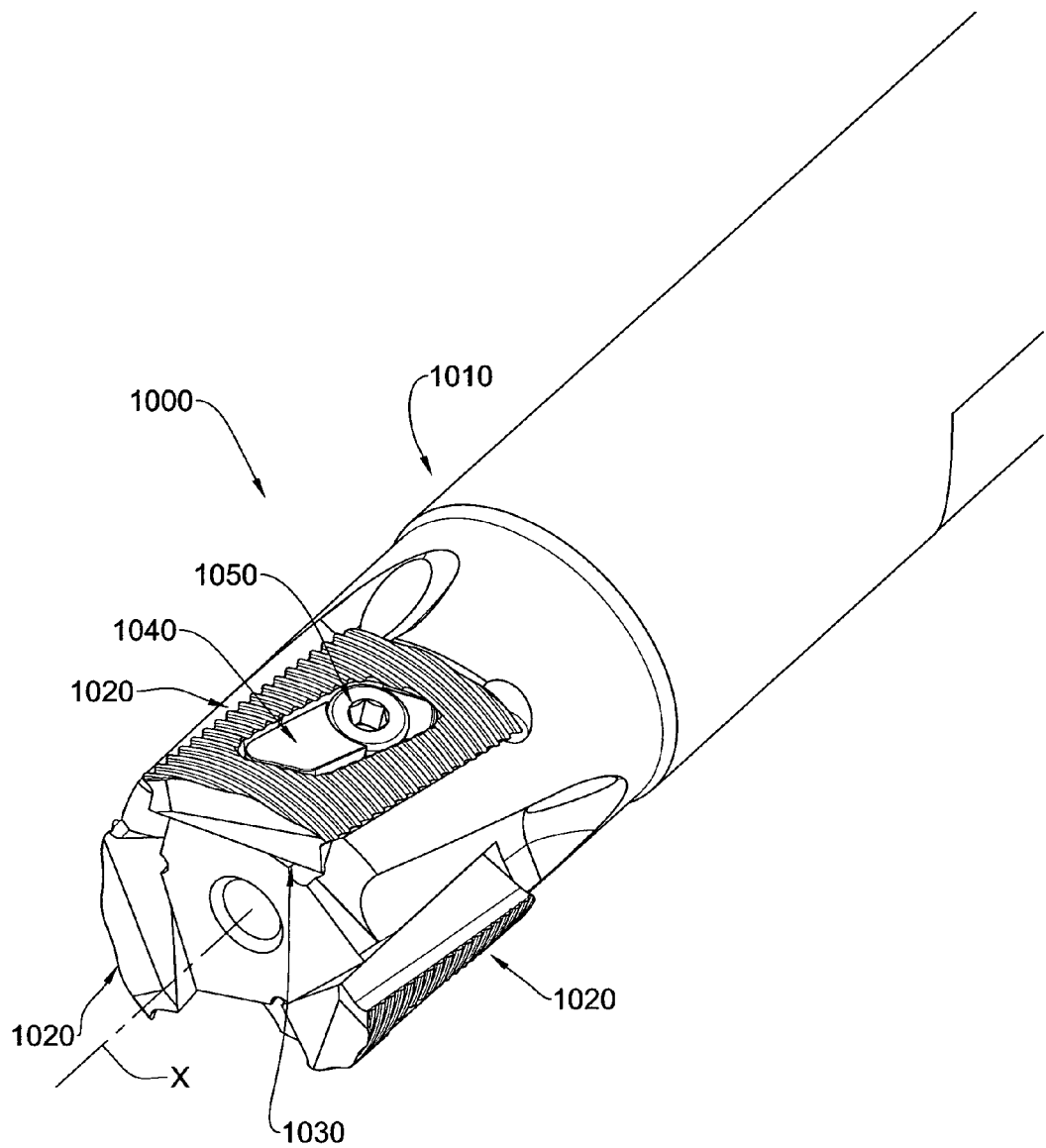
FIG. 26A is a schematic isometric view of a cutting tool according to yet another embodiment of the disclosed subject matter of the present application.
Figure 26B:
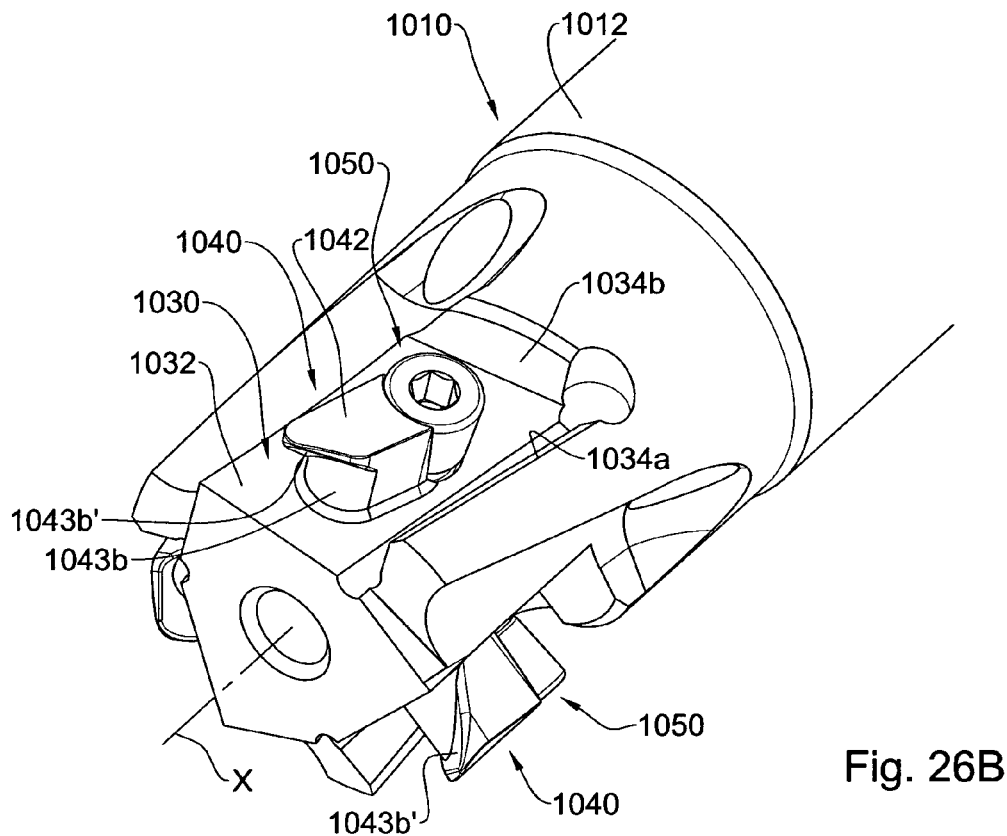
FIG. 26B is a schematic isometric view of the cutting tool shown in FIG. 26A, with the cutting insert removed therefrom.
Figure 26C:
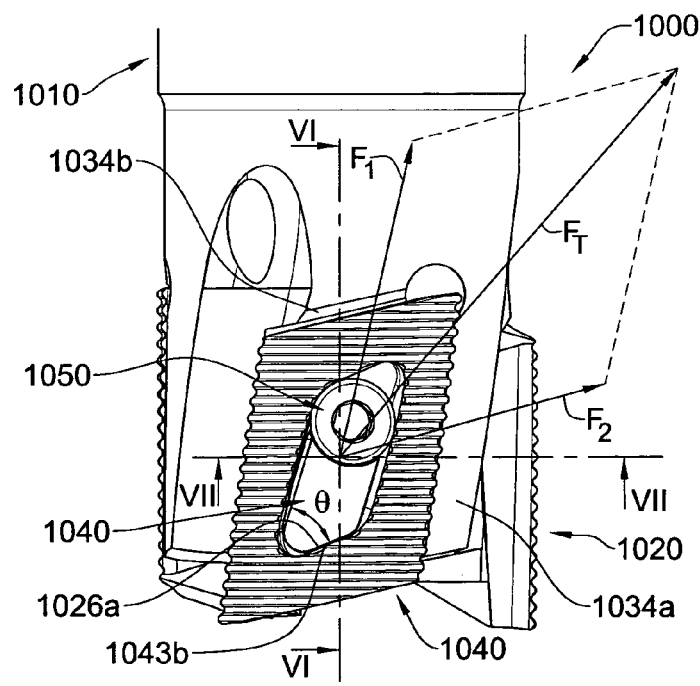
FIG. 26C is a schematic front view of the cutting tool shown in FIG. 26A.

With particular reference to FIG. 26C, the cutting tool 1000 is generally of similar design to the previous cutting tools, with the difference being that in this cutting tool 1000, the angle θ (about 30°) of the support element is more acute than in the previous examples. It is observed that, after a cutting insert 1020 is mounted onto the seat 1030 of the cutting tool holder 1010, and when the fastening member 1050 is fastened to the cutting tool holder 1010, it applies a force $F_1$ pushing the cutting insert 1020 along a generally upward axial direction. This upward axial movement of the cutting insert 1020 causes the respective securing portions 1026a, 1026a' (shown FIGS. 27A, 27B) to engage the undercut 1043b' of the side wall 1043b of the support element 1040. Due to this engagement, and the acute angle θ, the application of force $F_1$ entails the application of a force $F_2$ to the cutting insert 1020 by the support element 1040, urging it to displace in a generally lateral direction. The resultant combined force $F_T$ of the two forces $F_1$ and $F_2$, is directed to an angle of the insert seat 1030, between the side walls 1034a and 1034b, thus firmly securing the cutting insert 1020 in place.

Figure 27A:
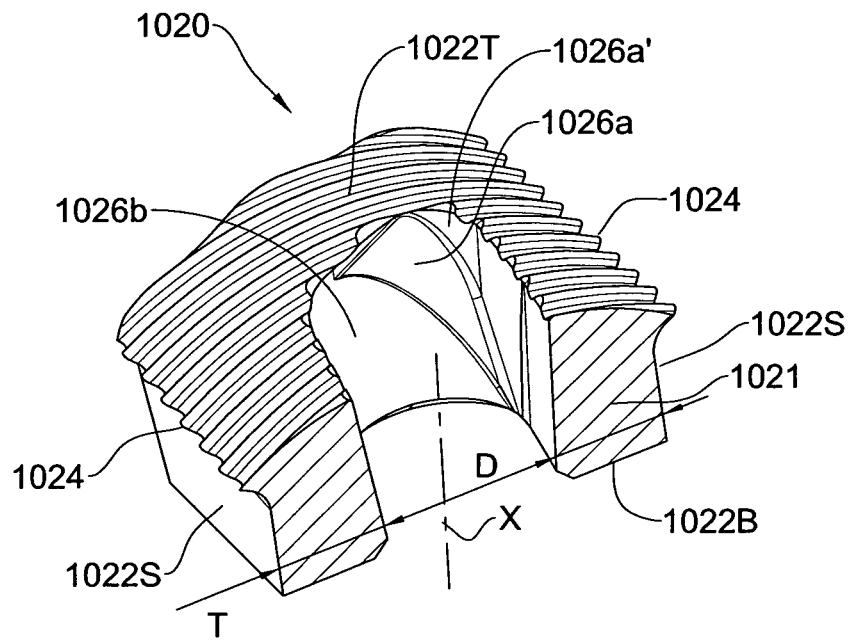
FIGS. 27A and 27B are respective longitudinal and lateral cross-section views of a cutting insert used in the cutting tool shown in FIG. 26A, taken along respective lines VI-VI and VII-VII shown in FIG. 26A.
Figure 27B:
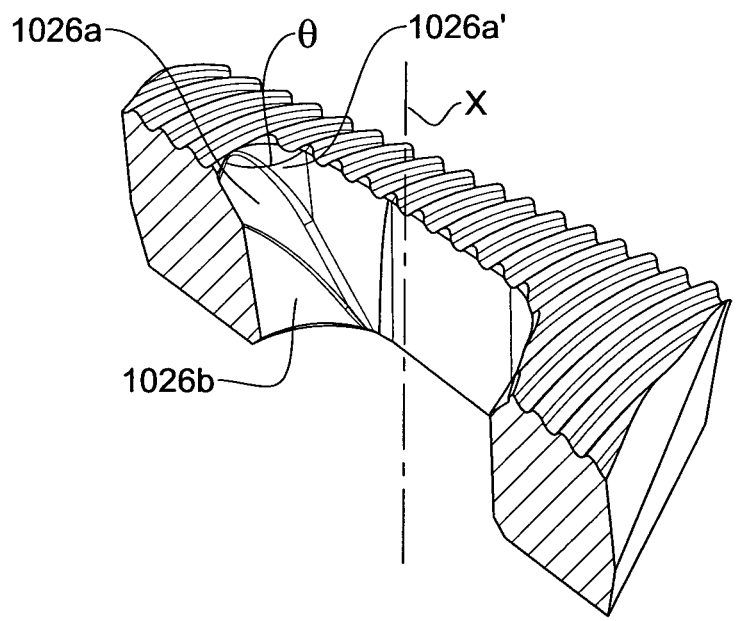

With reference to FIGS. 27A and 27B, the cutting insert 1020 has a similar design to that of the cutting insert 820 previously described, however, its securing portions 1026a and 1026a' are specifically designed to engage the support element 1040. In particular, the securing portion 1026a is designed to match the shape of the undercut 1043b', and the securing portion 1026a' is designed to match the shape of the side wall 1043a (not shown) of the support element 1040.

During a cutting operation, the side walls 1022S of the cutting insert 20 are adapted to serve as rake surfaces, and the top surface 1022T is adapted to serve as a relief surface.

In all other aspects, the cutting tool 1000, cutting tool holder 1010 and cutting insert 1020 operate much in the same manner as previously described cutting tools 1, 100, 200, 700 and 800.

Attention is now drawn to FIGS. 28A to 28D, in which a cutting tool, generally designated as 1100 is shown. For the sake of simplicity, the reference numerals of the cutting tool 1100 designating similar elements as elements of the cutting tool 1 have been upped by 1100. The cutting tool 1100 comprises a cutting tool holder 1110, and six cutting inserts 1120 mounted onto insert seats 1130, and each being secured in place by a securing arrangement comprising a support element 1140 securely engaged with the cutting tool holder 1110, and a fastening member 1150 adapted to dynamically engage the cutting tool holder 1110. The fastening member 1150 is a screw similar to that used in the cutting tool 1 previously described.

The cutting tool 1100 is generally of similar design to that of cutting tool 1000, with the difference being that in this cutting tool 1100 the support element 1140 is not integrally formed with the cutting tool holder 1110, but rather is attachable to the cutting tool holder 1110 in a detachable manner. In particular, the support element 1140 is a screw 1142 adapted to be threaded into a corresponding support bore 1137 formed in the insert seat 1130 of the cutting tool holder 1110.

The screw 1142 has a threaded engagement portion 1144 adapted to be threaded into the support bore 1137, and a securing portion 1146a adapted to engage a corresponding securing portion 1126a of the cutting insert 1120 when the latter is mounted onto the cutting tool 1110. The securing portion 1146a is of conical shape increasing in diameter away from the seat 1130 when the support element 1130 is mounted thereto, i.e. defined between a first diameter $D_1$ remote from the base surface 1132 of the seat 1130, and a second diameter $D_2 < D_1$ closer to the base surface 1132.

The threaded portion 1144 and the securing portion 1146a are separated from one another by an intermediate portion 1146b, having a diameter $D_2$ greater than a diameter $D_3$ of the threaded portion, whereby, when the support element 1140 is mounted onto the seat 1130, the bottom surface 1149 of the intermediate portion 1146b abuts the base surface 1132 of the seat 1130 of the cutting tool holder 1110. This allows providing the securing portion 1146a of the support element 1140 with a firm support against the cutting insert 1120 when mounted thereon.

The above design provides, inter alia, at least the advantage of simplifying the manufacturing of the cutting tool holder 1110. Forming an integral support element as described with respect to previous embodiments requires a considerable amount of work and time, whereas, in the present embodiment of cutting tool 1100, the only thing required for providing the support element 1140 is forming another threaded bore (1137) in the base surface 1132 of the seat 1130, in addition to the threaded fastening bore 1136 adapted for receiving the fastening member 1150.

Figure 29:
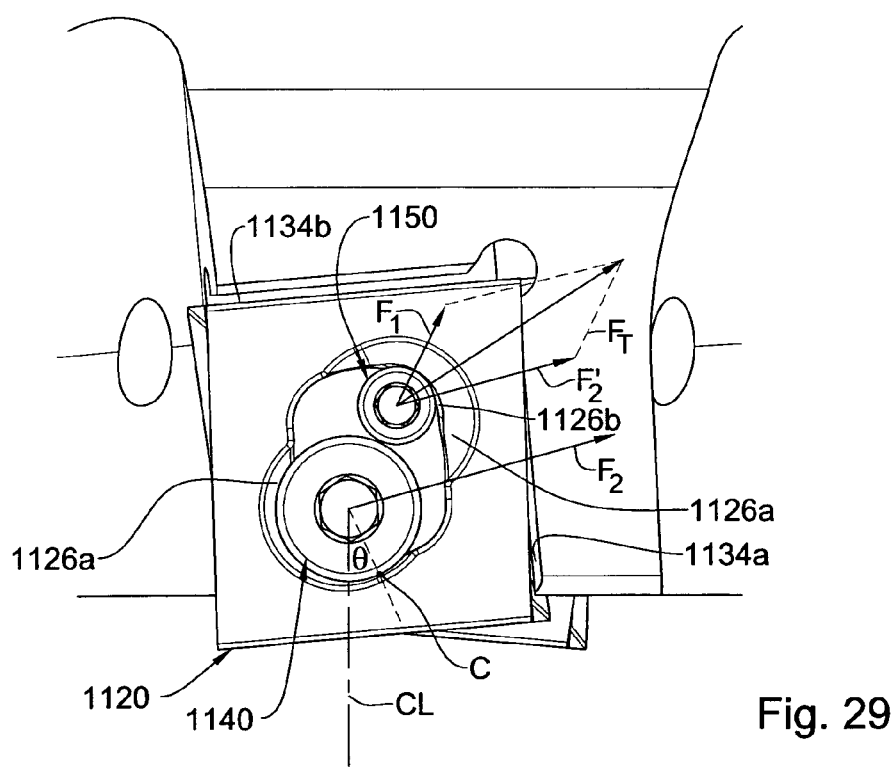
FIG. 29 is a schematic front view of detail G shown in FIG. 28A.
Figure 30A:
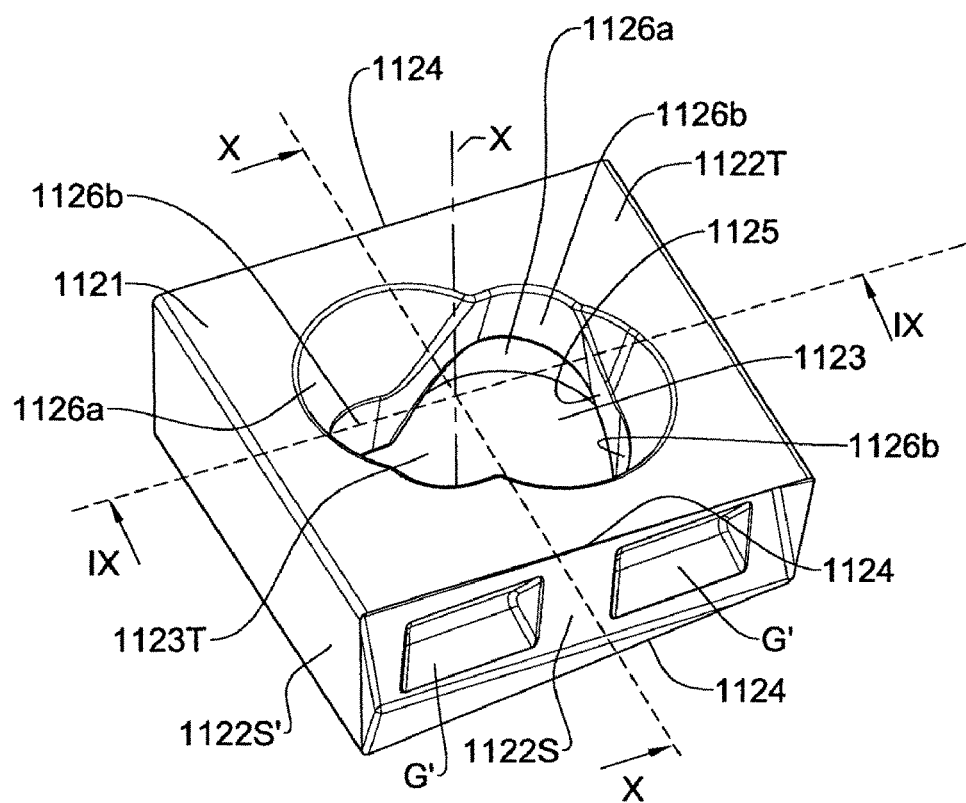
FIG. 30A is a schematic isometric view of the cutting insert used in the cutting tool shown in FIG. 28A.
Figure 30D:
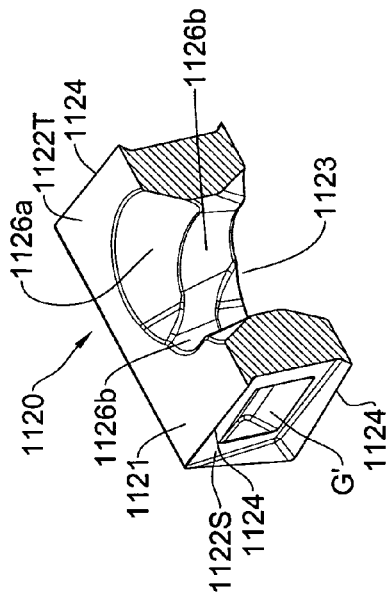
FIGS. 30D and 30E are respective right and left isometric cross-sectional views taken along line X-X in FIG. 30A.
Figure 30E:
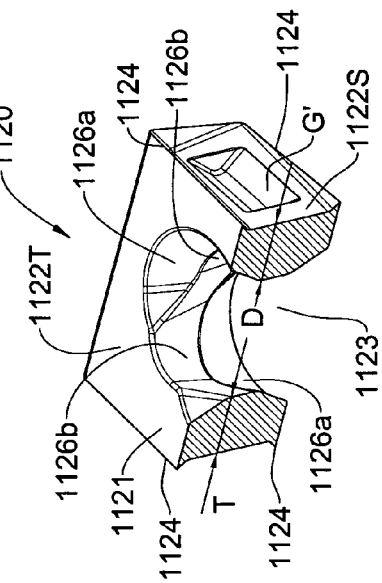
Figure 30B:
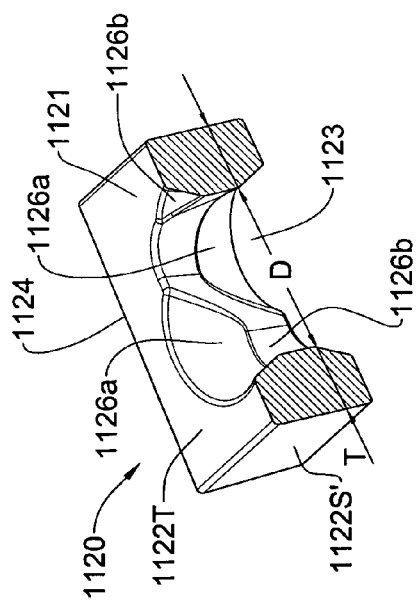
FIGS. 30B and 30C are respective right and left isometric cross-sectional views taken along line VIIII-VIIII in FIG. 30A.
Figure 30C:
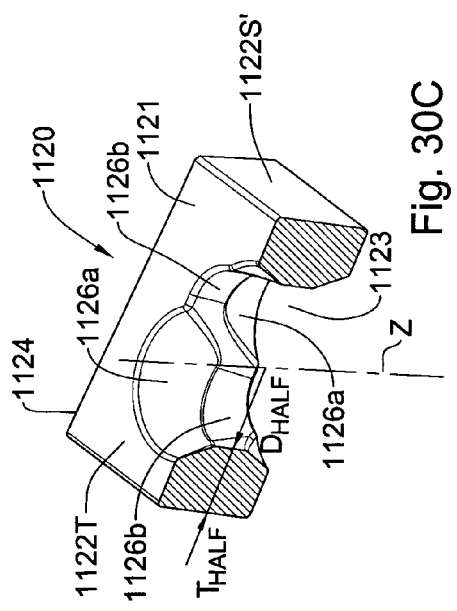

Turning now to FIG. 29, It is observed that, after a cutting insert 1120 is mounted onto the seat 1130 of the cutting tool holder 1110, and when the fastening member 1150 is fastened to the cutting tool holder 1110, it applies a force $F_1$ pushing the cutting insert 1120 along a generally upward axial direction. This upward axial movement of the cutting insert 1120 causes the securing portion 1126a thereof (shown FIGS. 30A to 30E) to engage the securing portion 1146a of the support element 1140. This engagement takes place along a contact line C (also shown FIG. 28E) which is located angled to the center line CL by an angle θ. Due to this engagement, and the acute angle θ, the application of force $F_1$ entails the application of a force $F_2$ to the cutting insert 1120 by the support element 1140, urging it to displace in a generally lateral direction. The resultant combined force $F_T$ of the two forces $F_1$ and $F_2$, is directed to an angle of the insert seat 1130, between the side walls 1134a and 1134b, thus firmly securing the cutting insert 1120 in place.

Turning now to FIGS. 30A through 31B, the cutting insert 1120 is shown formed with a body 1121 having a top face 1122T and a bottom face 1122B, and side faces 1122S, 1122S' extending therebetween, wherein four cutting edges 1124 are defined at the intersections between the side faces 1122S and the top and bottom face 1122T and 1122B. The body 1121 is further formed with a central cavity 1123 having an opening 1123T, 1123B at the respective top and bottom faces 1122T, 1122B, the cavity being defined about a central axis X extending generally perpendicular to the top and bottom faces 1122T, 1122B. Each of the side walls 1122S is formed with a v-shaped groove G' adapted to engage a corresponding sidewall 1134a of the insert seat 1130 (shown FIG. 28C).

During a cutting operation, the side walls 1122S of the cutting insert 1120 are adapted to serve as rake surfaces, and the top and bottom surfaces 1122T, 1122B are adapted to serve as relief surfaces.

The cavity 1123 defines an inner surface 1125 of the cutting insert 1120, having a first set of securing portions 1126a and a second set of securing portions 11266, adapted, when the cutting insert 1120 is mounted onto the cutting tool holder 1110, for engaging the respective support element 1140 and the fastening member 1150.

The cutting insert 1120 is designed such that the inner surface 1125 thereof is constituted by four adjacent sections, each section extending between the top face 1122T and the bottom face 1122B of the cutting insert 1120, and each such section being constituted by a first securing portion 1126a adjacent one face of the cutting insert (top or bottom), and a second securing portion 1126b adjacent the opposite face of the cutting insert. The sections are arranged in a counter-opposed manner, i.e. for a section having a first securing portion 1126a adjacent the top face 1122T, the two adjacent sections on the right and left side thereof will have their first securing portion 1126a adjacent the bottom face 1122B. Hence, the same applies to the second securing portions 1126b.

It is also noted that due to the above design, and since the securing portion 1126a adapted to engage the support element 1140 is greater in dimension than the second securing portion 1126b adapted to engage the fastening member 1150, the top and bottom openings 1123T, 1123B have the same shape, but are a mirror image one of the other.

As in the previous examples, the inner cavity 1123 is sufficiently large for accommodating therein, when the cutting insert 1120 is mounted onto the cutting tool holder 1110, both the support element 1140 and the fastening member 1150.

Figure 31A:
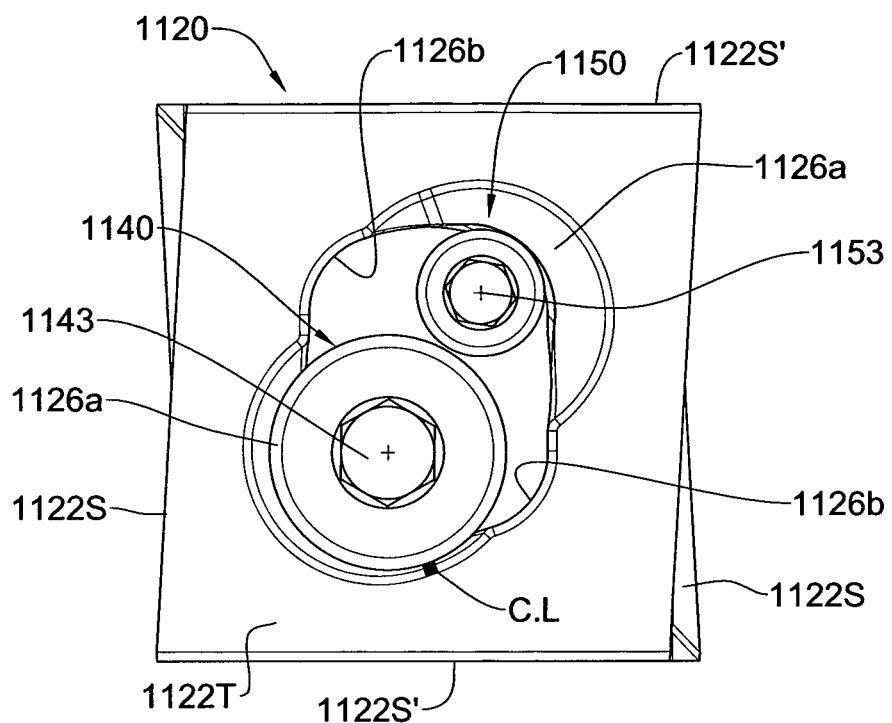
FIGS. 31A and 31B are schematic front and rear views of a cutting insert of the when mounted onto the cutting tool shown in FIG. 28A and secured by a support element and a fastening member thereof, with the cutting tool holder not shown.
Figure 31B:
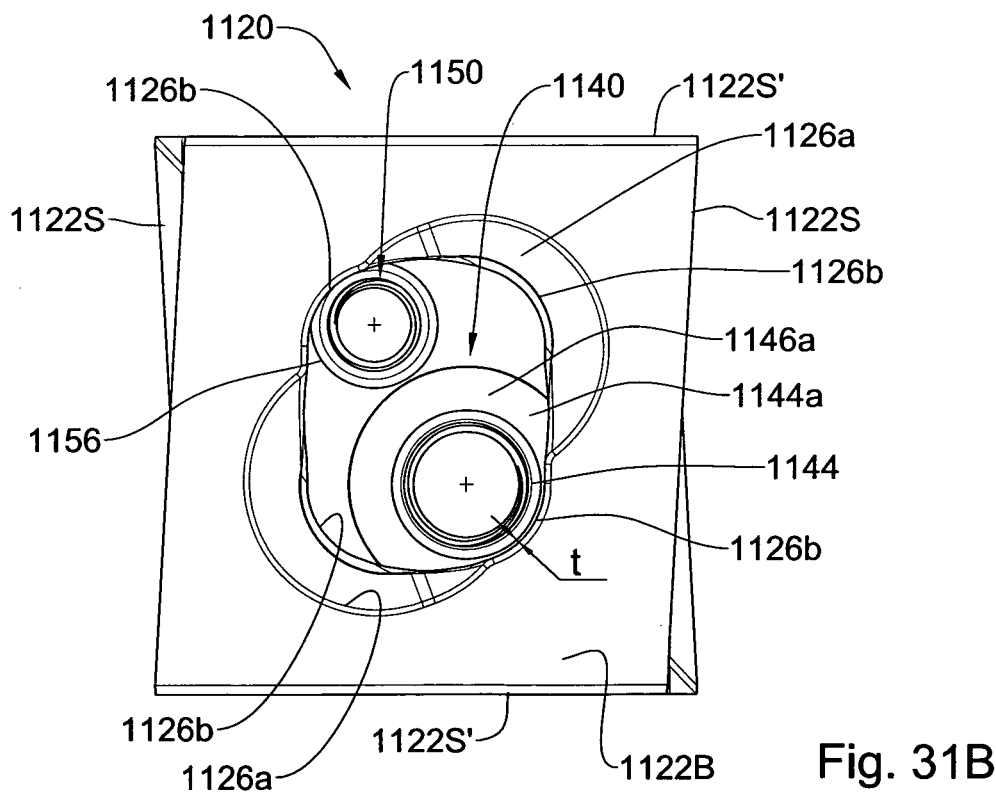
Figure 32A:
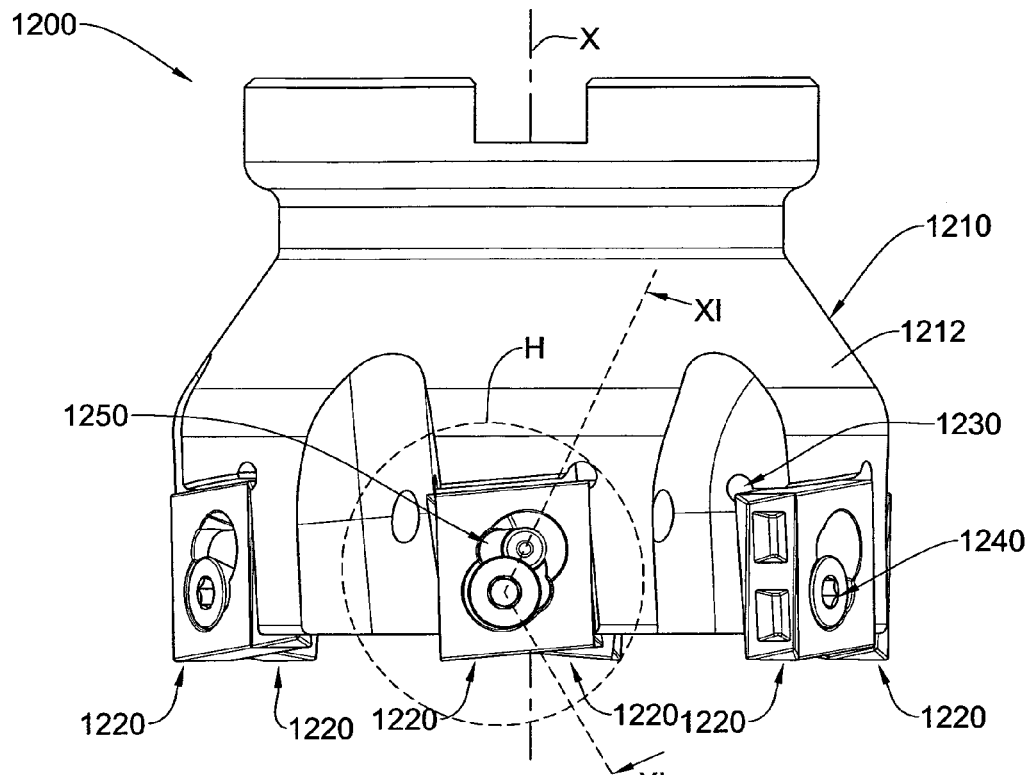
FIG. 32A is a schematic front view of a cutting tool according to still another embodiment of the disclosed subject matter of the present application.
Figure 32B:
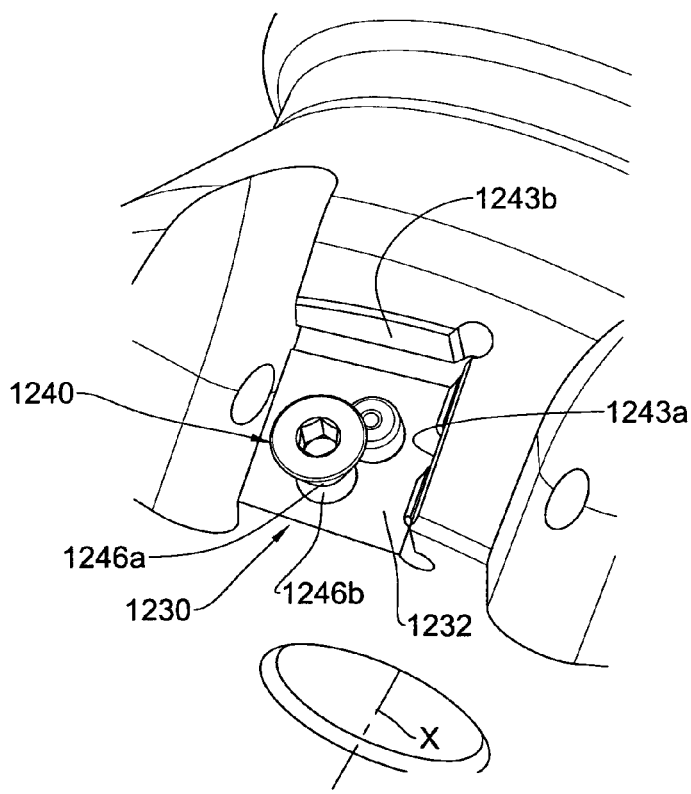
FIG. 32B is a schematic isometric enlarged view of a detail H shown in FIG. 28A, with the cutting insert removed therefrom.
Figure 32C:
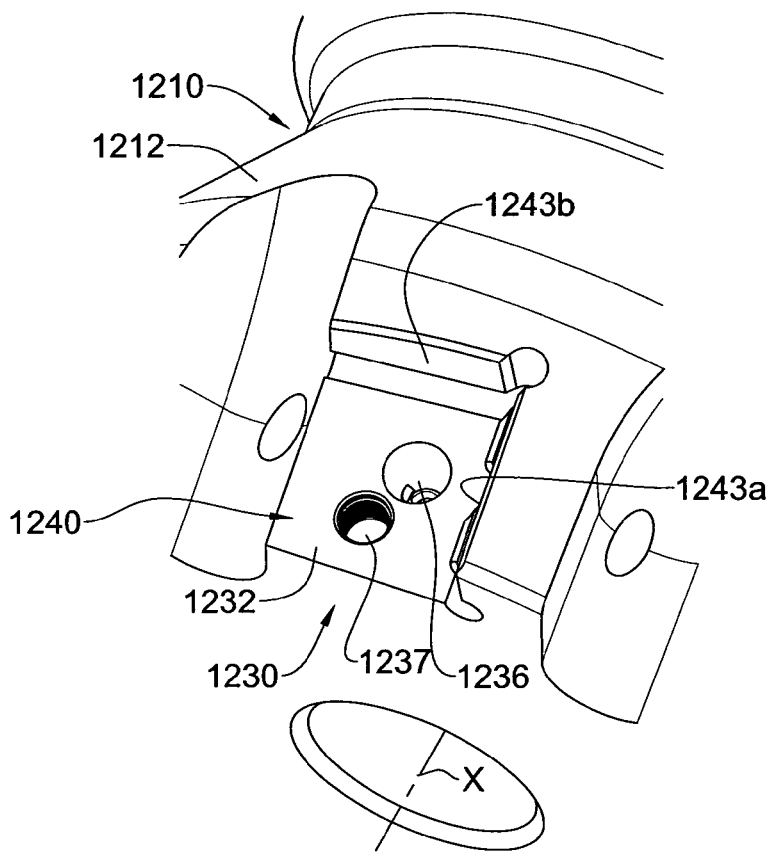
FIG. 32C is a schematic isometric view of detail H shown in FIG. 32C, with the support element and fastening member removed therefrom.
Figure 32D:
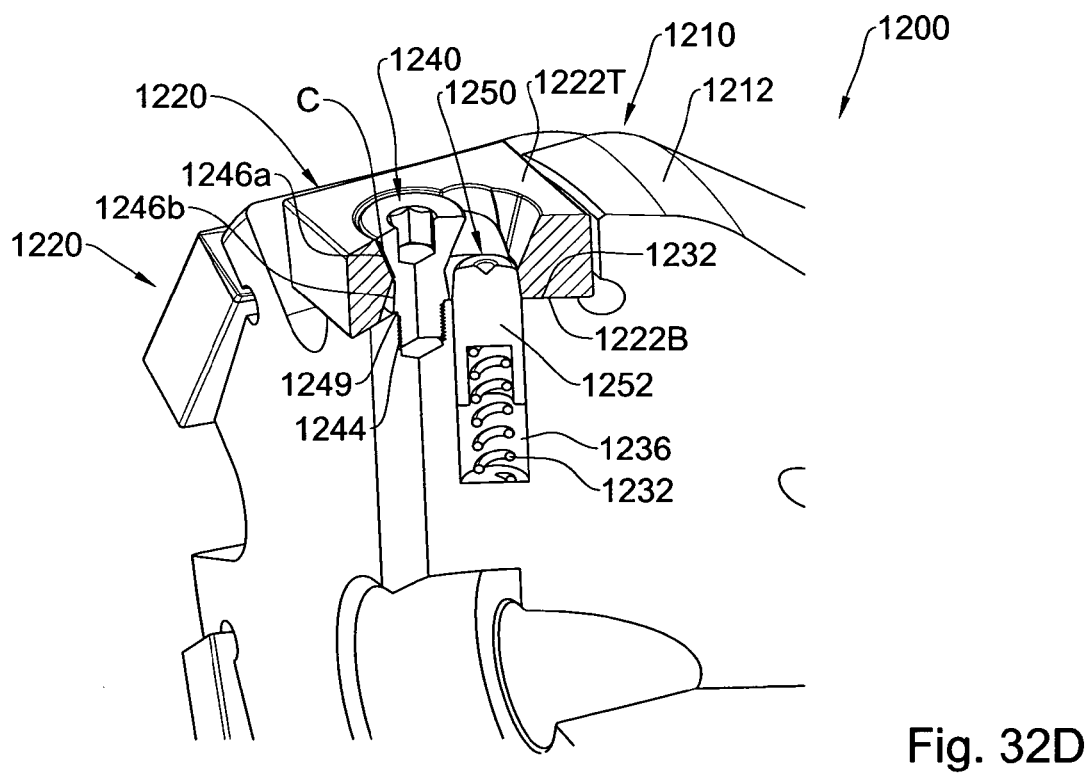
FIG. 32D is a schematic isometric section view of detail H shown in FIG. 32A, taken along line XI-XI in FIG. 32A.
Figure 33A:
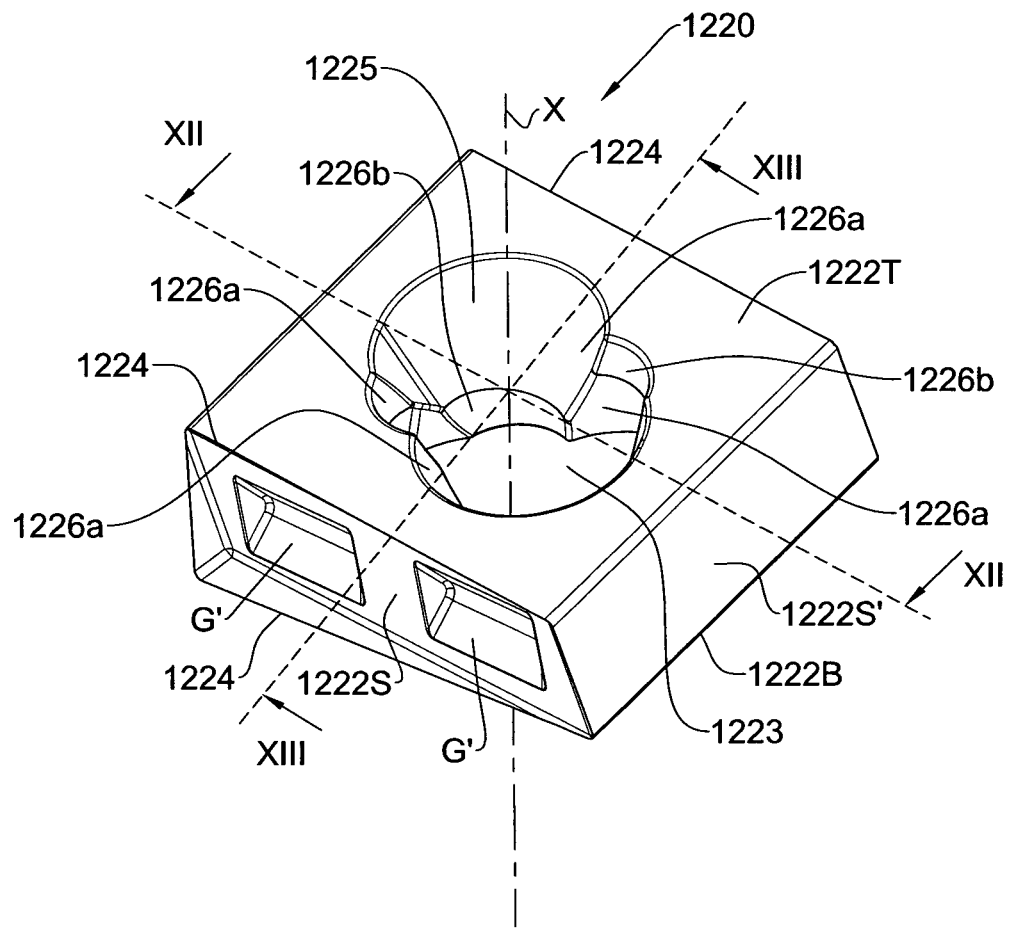
FIG. 33A is a schematic isometric view of the cutting insert used in the cutting tool shown in FIG. 32A.
Figure 33D:
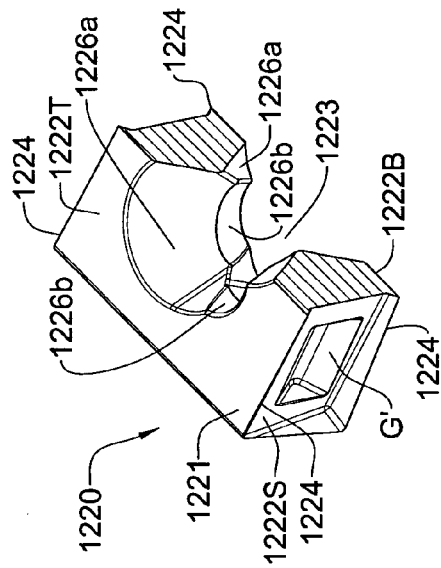
FIGS. 33D and 33E are respective right and left isometric cross-sectional views taken along line XIII-XIII in FIG. 33A.
Figure 33E:
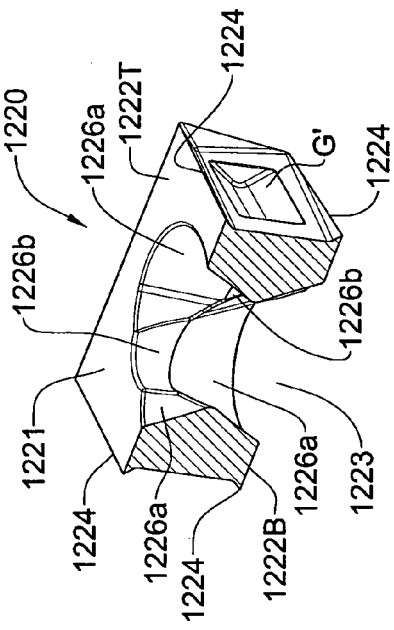
Figure 33B:
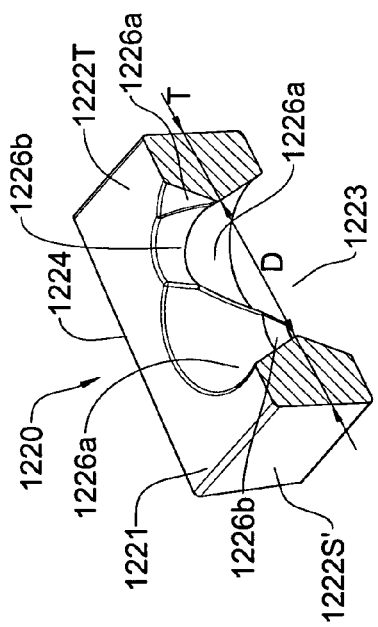
FIGS. 33B and 33C are respective right and left isometric cross-sectional views taken along line XII-XII in FIG. 33A.
Figure 33C:
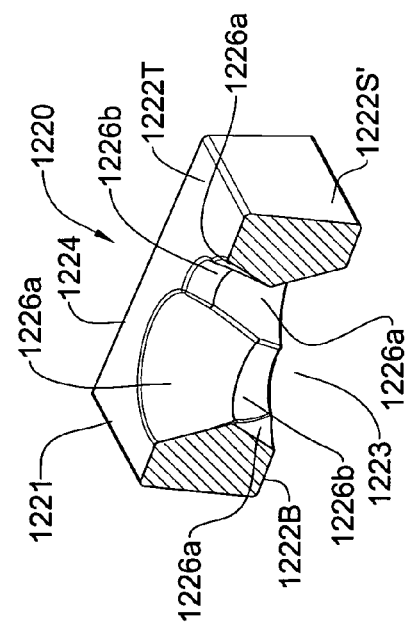

With particular reference to FIGS. 31A and 31B, it is noted that the cutting insert 1120 is designed such that, when mounted onto the cutting tool holder 1110 and engagement takes place between the first securing portion 1126a and the support element 1140, the second securing portion 1126b of the same section of the inner surface 1125 does not come in contact with the intermediate portion 1146b of the support element 1140, i.e. there extends a gap t between the securing portion 1126b and the intermediate portion 1146b.

Attention is now drawn to FIGS. 32A to 32D, in which a cutting tool, generally designated as 1200 is shown. For the sake of simplicity, the reference numerals of the cutting tool 1200 designating similar elements as elements of the cutting tool 1100 have been upped by 100. The cutting tool 1200 comprises a cutting tool holder 1210, and six cutting inserts 1220 mounted onto insert seats 1230, and each being secured in place by a securing arrangement comprising a support element 1240 securely engaged with the cutting tool holder 1210, and a fastening member 1250 adapted to dynamically engage the cutting tool holder 1210.

The difference between the cutting tool 1200 and the cutting tool 1100 previously described is that the fastening member 1250 is not a screw (1152 shown FIG. 28A), but rather a securing pin 1252, similar to the securing pins of cutting tools 200, 300, 400 etc., and operates in much the same manner as described there.

Figure 28A:
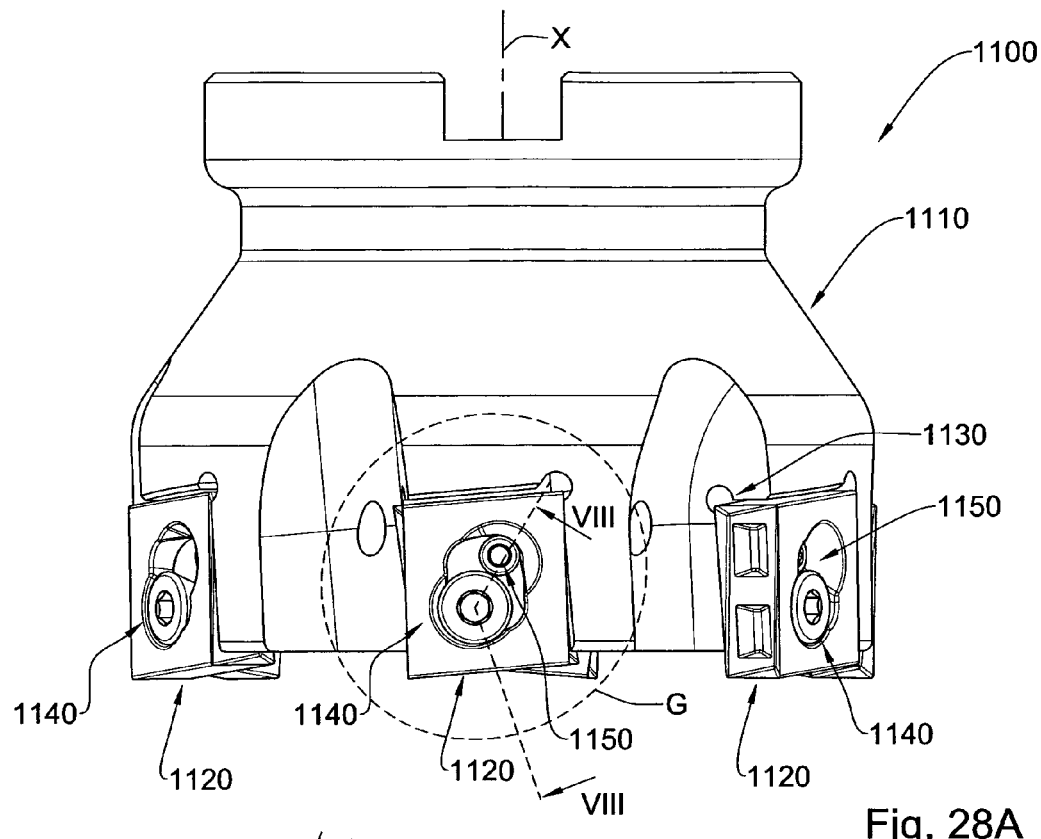
FIG. 28A is a schematic front view of a cutting tool according to yet another embodiment of the disclosed subject matter of the present application.
Figure 28B:
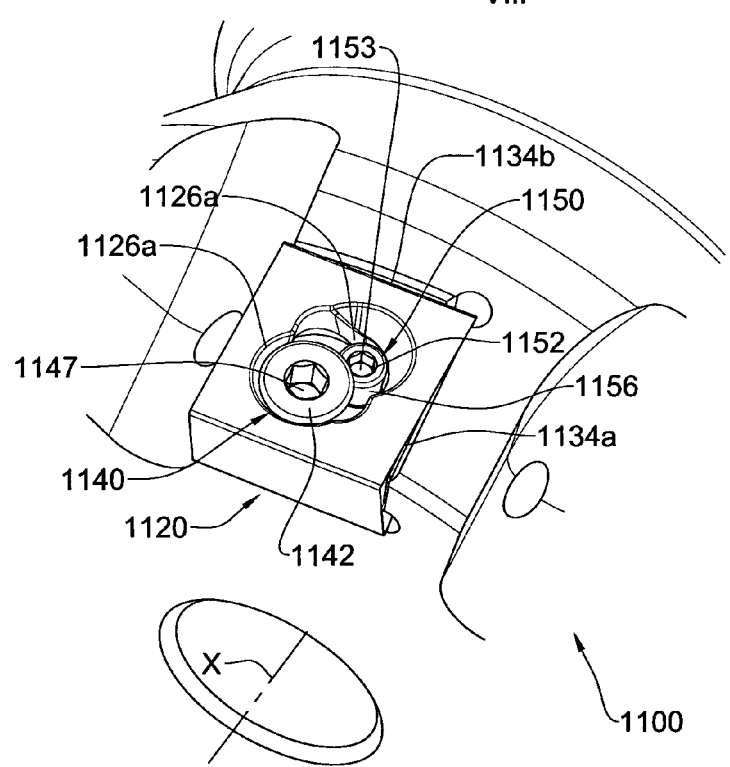
FIG. 28B is a schematic isometric enlarged view of a detail G shown in FIG. 28A.
Figure 28C:
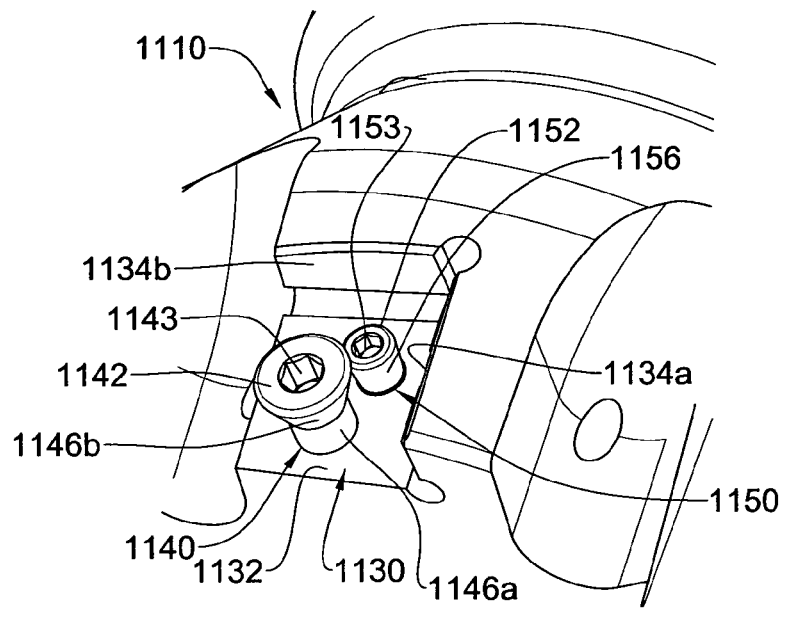
FIG. 28C is a schematic isometric view of detail G shown in FIG. 28B, with the cutting insert removed.
Figure 28D:
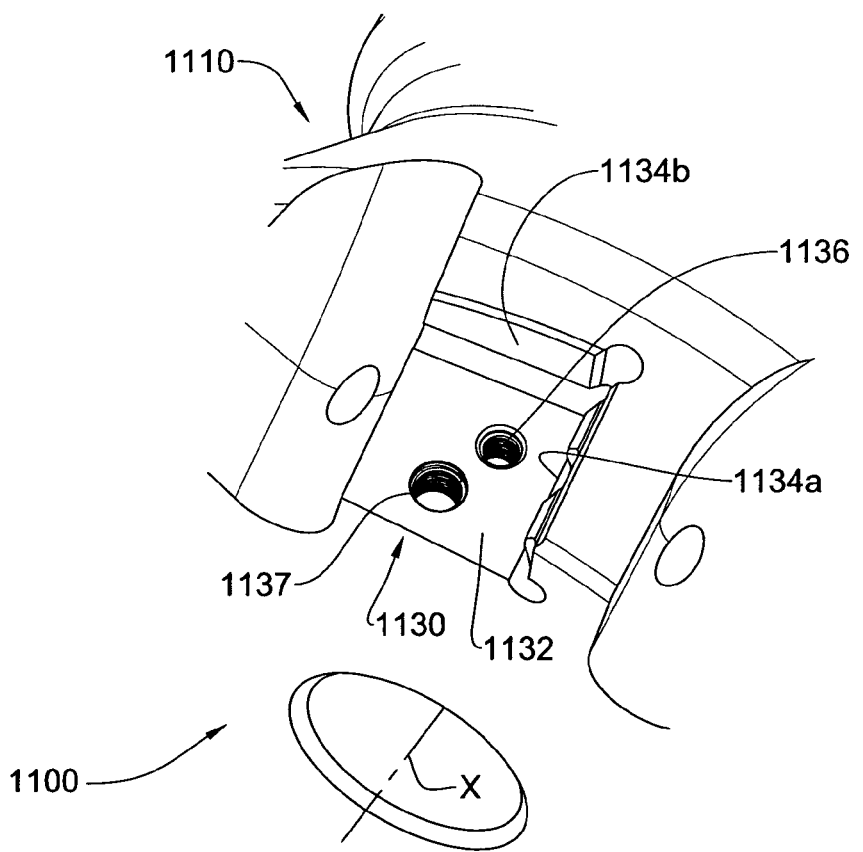
FIG. 28D is a schematic isometric view of detail G shown in FIG. 28C, with the support element and fastening member removed therefrom.
Figure 28E:
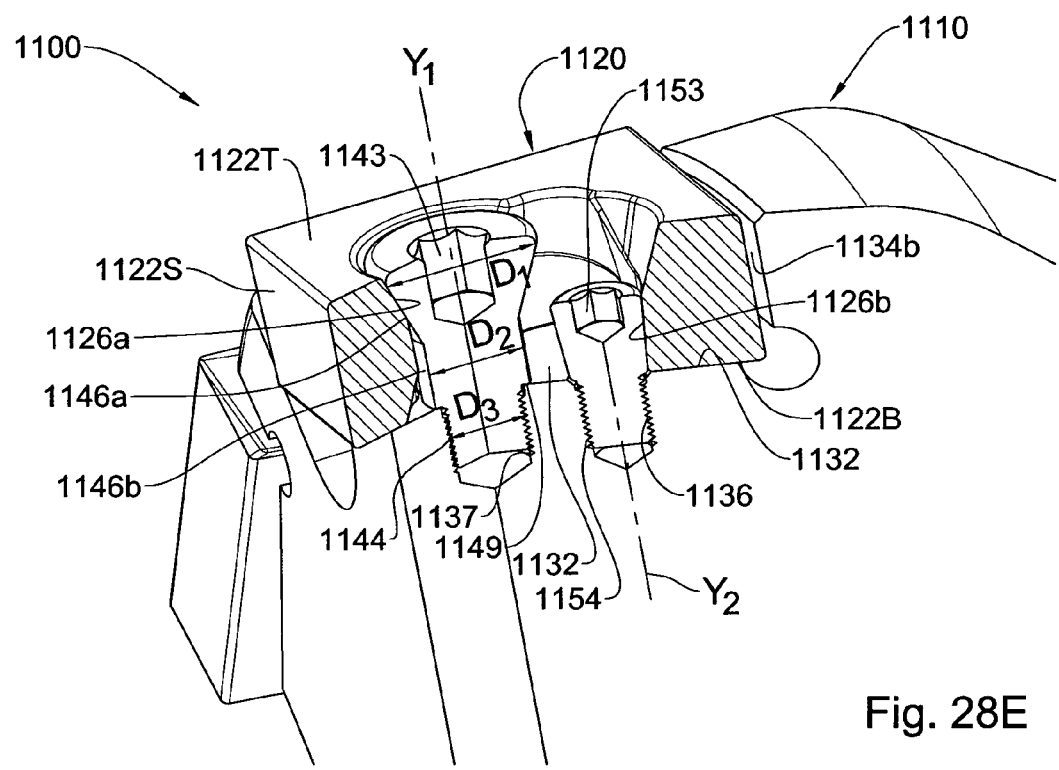
FIG. 28E is a schematic isometric section view of detail G shown in FIG. 28A, taken along line VIII-VIII in FIG. 28A.

Another difference between the cutting tools 1100 and 1200 is that the support element 1240 is designed with a conical intermediate portion 1246b, as opposed to a straight intermediate portion (1146a shown FIG. 28D). The intermediate portion 1246b has a greater diameter at a point adjacent the base surface 1232 of the seat 1230 than at a point remote from the base surface 1232. This grants the support element 1250 a more robust structure than previously described.

Turning to FIGS. 33A to 33D, it is observed that the design of the cutting insert 1220 is generally similar to the design of the cutting insert 1120 previously described, i.e. the inner surface 1225 is also constituted by four sections, each having a first securing portion 1226*a* adapted to engage the support element 1240 and adjacent one of the top and bottom faces 1222T, 1222B, and a second securing portion 1226*b* adapted to engage the fastening member 1250 and adjacent a face opposite to that which the first securing portion 1226*a* is adjacent.

The cutting insert 1220 similarly maintains the counter-opposed design in which for a section having a first securing portion 1126*a* adjacent the top face 1122T, the two adjacent sections on the right and left side thereof will have their first securing portion 1126*a* adjacent the bottom face 1122B. Hence, the same applies to the second securing portions 1126*b*.

During a cutting operation, the side walls 1222S of the cutting insert 1220 are adapted to serve as rake surfaces, and the top and bottom surfaces 1222T, 1222B are adapted to serve as relief surfaces.

Figure 34A:
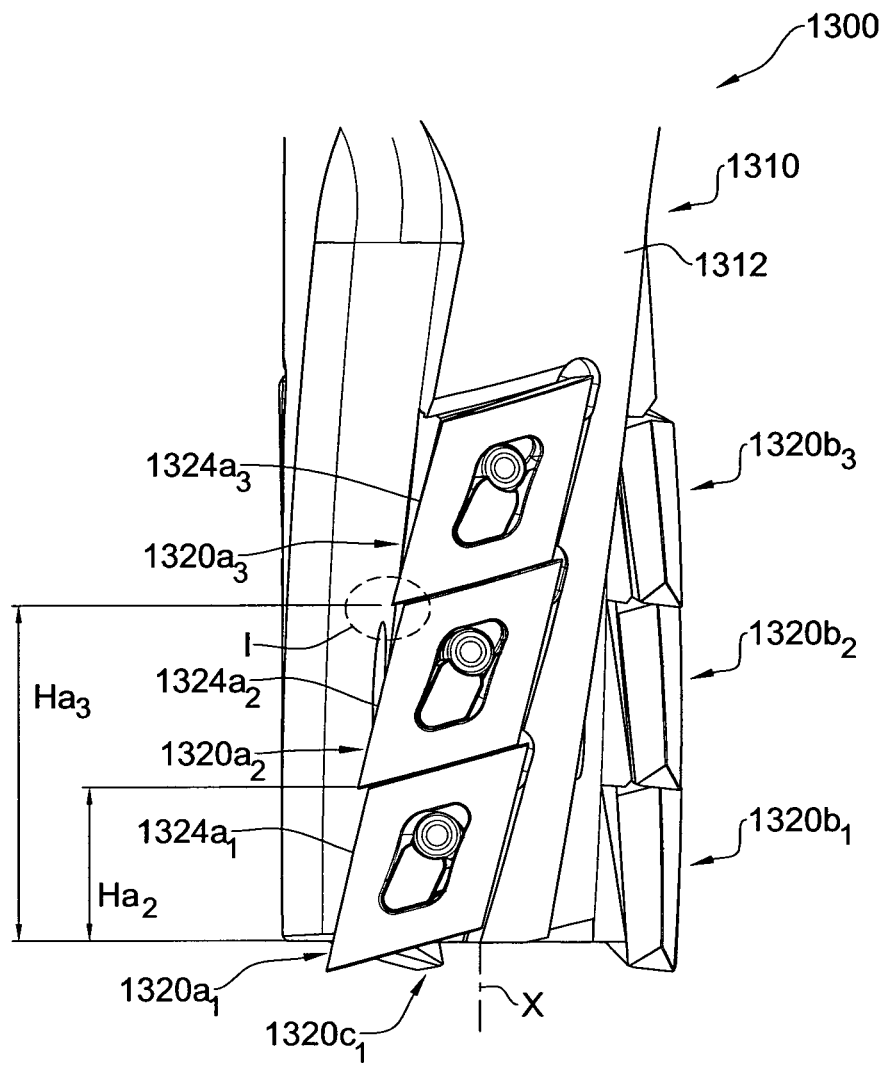
FIGS. 34A to 34C are respective schematic front views of a respective first row, second row and third row of cutting inserts of a cutting tool according to yet another embodiment of the disclosed subject matter of the present application.
Figure 34B:
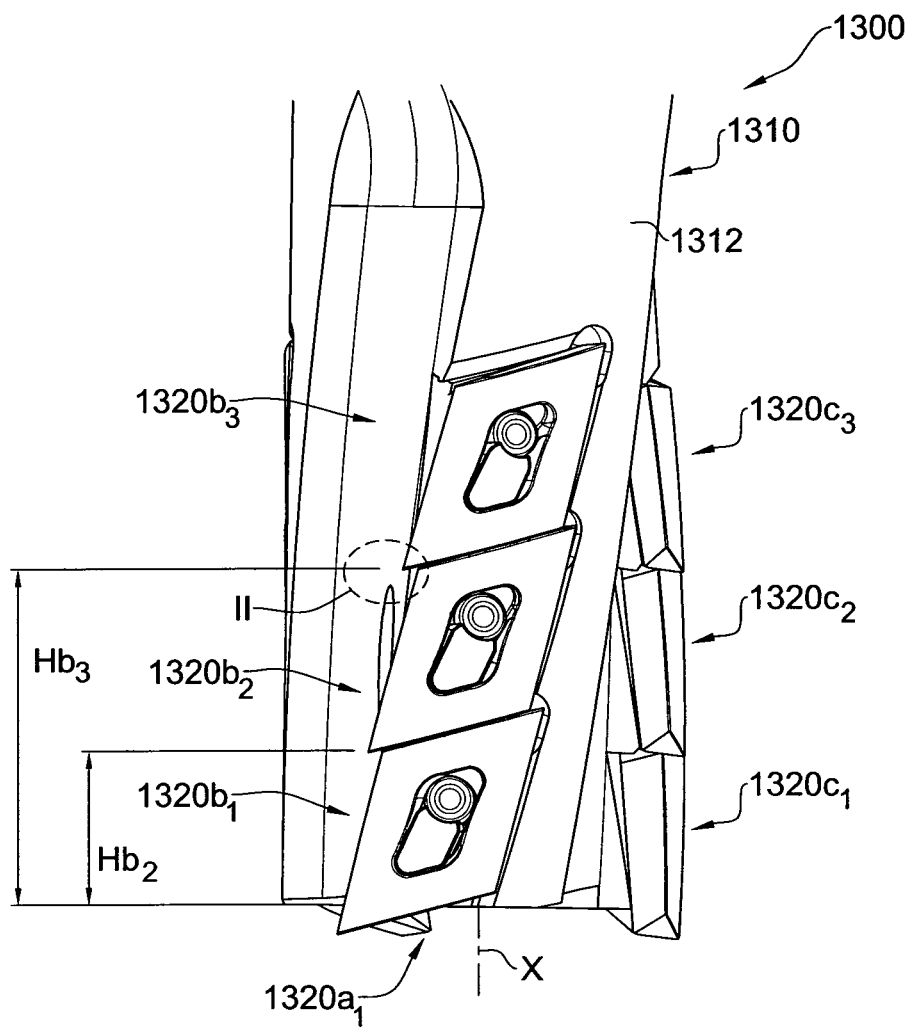
Figure 34C:
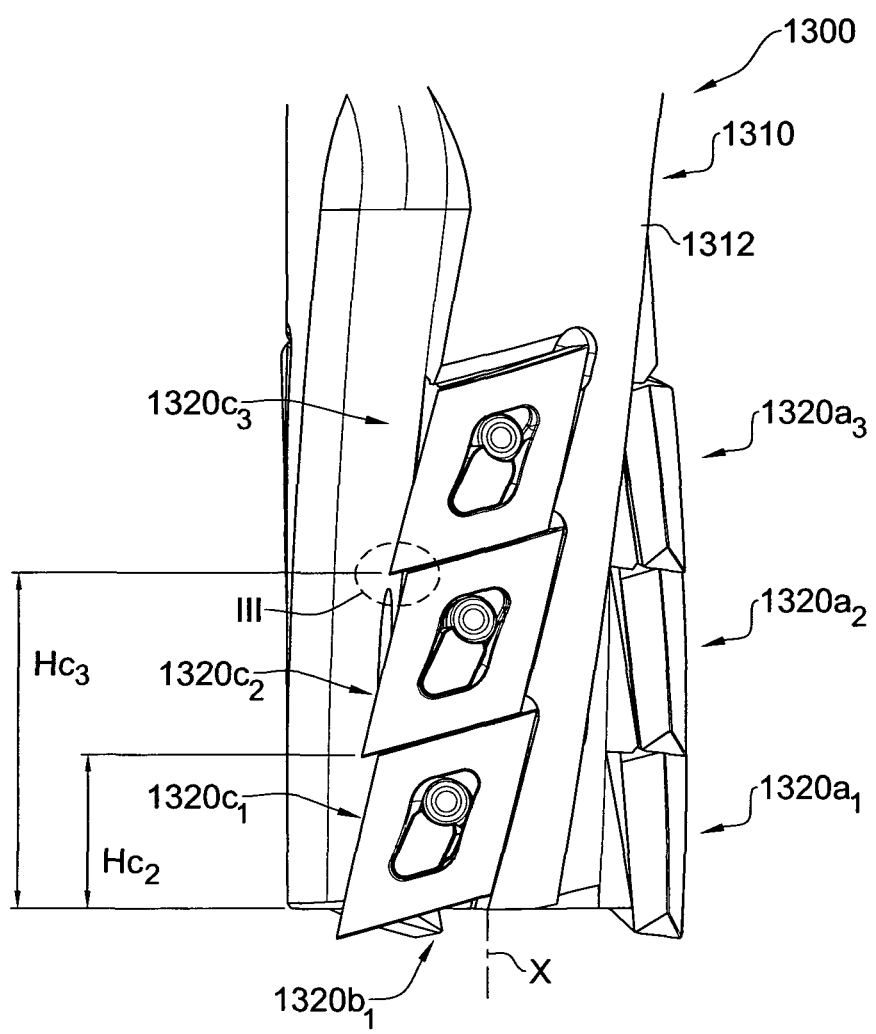

Turning now to FIGS. 34A to 34C, another cutting tool generally designated 1300 is shown, being of a generally similar design to that of the cutting tool 700 previously described. For the sake of simplicity, the reference numerals of the cutting tool 1300 designating similar elements as elements of the cutting tool 700 have been upped by 600. The cutting tool 1300 comprises a cutting tool holder 1310, and nine cutting inserts 1320 mounted onto insert seats 1330 in three rows (a), (b) and (c), three cutting inserts 1320 per row, each cutting insert being secured in place by a securing arrangement comprising a support element 1340 securely engaged with the cutting tool holder 1310, and a fastening member 1350 adapted to dynamically engage the cutting tool holder 1310.

The difference between the cutting tool 1300 and the cutting tool 700 previously described is the arrangement of the cutting insert 1320 in each row. In particular, the support elements 1340 of the cutting tool holder 1310 is designed such that an overlap ϵ between two adjacent cutting inserts 1320 in the same row changes from row to row. The change in overlap ϵ is achieved by the slightly different design of the seats 1330 of each row, in particular, the location of the support element 1340.

Figure 35C:
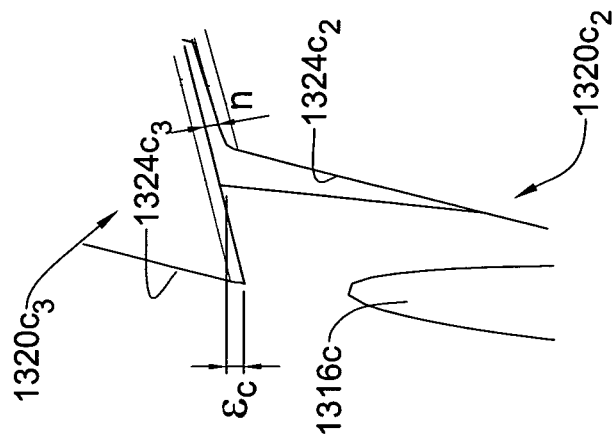
FIGS. 35A to 35C are respective schematic enlarged views of details I, II and III taken from respective FIGS. 34A to 34C.
Figure 35B:
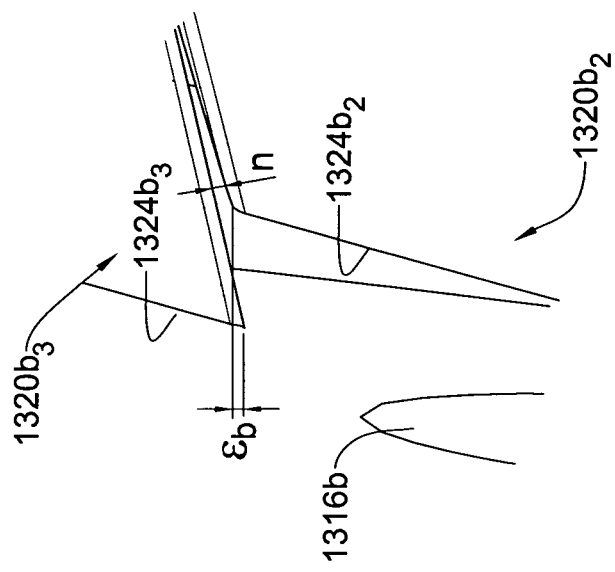
Figure 35A:
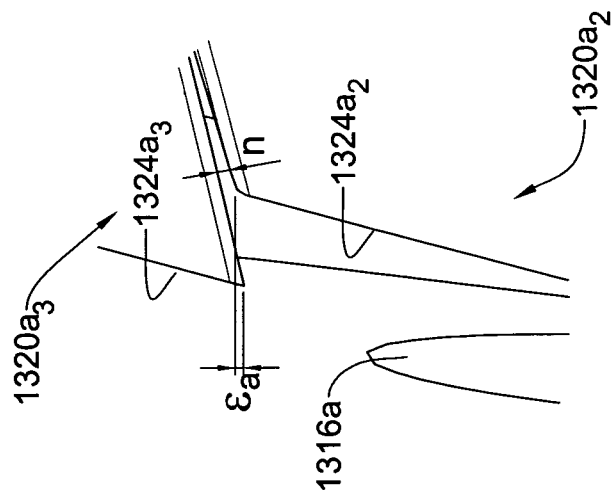

Attention is thus drawn to FIGS. 35A to 35C in which the area between the second and third cutting insert of each row is shown, i.e. 1320*a*$_2$ and 1320*a*$_3$, 1320*b*$_2$ and 1320*b*$_3$, and 1320*c*$_2$ and 1320*c*$_3$ respectively. It is first observed that in all three rows, there is a gap n between two adjacent cutting inserts 1320 of the same row. It is further observed that the overlap ϵ$_a$ of the third cutting insert 1320*a*$_3$ over the second cutting insert 1320*a*$_2$ in the first row (a) is smaller than the overlap ϵ$_b$ of the third cutting insert 1320*b*$_3$ over the second cutting insert 1320*b*$_2$ in the second row (b) which is, in turn, smaller than the overlap ϵ$_c$ of the third cutting insert 1320*b*$_3$ over the second cutting insert 1320*b*$_2$ in the third row (c).

The above design allows the cutting tool 1300 to operate such that any material not removed from the workpiece (not shown) by one row of cutting inserts 1320, is removed by the following row as the cutting tool 1300 keeps revolving about its axis, and so on.

In general, with respect to all of the above cutting tools 1, 100, 200, 300, 400, 500, 600, 700, 800, 1000, 1100, 1200 and 1300, the use of a cutting insert accommodating therein both a displaceable fastening member and a fixed support element provides, inter alia, at least the following advantages:

- continuous line of material extending within the central opening of the cutting insert, thereby securing the cutting insert not only to the base surface of the insert seat and/or to a side wall of the insert seat, but also to an additional member—the support element, allowing for much firmer securing of the cutting insert;
- the majority of forces exerted by the fastening member are directed to prevention of disengagement of the cutting insert from the base surface of the seat, while the remainder of the forces required to prevent lateral displacement of the cutting insert along the base surface of the insert seat are taken by the support element which is fixed to the cutting tool holder; and
- a wedge mechanism which presses the cutting insert against the base surface of the insert seat while simultaneously biasing the cutting insert towards one of the side walls of the insert seat, thereby also preventing lateral movement thereof.

It should be clear that most principles and features described above with respect to cutting tools 1, 100, 200, 300, 400, 500, 600, 700, 800, 1000, 1100 and 1200 and/or shown in FIGS. 1A to 35C, are not restricted to those cutting tools (1, 100, 200, 300, 400, 500, 600, 700, 800, 1000, 1100 and 1200) in connection with which they are described/shown, and may independently be applied, mutatis mutandis, to each other or to any other tools, in any combination considered to be appropriate by a person skilled in the art.

Those skilled in the art to which this invention pertains will readily appreciate that numerous changes, variations, and modification can be made without departing from the scope of the invention, mutatis mutandis.

The invention claimed is:

1. A cutting tool holder adapted for mounting thereon a cutting insert to form a cutting tool, the cutting tool holder comprising:
    an insert seat defined by a base and at least one side wall extending from the base to define an insert seat space adapted for receiving the cutting insert;
    a bore formed in the insert seat configured for receiving a fastening member for engagement with the insert seat;
    a support element extending into the insert seat from the base so that the bore is disposed between the side wall and the support element, and being one of the following:
       integrally formed with the insert seat; or
       at least during operation, fixedly attached to the insert seat by means other than the fastening member;
    the fastening member being displaceable with respect to the insert seat between a mounting position configured for allowing the cutting insert to be mounted onto the insert seat and a securing position adapted for securing the cutting insert within the insert seat.

2. The cutting tool holder according to claim 1, wherein fixed attachment of the support element is achieved via a screwing engagement between the support element and the insert seat.

3. The cutting tool holder according to claim 1, wherein the cutting tool is adapted to rotate in a first direction about a central axis thereof, and the support element is formed with a first side wall generally perpendicular to the base and facing in the first direction, and a second side wall extending from the first wall in a direction opposite the first direction, at an acute angle θ to the first wall, both the first side wall and the second side wall being adapted for simultaneous engagement with the cutting insert.

4. The cutting tool holder according to claim 3, wherein the second side wall is formed with a recess adapted to receive a corresponding portion of the cutting insert when the latter is mounted onto the insert seat.

5. The cutting tool holder according to claim 1, wherein, in both the mounting position and the securing position, the fastening member remains in engagement with the insert seat.

6. The cutting tool holder according to claim 5, wherein in the mounting position the fastening member protrudes to a first extent into the insert seat space, and in the securing position, the fastening member protrudes to a second extent into the insert seat space, greater than the first extent.

7. The cutting tool holder according to claim 5, wherein the fastening member is in the form of a securing pin adapted to be received within a corresponding bore of the insert seat.

8. The cutting tool holder according to claim 7, wherein the securing pin is spring biased into the securing position.

9. A cutting insert configured for mounting onto a cutting tool holder to form the cutting tool, the cutting tool holder including an insert seat defined by a base and at least one side wall extending from the base to define an insert seat space adapted for receiving the cutting insert; a bore formed in the insert seat configured for receiving a fastening member for engagement with the insert seat; a support element extending into the insert seat from the base so that the bore is disposed between the side wall and the support element, and being one of the following: integrally formed with said insert seat; or at least during operation, fixedly attached to the insert seat by means other than the fastening member; and the fastening member being displaceable with respect to the insert seat between a mounting position configured for allowing the cutting insert to be mounted onto the insert seat and a securing position adapted for securing the cutting insert within the insert seat, the cutting insert comprising:
   a top face;
   a bottom face; and
   a cavity extending between the top face and the bottom face, the cavity taking up no less that 15% of the overall volume of the cutting insert, the cavity defining a central axis extending between the top face and the bottom face through the center of an inscribing circle of the cavity, located on a plane substantially perpendicular to the axis, the cavity being formed with an inner surface having a first securing portion with a first geometric shape configured for engagement with the support element, and a second securing portion located at an opposite side of the cavity with respect to the central axis, and having a second geometric shape configured for engagement with the fastening member, both the first and the second securing portion being configured for simultaneously engaging the respective support element and fastening member in the same mounting position.

10. The cutting insert according to claim 9, wherein the first securing portion is closer to one of the top face and the bottom face, and the second securing portion is closer to the other of the top face and the bottom face.

11. The cutting insert according to claim 9, wherein the first securing portion is in the form of an arced surface and the second securing portion is substantially planar.

12. The cutting insert according to claim 9, wherein both the first securing portion and the second securing portion are in the form of arced surfaces.

13. The cutting insert according to claim 9, wherein the cutting insert is reversible, so that the inner cavity comprises:
   a first-side pair of securing portions:
      a first securing portion oriented closer to the top face; and
      a second securing portion oriented closer to the bottom face; and
   at least a second-side pair of securing portions:
      a first securing portion oriented closer to the bottom face; and
      a second securing portion oriented closer to the top face.

14. The cutting insert according to claim 9, wherein the cutting insert is indexible, so that the inner cavity comprises a first pair of securing portions and a second pair of securing portions, each pair comprising:
   a first securing portion oriented closer to the top face; and
   a second securing portion oriented closer to the bottom face.

15. The cutting insert according to claim 9, wherein the inner surface of the cavity is further formed with a first inner wall and a second inner wall forming therebetween an acute angle θ, both the first side wall and the second side wall being adapted for simultaneous engagement with the support element.

16. A cutting tool comprising the cutting tool holder of claim 1, wherein, at least during operation, the cutting insert is mounted onto the cutting tool holder and secured therein so that the cavity of the cutting insert receives therein at least a portion of both the support element and the fastening element.

17. The cutting tool according to claim 16, wherein the cutting tool is adapted to revolve about a central axis thereof in a first direction, and wherein when the cutting insert is mounted onto the cutting tool holder the fastening member is adapted to apply a force $F_1$ on the cutting insert in a direction generally along the central axis, the force $F_1$ pushing the cutting insert against the support element which is thereby adapted to apply a force $F_2$ on the cutting insert in a direction generally perpendicular to the central axis, the resultant force $F_T$ of the two forces $F_1$ and $F_2$ being in a direction transverse to the central axis and opposite the first direction.

18. The cutting tool according to claim 16, wherein the cutting tool is formed with two or more cutting portions, each cutting portion comprising two or more of the cutting inserts, the cutting edges of which form a continuous cutting edge in each cutting portion, wherein the spatial arrangement of the cutting inserts of the same cutting portion varies from one cutting portion to another.

19. The cutting tool according to claim 18, wherein the cutting inserts in each cutting portion are shifted at a distance d with respect to one another, and wherein the shift d varies from one cutting portion to another.

20. The cutting tool holder according to claim 1, wherein the support element is formed with an undercut surface extending, at least during operation, at an acute angle to the base and away from the side wall.

21. The cutting insert according to claim 9, wherein the cavity takes up no less than 30% of the overall volume of the cutting insert.

22. The cutting insert according to claim 9, wherein, in each cross-section of the cutting insert taken along a plane generally parallel to the top face or bottom face, a cross-sectional area of the cavity constitutes no less that 15% of the entire cross-sectional area of the cutting insert.

23. The cutting tool holder according to claim 22, wherein the cross-sectional of the cavity constitutes no less than 30% of the entire cross-sectional area of the cutting insert.

* * * * *